United States Patent
Lee et al.

(10) Patent No.: US 7,913,533 B2
(45) Date of Patent: Mar. 29, 2011

(54) MACHINE TOOL CARTRIDGE WITH INFORMATION STORAGE DEVICE, SMART CARTRIDGE SYSTEMS, AND METHODS OF USING SMART CARTRIDGE SYSTEMS

(75) Inventors: Brian J. Lee, Elk River, MN (US); Richard L. Timp, Vadnais Heights, MN (US)

(73) Assignee: Wilson Tool International Inc., White Bear Lake, MN (US)

( * ) Notice: Subject to any disclaimer, the term of this patent is extended or adjusted under 35 U.S.C. 154(b) by 1099 days.

(21) Appl. No.: 11/500,220

(22) Filed: Aug. 7, 2006

(65) Prior Publication Data

US 2007/0186744 A1 Aug. 16, 2007

Related U.S. Application Data

(63) Continuation-in-part of application No. 11/355,792, filed on Feb. 16, 2006, now Pat. No. 7,669,453.

(51) Int. Cl.
*B21J 13/08* (2006.01)
*G06F 19/00* (2006.01)

(52) U.S. Cl. .......................... 72/444; 72/446; 235/385

(58) Field of Classification Search .......... 72/444, 72/446, 447, 448, 15.1; 483/28, 29; 83/563, 83/564, 698.91; 29/559; 235/385; 700/160, 700/179
See application file for complete search history.

(56) References Cited

U.S. PATENT DOCUMENTS

| | | | |
|---|---|---|---|
| 3,678,562 A | 7/1972 | Leibinger | |
| 4,588,339 A | 5/1986 | Bilz | |
| 4,656,463 A | 4/1987 | Anders | |
| 4,720,907 A | 1/1988 | Rapp | |
| 4,742,470 A | 5/1988 | Juengel | |
| RE032,837 E | 1/1989 | Corni | |
| 4,809,426 A | 3/1989 | Takeuchi | |
| 4,922,591 A | 5/1990 | Campbell | |
| 4,951,375 A | 8/1990 | Erlenmaier | |
| 5,046,014 A | 9/1991 | Anjo | |
| 5,142,128 A | 8/1992 | Perkin | |
| 5,193,421 A | 3/1993 | Meisinger | |
| 5,224,915 A | 7/1993 | Kilian | |
| 5,257,199 A | 10/1993 | Tsujino | |
| 5,595,560 A | 1/1997 | Kamada | |
| 5,669,866 A * | 9/1997 | Julian et al. | 483/1 |
| 5,943,240 A | 8/1999 | Nakamura | |

(Continued)

FOREIGN PATENT DOCUMENTS

EP 015562 A 9/1985

(Continued)

OTHER PUBLICATIONS

Trumpf plastic cartridge: eight photographs thereof, and related information (e.g., cartridge weight) stated in the enclosed Supplemental Information Disclosure Statement.

(Continued)

*Primary Examiner* — Debra M Sullivan
(74) *Attorney, Agent, or Firm* — Fredrikson & Byron, P.A.

(57) ABSTRACT

A cartridge for a machine tool is provided. The cartridge has a main body, two punch-retention arms, and two die-retention arms. Preferably, the cartridge also has a stripper locator base. In some embodiments, the cartridge is provided with an electronic information storage device.

26 Claims, 43 Drawing Sheets

U.S. PATENT DOCUMENTS

| | | | |
|---|---|---|---|
| 5,983,688 A | 11/1999 | Anzai | |
| 6,047,579 A | 4/2000 | Schmitz | |
| 6,163,734 A | 12/2000 | Shigefuji | |
| 6,196,042 B1 | 3/2001 | Distefano | |
| 6,327,884 B1 | 12/2001 | Wills | |
| 6,344,018 B1 | 2/2002 | Aizawa | |
| 6,568,593 B2 | 5/2003 | Hetzer | |
| 6,585,628 B1 | 7/2003 | Tsung | |
| 6,786,239 B1* | 9/2004 | Welsh | 137/800 |
| 2002/0056749 A1 | 5/2002 | Hetzer | |
| 2003/0196471 A1 | 10/2003 | Huebner | |
| 2003/0226887 A1 | 12/2003 | Komine | |
| 2005/0016235 A1 | 1/2005 | Zusi | |
| 2005/0097338 A1* | 5/2005 | Lee | 713/186 |
| 2005/0173685 A1 | 8/2005 | Skach | |
| 2007/0191199 A1 | 8/2007 | Palick | |

FOREIGN PATENT DOCUMENTS

| | | | |
|---|---|---|---|
| GB | 2185130 A | 7/1987 | |
| GB | 2336331 A | 10/1999 | |
| JP | 2002178060 | 6/2002 | |
| JP | 2003164928 | 6/2003 | |

OTHER PUBLICATIONS

Trumpf original style iron cartridge: eight photographs thereof, and related information (e.g., cartridge weight) stated in the enclosed Supplemental Information Disclosure Statement.

Trumpf new style iron cartridge: eight photographs thereof, and related information (e.g., cartridge weight) stated in the enclosed Supplemental Information Disclosure Statement.

International Search Report and Written Opinion, dated Jan. 10, 2007 for corresponding PCT Application No. PCT/US2006/062236 (19 pages).

International Search Report and the Written Opinion, dated Nov. 9, 2007 for corresponding PCT Application No. PCT/US2006/062233 (16 pages).

* cited by examiner

820

720

MACHINE TOOL CARTRIDGE WITH INFORMATION STORAGE DEVICE, SMART CARTRIDGE SYSTEMS, AND METHODS OF USING SMART CARTRIDGE SYSTEMS

RELATED APPLICATION

This application is a continuation-in-part of U.S. Ser. No. 11/355,792, filed Feb. 16, 2006 now U.S. Pat. No. 7,699,453, the entire disclosure of which is incorporated herein by reference.

FIELD OF THE INVENTION

The invention relates generally to cartridges for holding tool sets. More particularly, the invention relates to cartridges for holding tool sets for machine tools.

BACKGROUND OF THE INVENTION

Machine tools are usually adapted for being used with many different tool sets. A typical tool set includes a punch and a corresponding die. A stripper plate is also commonly included as part of the tool set. In processing a workpiece (e.g., a piece of sheet metal), it is common to use several different tool sets. In some cases, once a first tool set has been used, it is exchanged for a second tool set, and then a third, and so on. Once a first workpiece has been fully processed using the desired sequence of tool sets, a second workpiece may be processed, in some cases beginning again with the first tool set.

The tool sets used on a machine tool commonly are stored in cartridges. Some cartridges may be stored in the machine tool, while others may be kept nearby. When several different tool sets (e.g., of different size and/or shape) will be used for a job, the machine tool is commonly provided with cartridges respectively holding the different tool sets. Not only do the cartridges store the tools, they also facilitate loading and unloading the tools on the machine tool. For example, when it is desired to use a particular tool set, a cartridge holding that tool set is moved to a mounting position on the machine tool. At the mounting position, the tools are removed from the cartridge and loaded onto the machine tool. Once use of that tool set is finished, its tools are unloaded from the machine tool and loaded back onto the cartridge. The cartridge is then moved away from the mounting position. Then, a different cartridge (holding another tool set) can be moved to the mounting position so that a new set of tools can be used by the machine tool. This process is repeated for as many different tool sets as are needed for a given job. In some cases, the machine tool includes an elongated rail for storing the cartridges. The cartridges, for example, can be slidably engaged with the rail such that they can be slid back and forth to and from the mounting position. In other cases, the cartridges are stored in a rotary storage system, a round carousel, or a stacked storage system. The mounting and dismounting of tool sets using cartridges is described in U.S. Pat. No. 4,951, 375. This '375 patent is incorporated herein by reference to the extent it shows and describes the structure of an exemplary machine tool with a cartridge guidance system.

Some prior art cartridges have been made of cast iron. Other prior art cartridges have been made of plastic, with steel used for the cartridge arms that hold the punches and dies.

It would be desirable to provide a cartridge that is durable and resistant to breakage, while also being light enough to facilitate swift cartridge movements and/or to reduce wear and tear on the machine tool. It would also be desirable to provide cartridges that have one or more removable high-wear-location inserts. Further, it would be desirable to provide a cartridge with one or more coatings to improve the cartridge's performance and/or durability. Still further, it would be desirable to provide a cartridge having selected portions formed of particular metals, non-metals, and/or composites that improve the cartridge's performance and/or durability. Finally, it would be desirable to provide a metal cartridge having a weight approximating that of a conventional plastic cartridge.

Regardless of the material(s) from which a cartridge is formed, it would be desirable to provide the cartridge with an electronic information storage device. It also would be desirable to provide smart cartridge systems that can employ a public internetwork, such as the Internet.

SUMMARY OF THE INVENTION

Figure 1:
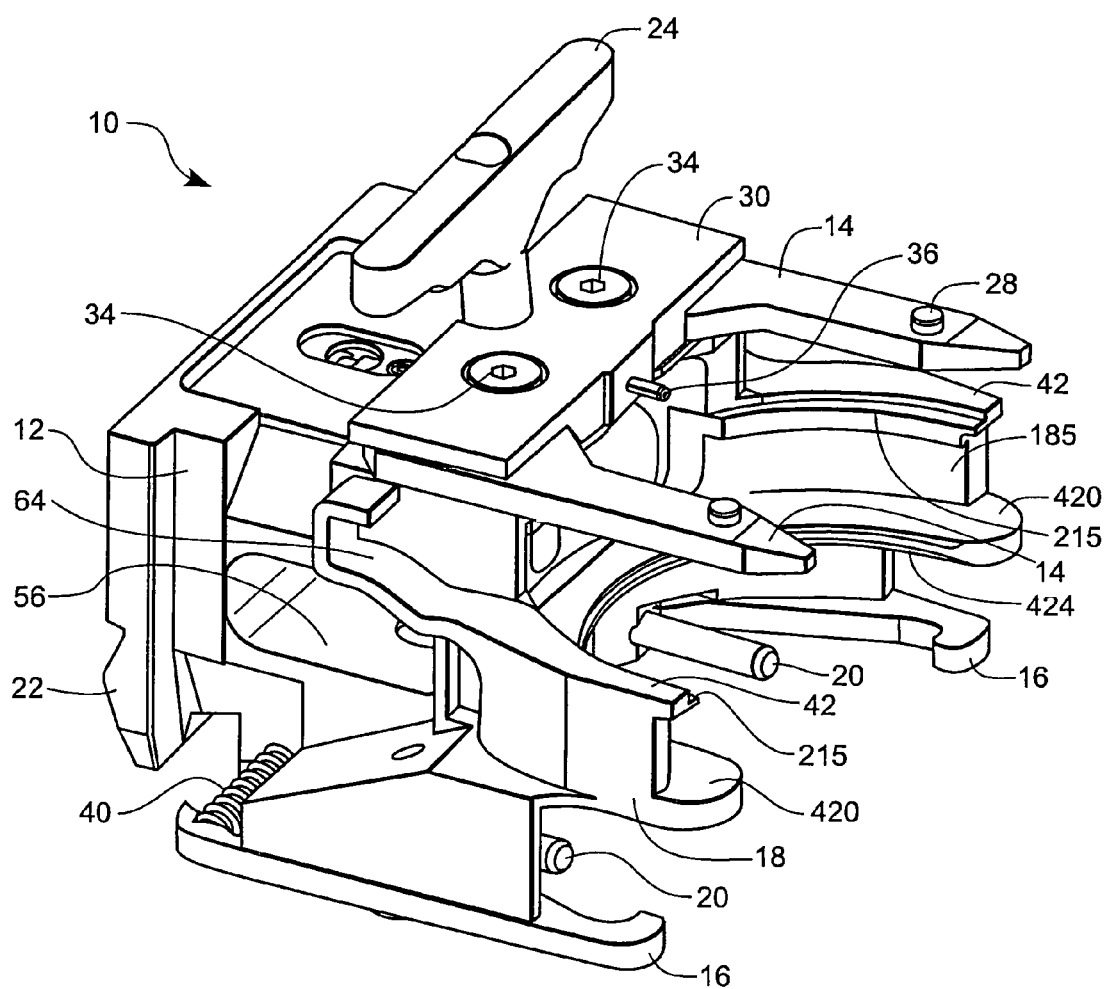
FIG. 1 is a perspective view of a cartridge according to a first embodiment of the invention.

In certain embodiments, the invention provides a tool set holder cartridge for a machine tool. The cartridge has a main body, two punch-retention arms, and two die-retention arms. Preferably, the two punch-retention arms are spaced apart and at least generally parallel to each other, the two die-retention arms are spaced apart and at least generally parallel to each other. In the present embodiments, the main body can optionally be formed of a first metal, and the punch-retention arms and die-retention arms can optionally be formed of metal(s) different than the first metal.

In certain embodiments, the invention provides a tool set holder cartridge for a machine tool. The cartridge has a main body, two punch-retention arms, two die-retention arms, and a stripper locator base. Preferably, the two punch-retention arms are spaced apart and at least generally parallel to each other, the two die-retention arms are spaced apart and at least generally parallel to each other, and the punch-retention arms extend outwardly away from an upper portion of the main body. In the present embodiments, the two punch-retention arms are mounted to the main body such that the punch-retention arms have a limited range of movement toward and away from each other. In these embodiments, the punch-retention arms are resiliently mounted to the main body such that the punch-retention arms are resiliently biased toward a default configuration characterized by the punch-retention arms being closer to each other than they are in any other configuration within their limited range of movement. Preferably, the die-retention arms extend outwardly away from a lower portion of the main body, and the two die-retention arms are preferably mounted to the main body such that the die-retention arms have a limited range of movement toward and away from each other. In the present embodiments, the die-retention arms are resiliently mounted to the main body such that the die-retention arms are resiliently biased toward a default configuration characterized by the die-retention arms being closer to each other than they are in any other configuration within their limited range of movement. The stripper locator base here can optionally be mounted to a middle portion of the main body. Preferably, the stripper locator base comprises two spaced-apart arm portions, the arm portions of the stripper locator base are not mounted resiliently for movement relative to the main body but rather are rigidly disposed relative to the main body, and the punch-retention arms and the die-retention arms and the stripper locator base are mounted removably to the main body such that they can be selectively removed and replaced.

In certain embodiments, the invention provides a tool set holder cartridge for a machine tool. In the present embodiments, the cartridge has two punch-retention arms, two die-retention arms, and preferably a main body formed of a metal (or formed of a composite comprising carbon fiber). Preferably, the two punch-retention arms are spaced apart and at least generally parallel to each other, and the two die-retention arms are spaced apart and at least generally parallel to each other. In the present embodiments, the two punch-retention arms are mounted to the main body such that the punch-retention arms have a limited range of movement toward and away from each other. In these embodiments, the punch-retention arms are resiliently mounted to the main body such that the punch-retention arms are resiliently biased toward a default configuration characterized by the punch-retention arms being closer to each other than they are in any other configuration within their limited range of movement. Similarly, the two die-retention arms are preferably mounted to the main body such that the die-retention arms have a limited range of movement toward and away from each other. In these embodiments, the die-retention arms are resiliently mounted to the main body such that the die-retention arms are resiliently biased toward a default configuration characterized by the die-retention arms being closer to each other than they are in any other configuration within their limited range of movement. In the present embodiments, the cartridge has a weight of less than 3 pounds, perhaps more preferably less than 2.75 pounds, or perhaps even less than 2 pounds. In some embodiments of this nature, each lateral side of the cartridge is provided with at least one weight-reduction pocket or opening, a bottom side of the cartridge is provided with at least one weight-reduction pocket or opening, and a front side of the cartridge is provided with at least one weight-reduction pocket or opening. Optionally, each such pocket or opening communicates with at least one of the others. The main body in the present embodiments, for example, can optionally be formed of an aircraft metal, and the punch-retention arms and die-retention arms can optionally be formed of steel.

In certain embodiments, the invention provides a smart cartridge for holding a tool set for a machine tool. The cartridge has a main body, two punch-retention arms, two die-retention arms, and a stripper locator base. The two punch-retention arms are adapted to removably retain a punch on the cartridge. The two die-retention arms are adapted to removably retain a die on the cartridge. The stripper locator base is adapted to removably retain a stripper plate on the cartridge. In the present embodiments, the cartridge has an electronic information storage device, which preferably is readable and writeable. The electronic information storage device is mounted on a desired wall of the cartridge in the present embodiments.

In certain embodiments, the invention provides a smart cartridge for holding a tool set for a machine tool. The cartridge has a main body, two punch-retention arms, two die-retention arms, and a stripper locator base. The two punch-retention arms are adapted to removably retain a punch on the cartridge. The two die-retention arms are adapted to removably retain a die on the cartridge. The stripper locator base is adapted to removably retain a stripper plate on the cartridge. In the present embodiments, the cartridge has an electronic information storage device, which preferably is readable and writeable. The electronic information storage device in the present embodiments is on a desired side of the cartridge. Preferably, the cartridge has six sides including a top side, a bottom side, a front side, a back side, and left and right sides. In the present embodiments, the desired side of the cartridge preferably is a side other than the top side.

In certain embodiments, the invention provides a smart cartridge for holding a tool set for a machine tool. The cartridge has a main body, two punch-retention arms, two die-retention arms, and a stripper locator base. The two punch-retention arms are adapted to removably retain a punch on the cartridge. The two die-retention arms are adapted to removably retain a die on the cartridge. The stripper locator base is adapted to removably retain a stripper plate on the cartridge. In the present embodiments, the cartridge has an electronic information storage device, which preferably is readable and writeable. The electronic information storage device in the present embodiments is potted on a desired wall of the cartridge such that at least part of the electronic information storage device is encapsulated by a protective overcoat. The electronic information storage device can optionally comprise both the protective overcoat and a mechanical fastener adapted for anchoring the electronic information storage device on the desired wall of the cartridge, where the mechanical fastener comprises a first detent adapted for being removably engaged with a corresponding detent of the cartridge.

Certain embodiments of the invention provide a smart cartridge and a tool set, in combination. The cartridge and tool set are adapted for use on a machine tool. The cartridge has a main body, two punch-retention arms, two die-retention arms, and a stripper locator base. The two punch-retention arms removably retain a punch on the cartridge, the two die-retention arms removably retain a die on the cartridge, and the stripper locator base removably retains a stripper plate on the cartridge. In the present embodiments, the cartridge has an electronic information storage device, which preferably is readable and writeable. The electronic information storage device in the present embodiments is mounted on a desired wall of the cartridge. In the present embodiments, the desired wall can be formed of a non-magnetic material selected from the group consisting of a non-magnetic metallic material, a non-magnetic plastic material, and a non-magnetic composite material.

In certain embodiments, the invention provides a smart cartridge and a tool set, in combination. The cartridge and tool set are adapted for use on a machine tool. The cartridge has a main body, two punch-retention arms, two die-retention arms, and a stripper locator base. The two punch-retention arms removably retain a punch on the cartridge, the two die-retention arms removably retain a die on the cartridge, and the stripper locator base removably retains a stripper plate on the cartridge. In the present embodiments, the cartridge has an electronic information storage device, which preferably is readable and writeable. The cartridge in the present embodiments has a first electronic information storage device, and at least one of the punch, the stripper plate, and the die has a second electronic information storage device.

Certain embodiments of the invention provide a smart cartridge for holding a tool set for a machine tool. The cartridge has a main body, two punch-retention arms, two die-retention arms, and a stripper locator base. The two punch-retention arms are adapted to removably retain a punch on the cartridge, the two die-retention arms are adapted to removably retain a die on the cartridge, and the stripper locator base is adapted to removably retain a stripper plate on the cartridge. In the present embodiments, the cartridge is provided with an electronic information storage device carried by an exteriorly-threaded insert, and the cartridge has an interiorly-threaded opening into which the insert can be removably secured by threadingly advancing the insert into the opening.

In certain embodiments, there is provided a method of using a tool set holder cartridge. The method comprises providing the cartridge. The cartridge is adapted for use on a machine tool. The cartridge includes two punch-retention arms, two die-retention arms, and a stripper locator base. In the present embodiments, the punch-retention arms removably retain a punch on the cartridge, and a desired electronic information storage device is mounted on the cartridge or the punch. The method optionally includes removing the punch from the cartridge's punch-retention arms. A sharpening operation is performed on a tip of the punch. The method involves writing sharpening-history information to the desired electronic information storage device. The sharpening-history information includes data dependent upon how much of the punch's tip is removed during the noted sharpening operation.

Certain embodiments of the invention provide a smart cartridge system comprising a tool set holder cartridge for a machine tool, an interface apparatus, and a network node device. The cartridge has a main body, two punch-retention arms, two die-retention arms, and a stripper locator base. The two punch-retention arms are adapted to removably retain a punch on the cartridge. The two die-retention arms are adapted to removably retain a die on the cartridge. The stripper locator base is adapted to removably retain a stripper plate on the cartridge. In the present embodiments, the cartridge has an electronic information storage device, which preferably is readable and writeable. The electronic information storage device is mounted on the cartridge in the present embodiments. The interface apparatus is adapted for reading information stored by the information storage device on the cartridge. The interface apparatus and the network node device are adapted for signal transmission between each other.

DETAILED DESCRIPTION

With reference to the figures, a tool cartridge 10 is provided having a main body 12, two punch-retention arms 14, and two die-retention arms 16. The illustrated cartridge has (optionally its main body has) an upper portion 12a, a middle portion 12b, and a lower portion 12c. The punch-retention arms 14 preferably extend outwardly from the upper portion 12a, and the die-retention arms 16 preferably extend outwardly from the lower portion 12c. In the figures, the two punch-retention arms 14 are spaced apart from each other and are generally parallel to each other. Likewise, the illustrated die-retention arms 16 are spaced apart from each other and are generally parallel to each other. In other embodiments, though, the arms 14 are not generally parallel and/or the arms 16 are not generally parallel. The illustrated punch-retention arms 14 are generally parallel to the die-retention arms 16, although this may not be the case in all embodiments.

The main body 12 preferably comprises a block (which in certain embodiments is formed of an aircraft metal). Preferably, the punch-retention arms and die-retention arms are separately provided pieces, which are mounted to the main body (e.g., all four of these arms 14, 16 can optionally be mounted to, and/or secured alongside, a single integral block of the main body). In some cases, the punch-retention arms and die-retention arms are all mounted removably (and optionally pivotally) to the main body such that they can be selectively removed and replaced, e.g., if damaged or worn.

The punch-retention arms 14 preferably are mounted to the main body 12 such that these two arms have a limited range of movement toward and away from each other. In preferred cases, the arms 14 are resiliently mounted (e.g., pivotally) to the main body 12 such that the arms are resiliently biased toward a default configuration characterized by the arms being closer to each other than they are in any other configuration within their limited range of movement.

Figure 2:
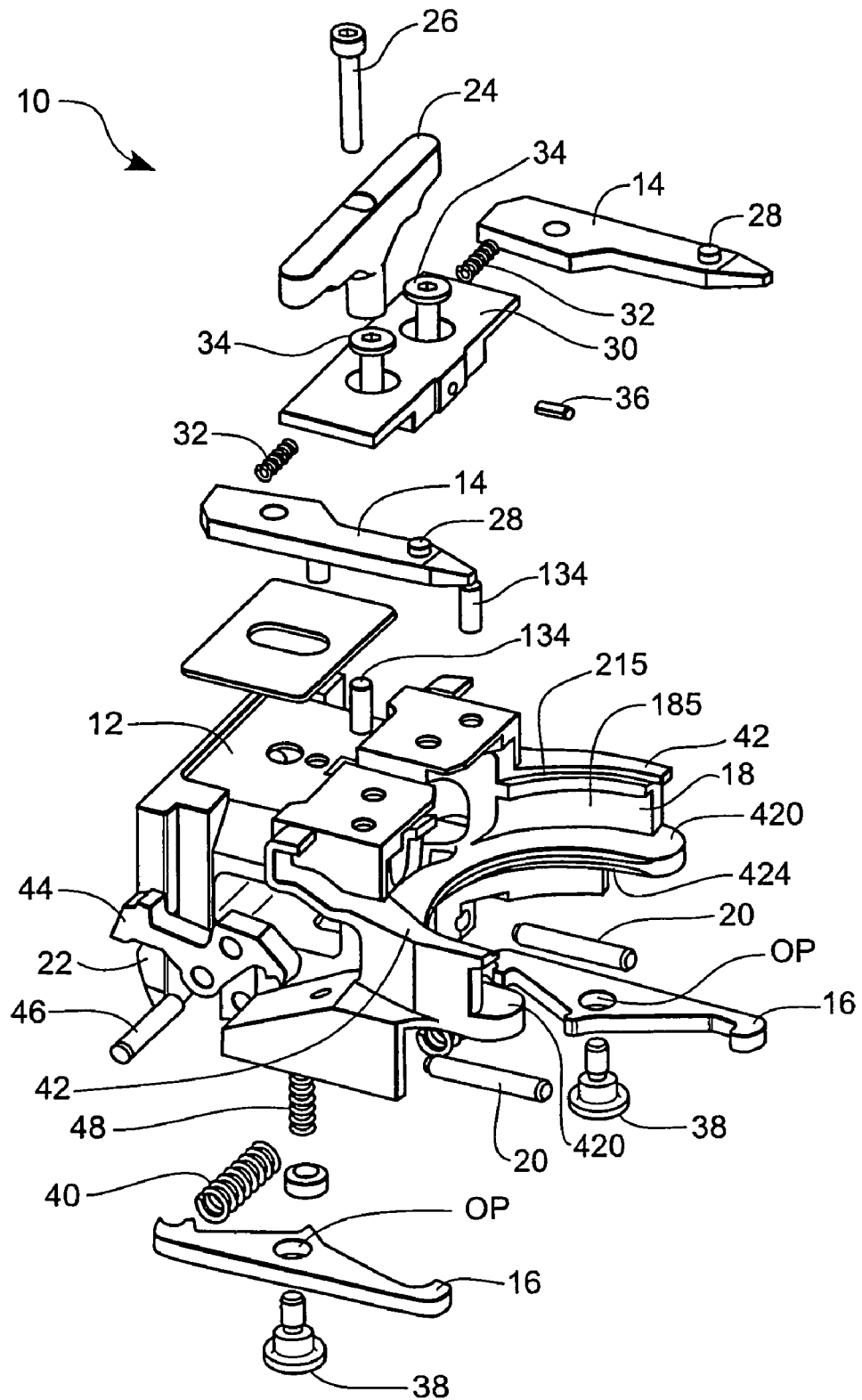
FIG. 2 is an exploded view of the cartridge illustrated in FIG. 1.
Figure 3:
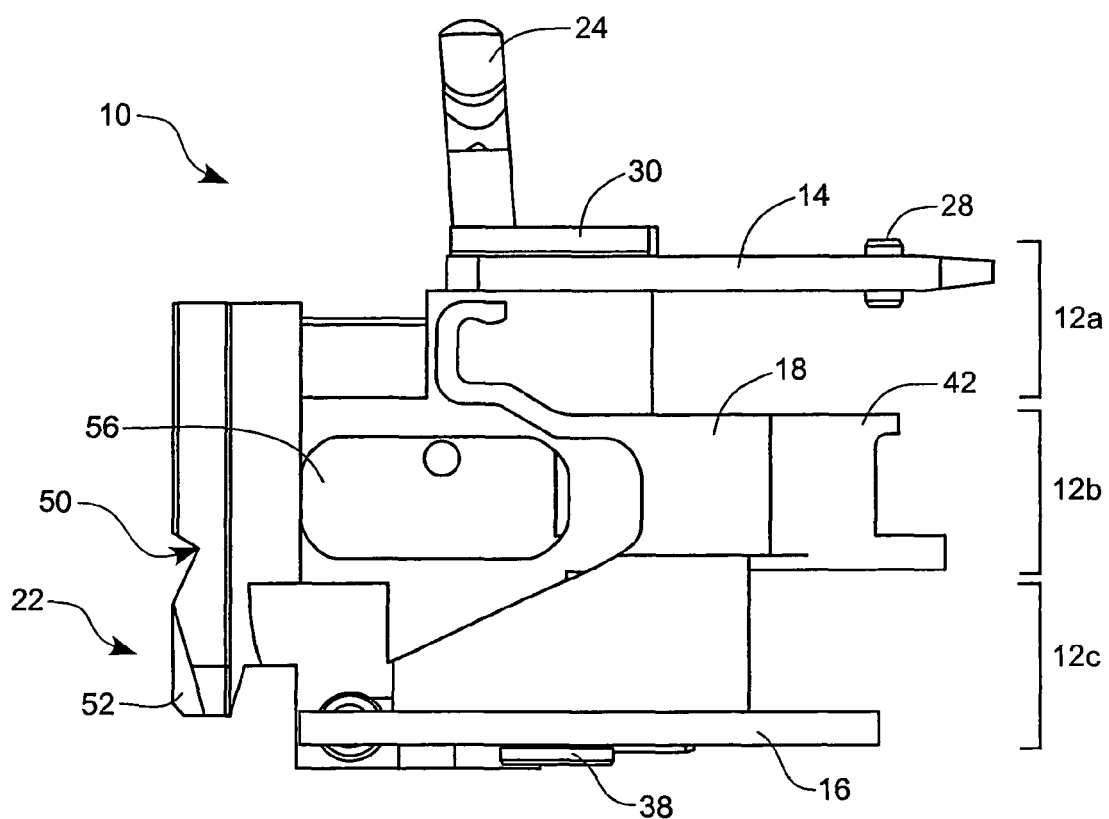
FIG. 3 is a right side view of the cartridge illustrated in FIG. 1.
Figure 3A:
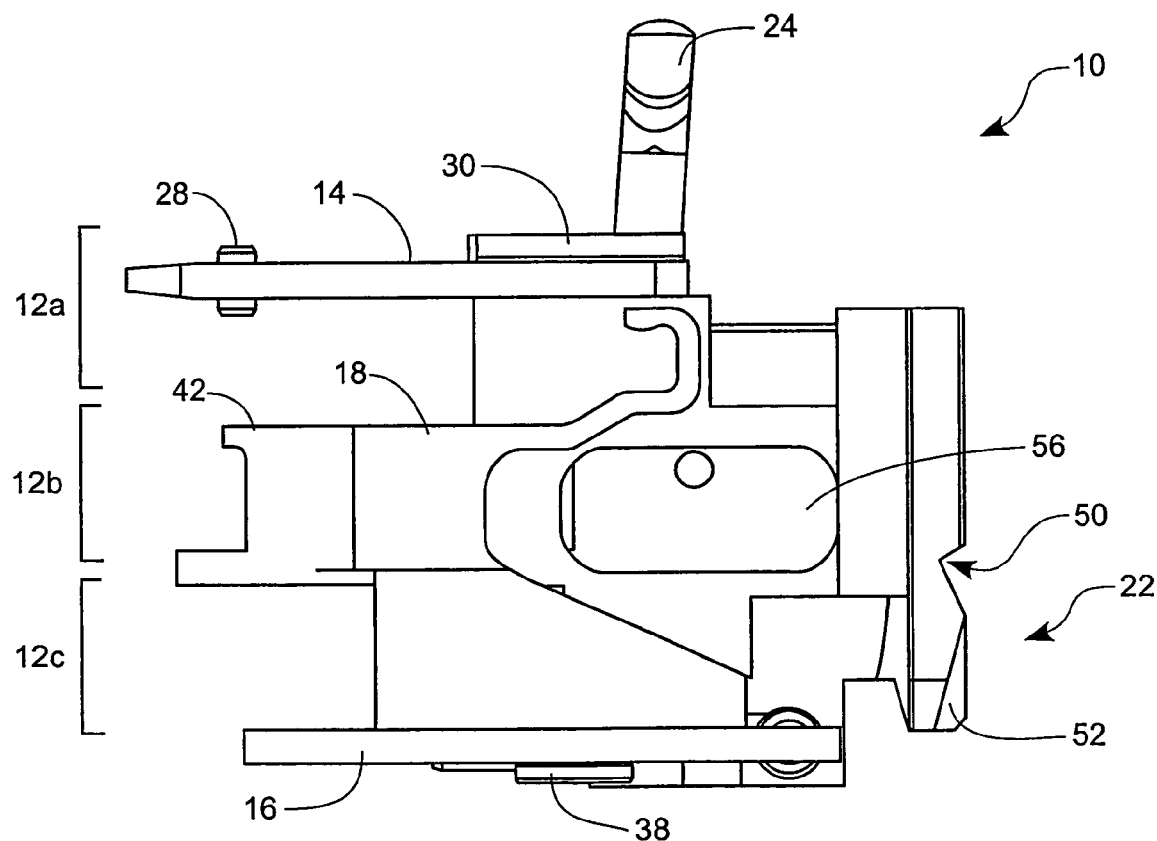
FIG. 3A is a left side view of the cartridge illustrated in FIG. 1.
Figure 4:
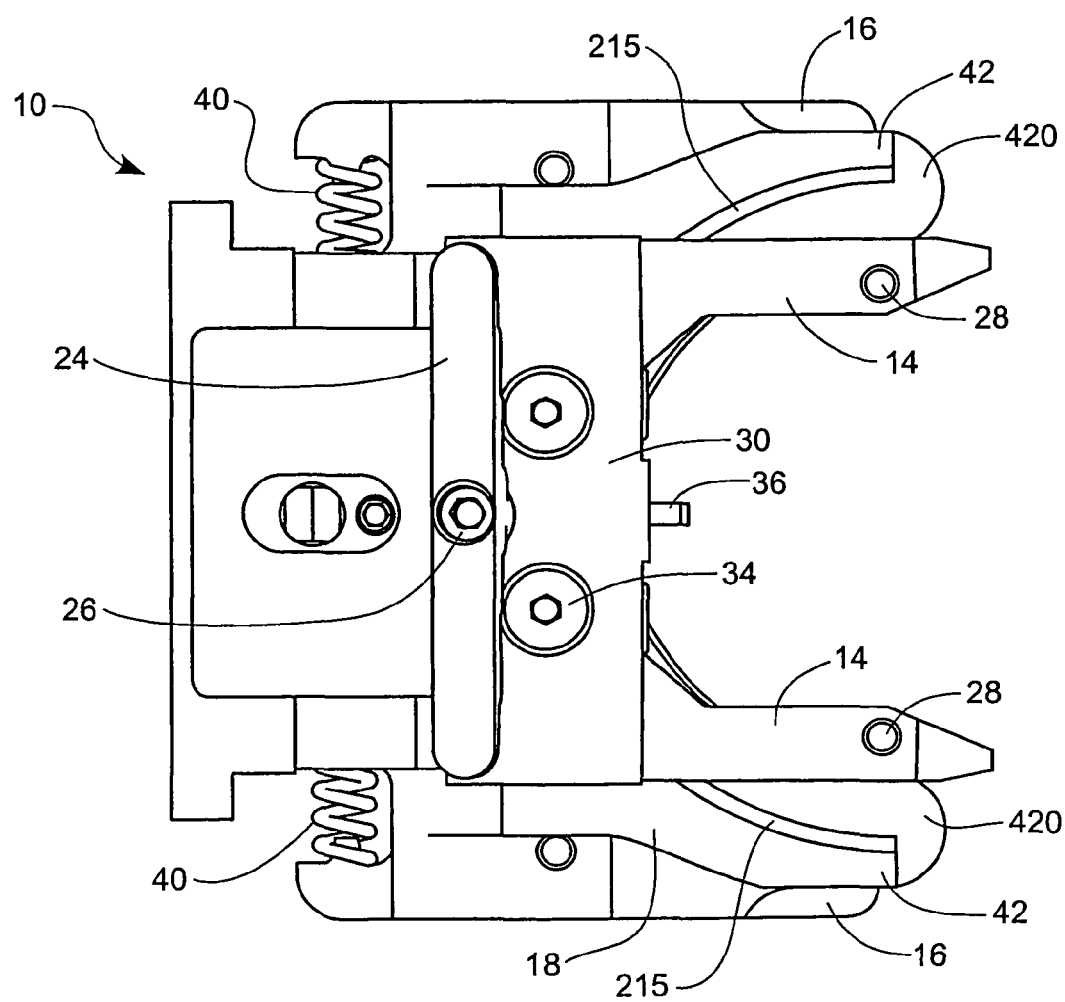
FIG. 4 is a top side view of the cartridge illustrated in FIG. 1.

In the illustrated embodiments, an optional center piece 30 is mounted to the main body 12 (e.g., using screws 34 or other suitable fasteners), e.g., such that a rear end region of each arm 14 is mounted between the bottom of the center piece 30 and the top of the main body 12. In the figures, two screws 34 connect the center piece 30 to the main body 12, and each arm 14 is adapted to pivot (e.g., in a horizontal plane) on a pin 134 anchored to the main body and/or to the center piece. The illustrated center piece 30 is a generally plate-like body having a generally T-shaped cross-sectional configuration, as can be appreciated in FIG. 2. These details, however, are by no means limiting to the invention. For example, the center piece 30 is strictly optional and can be omitted.

Springs 32 can be provided to resiliently bias the arms in the described manner. In the figures, a spring 32 is positioned between the rear end region of each arm 14 and a shoulder of the center piece 30. Alternatively, the spring 32 could be positioned between a shoulder of the main body 12 and the arm 14. Other arrangements could also be provided to resiliently bias the arms 14 in the described manner.

The illustrated punch-retention arms 14 each have a tapered front end region. This, however, may not be the case in other embodiments.

Preferably, the die-retention arms 16 are also mounted to the main body 12 such that these two arms have a limited range of movement toward and away from each other. In preferred cases, these arms 16 are resiliently mounted (e.g., pivotally) to the main body 12 such that the arms are resiliently biased toward a default configuration characterized by the arms being closer to each other than they are in any other configuration within their limited range of movement.

The illustrated die-retention arms 16 are attached pivotally to the main body 12 using screws 38 or other suitable fasteners. Here, the screws 38 are inserted through respective openings OP in the arms 16. The leading ends of these screws 38 are anchored into a lower portion 12c of the main body. Each arm 16 pivots about a central portion of the screw 38. A spring 40 is positioned between each arm 16 and a shoulder of the main body 12. Of course, other arrangements could also be provided to resiliently bias the arms 16 in the described manner.

Thus, the figures are representative of a broader group of embodiments wherein each die-retention arm 16 is pivotally moveable (optionally, about a pivot point defined by a screw 38) toward and away from its default position (i.e., the position toward which the spring 40 pushes the arm 16).

In the illustrated embodiments, a handle 24 is provided on the cartridge 10 to facilitate carrying the cartridge manually. The handle 24 can be attached (optionally removably) to the center piece 30 and/or to the main body 12. Alternatively, the handle can be integral to the center piece and/or to the main body. As another alternative, the handle can actually be omitted, if so desired. In the present embodiments, the optional handle 24 is attached to the center piece 30 by a screw 26.

An upper horizontal alignment pin 36 can optionally be provided (e.g., it can be mounted to the center piece 30 and/or to the main body 12). In the figures, this pin 36 (which can optionally be formed of metal and/or have a circular cross section) is positioned directly between the two punch-retention arms 14.

A vertical alignment pin 28 can optionally be provided on each punch-retention arm 14. Each illustrated pin 28 is mounted (e.g., so as to have its axis extending vertically) in an opening defined by a front end region (which defines the outwardly-extending free end) of an arm 14. The illustrated vertical pins 28 each have a circular cross section, although this is not required. Each arm 14 preferably lies in a horizontal plane, and each pin 28 preferably extends along a vertical axis. In other embodiments, though, the pins 28 may be omitted or configured in a different fashion.

The illustrated cartridge also includes two lower horizontal alignment pins 20. These pins 20 preferably are spaced apart and at least generally parallel to each other. The pins 20 are shown as being generally parallel to the punch-retention arms 14 and to the die-retention arms 16, although this may not be the case in other embodiments. The pins 20 optionally have a circular cross section (other shapes are possible) and preferably are formed of metal. The pins 20 also preferably are located between (e.g., directly between) the two die-retention arms 16. The pins 20 desirably are rigidly mounted to the main body, e.g., so as to have no freedom of movement relative to the main body.

Figure 22:
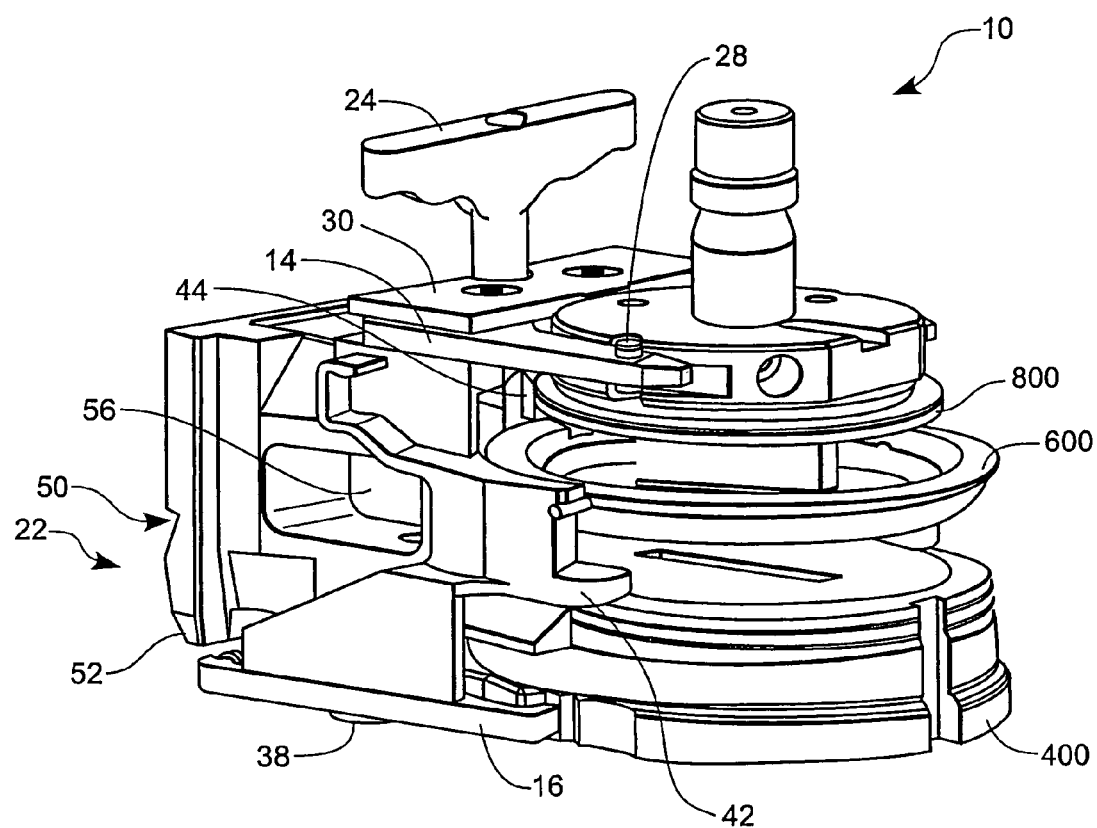
FIG. 22 is a perspective view of a cartridge carrying a tool set in accordance with certain embodiments of the invention.
Figure 24:
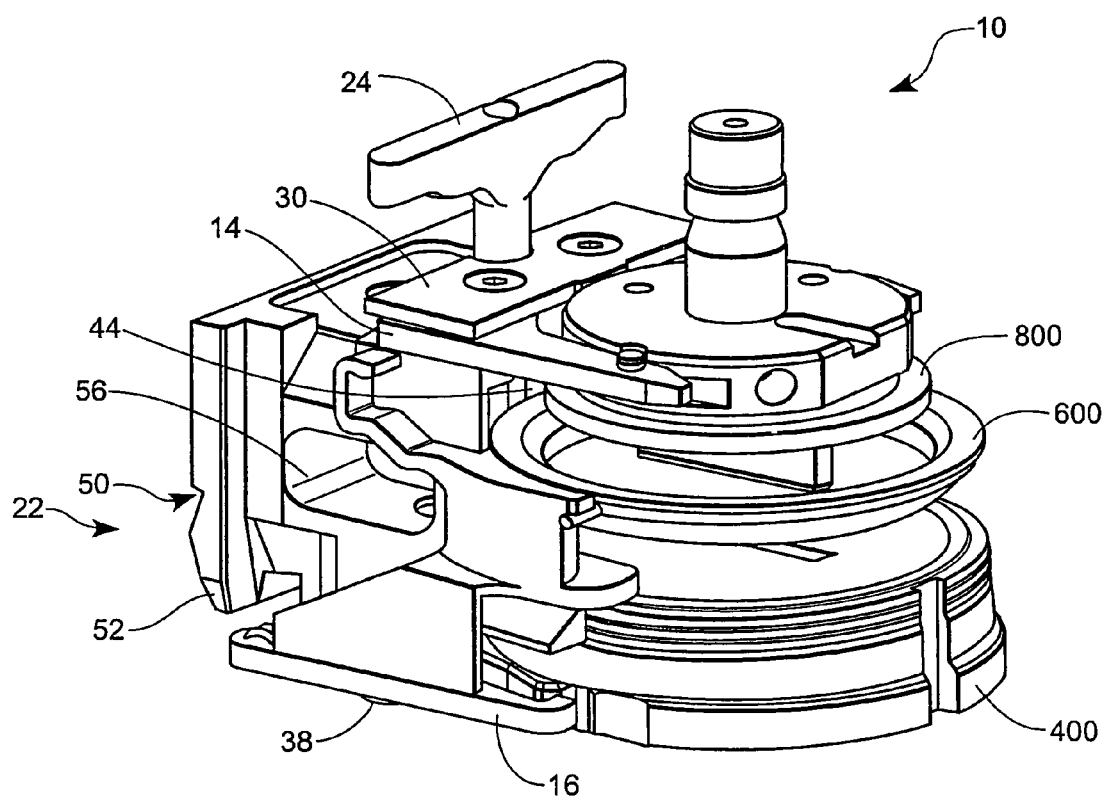
FIG. 24 is a perspective view of a cartridge carrying a tool set in accordance with certain embodiments of the invention.

A stripper locator base 18 is provided at a middle portion 12b of the cartridge (e.g., optionally at a middle portion of the main body). The stripper locator base 18 is located between the punch-retention arms 14 and the die-retention arms 16. In the figures, the stripper locator base 18 comprises a single, integral piece defining two spaced-apart arm portions 42. The illustrated arm portions 42 are not mounted resiliently for movement relative to the main body 12, but rather are rigidly disposed relative to the main body so as to have no freedom of movement (or at least substantially no freedom of movement). The stripper locator base 18 desirably defines a shelf 215 (having at least one curved portion, and perhaps optimally having at least two curved portions) that is adapted to receive a partial extent (e.g., a partial circumferential extent) of a stripper plate having a circular configuration. This is perhaps best appreciated with reference to FIGS. 22 and 24, which show a loaded cartridge (i.e., a cartridge carrying a tool set). The shelf 215 preferably has a horizontal surface on which a stripper plate can be supported.

In the illustrated embodiments, the stripper locator base 18 also defines a generally arc-shaped surface 420, which preferably is a horizontal surface. This surface 420 desirably is spaced (e.g., vertically) from the shelf 215. The surface 420 can optionally be defined by a rim that is a projection of the stripper locator base, as shown. The bottom front edge of the illustrated rim has an angled chamfer 424. In some cases, the chamfer 424 is angled at between about 30 degrees and 60 degrees, such as about 45 degrees. This chamfer allows clearance for forming tools with taller die caps. The rim can optionally define an arc that extends at least about 145 degrees, with a bottom edge region (which faces generally downwardly, i.e., toward the die-retention arms) of this arc being chamfered. The invention provides certain embodiments wherein the cartridge has this chamfer feature regardless of any particular restrictions on what materials the main body, arms, etc. are formed of, and regardless of whether the stripper locator base or the rail-engagement portion are removable, and regardless of the weight of the cartridge. For example, some embodiments involve simply providing this chamfer on a conventional cast iron or plastic cartridge to allow clearance for forming tools with higher die caps.

The illustrated stripper locator base 18 defines a groove bounded by at least one semi-circular wall section 185, although these features are not strictly required.

In the embodiment of FIGS. 1-7, a middle portion 12*b* of the main body 12 defines the stripper locator base 18. That is, the stripper locator base 18 is part of (i.e., integral to) the main body 12. On the other hand, in the embodiments of FIGS. 8-14 and FIGS. 15-21, the stripper locator base 18 is removably attached to the main body 12, such that the stripper locator base 18 can be removed and replaced, e.g., if damaged or worn. In embodiments of this nature, platforms 62 are provided for receiving rear portions (e.g., rear flange portions) 64 of the stripper locator base 18. The platforms 62 preferably are mateable with (e.g., correspondingly configured to nestingly receive) the rear portions 64 of the stripper locator base such that these rear portions 64 can be fitted snugly against the platforms 62. Likewise, a platform 66 is provided for receiving the bottom of the stripper locator base. The platform 66 can optionally have a size and shape that corresponds to the size and shape of the bottom of the stripper locator base.

In the exemplary embodiments of FIGS. 8-21, the stripper locator base 18 is removably attached to the main body using at least one fastener (e.g., a screw) 68. Each illustrated fastener 68 extends through an opening defined by the platform 66 and through a corresponding opening defined by the stripper locator base 18. Here, each fastener is an exteriorly threaded screw and the openings through which it extends are interiorly threaded. Other arrangements for removably attaching the stripper locator base can alternatively be used.

Figure 25:
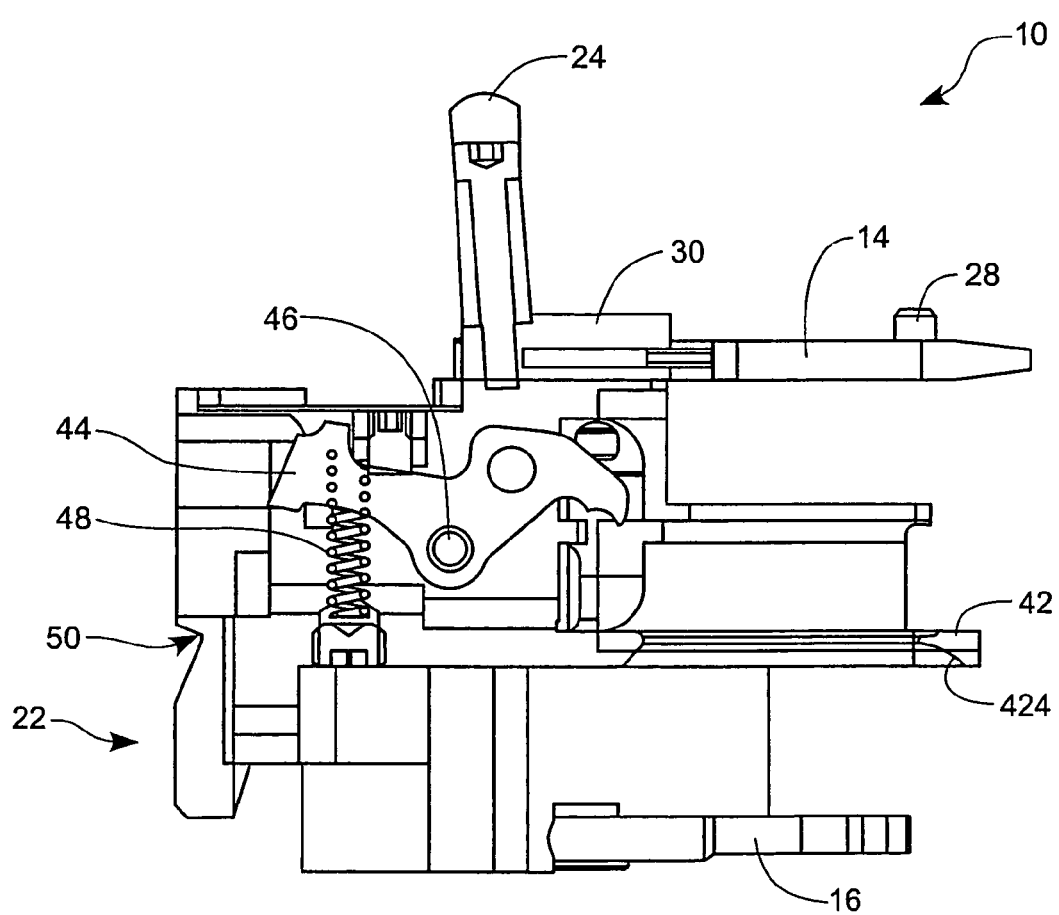
FIG. 25 is a side cross-sectional view of a cartridge in accordance with certain embodiments of the invention.

An optional stripper plate holder 44 can also be provided. This can be seen best in FIG. 25 and also in FIGS. 2, 6, 7, and 22. The illustrated holder 44 is mounted to the cartridge's main body, e.g., by a pin 46. Here, the holder 44 has a front portion and a rear portion. Preferably, the holder 44 is mounted pivotally on the pin 46, such that the holder has some freedom of pivotal movement. The rear portion of the illustrated holder 44 is resiliently biased upwardly using a spring 48 or another resilient member. This causes the front portion of the pivotally mounted holder 44 to be resiliently biased downwardly. When a stripper plate is loaded onto the shelf 215, a top portion of the stripper plate cams with and bears upwardly against the front portion of the holder 44, which causes the holder 44 to pivot such that its front portion is moved upwardly somewhat to give the stripper plate clearance to be pushed fully onto the shelf 215. Since the front portion of the holder 44 is resiliently biased downwardly, the holder 44 then presses downwardly on the stripper plate, thereby holding the stripper plate securely in place (e.g., such that the stripper plate is held forcibly between the holder 44 and the shelf 215).

Figure 23:
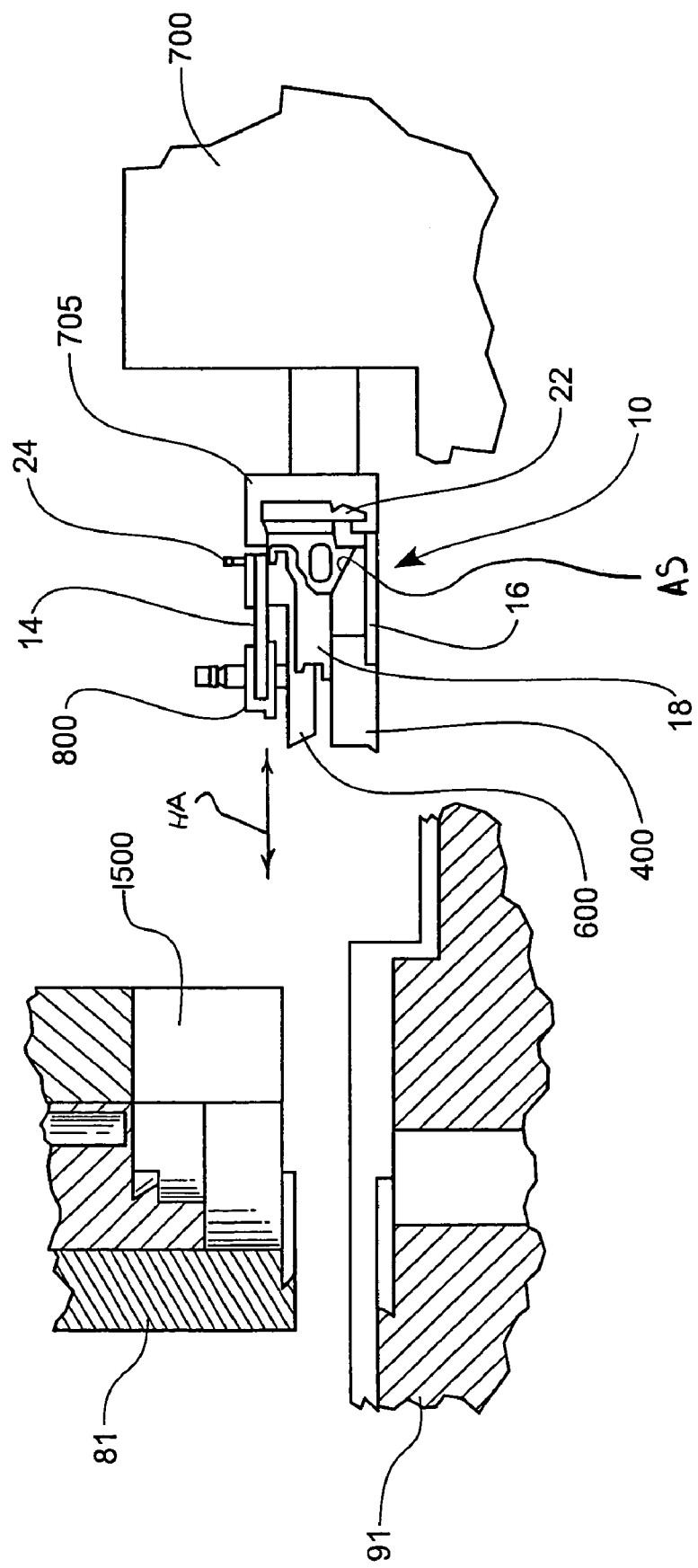
FIG. 23 is a schematic partially-sectional view of a tool mounting position of a machine tool's ram, showing a loaded cartridge supported on a guidance system in accordance with certain embodiments of the invention.

The cartridge 10 also includes a rail-engagement portion 22. The rail-engagement portion 22 is adapted to be attached to a rail (and/or to a mount body 705 of a guidance system 700) of a machine tool. This is perhaps best understood with reference to FIG. 23. By virtue of this attachment, the cartridge 10 can be moved selectively toward or away from a tool mounting position 1500. In FIG. 23, items 81 and 91 are upper and lower portions, respectively, of the machine tool. The rail-engagement portion 22 of the cartridge 10 preferably is located on a rear portion of the cartridge (optionally on a rear portion of the cartridge's main body). For example, the illustrated rail-engagement portion 22 is located on (i.e., is part of, or is attached to) a rear, lower region of the cartridge's main body.

The rail-engagement portion 22 preferably defines an outwardly open notch 50. This notch 50 is shown as being at least generally V-shaped, although other notch configuration may also be useful. In addition, as exemplarily shown in FIGS. 3, 5 and 7, the rail-engagement portion 22 preferably defines an indented segment 52 stemming downword from the open notch 50.

In the embodiments of FIGS. 1-14, the rail-engagement portion 22 is integral to the cartridge's main body 12. On the other hand, in the embodiments of FIGS. 15-21, the rail-engagement portion 22 comprises at least one rail-engagement insert that is removably mounted to a rear portion of the cartridge's main body 12. Each such insert can be removably mounted to the cartridge's main body 12 using a screw 70 or another removable fastener. In embodiments of this nature, the rail-engagement insert(s) 22 can be selectively removed and replaced, e.g., if damaged or worn. As is perhaps best shown in FIGS. 15 and 16, the insert itself defines the notch 50 in some embodiments.

In certain embodiments, the main body 12 of the cartridge is formed of one material (e.g., a first metal, optionally an aircraft metal) while the punch-retention arms 14 and die-retention arms 16 are formed of different material(s), optionally a different metal or metals (e.g., the punch-retention arms 14 and the die-retention arms 16 can all be formed of a second metal, or the punch-retention arms 14 can be formed of a second metal while the die-retention arms 16 are formed of a third metal). In some cases, the punch-retention arms 14 and the die-retention arms 16 are formed of the same material (e.g., steel), and the main body 12 is formed of a different material (e.g., beryllium, titanium, magnesium, or aluminum). In other cases, the punch-retention arms 14 are formed of a first material, the die-retention arms 16 are formed of a second material, and the main body 12 is formed of a third material (i.e., where the first, second, and third materials are all different from one another). In any embodiment described in this paragraph, the arms 14, 16 can be provided with a coating (of any type described below), while the main body is provided either with a different coating or no coating.

In some embodiments, the main body 12 comprises (e.g., is formed of) metal. The main body, for example, can advantageously be devoid of plastic (perhaps optimally, the entire cartridge has no plastic parts). In some cases, the main body 12 is formed of an aircraft metal. The aircraft metal can be selected from the group consisting of beryllium, titanium, magnesium, aluminum, and alloys comprising one or more of beryllium, titanium, magnesium, and aluminum. In some embodiments of this nature, steel is used to form the punch-retention arms 14 and/or the die-retention arms 16.

In one group of embodiments, the main body 12 is formed of a composite material. The composite material can optionally comprise carbon fiber. One useful composite is a ceramic composite, such as a Kevlar ceramic composite. In some cases, the composite material comprises at least one metal and at least one non-metal. In certain embodiments, the main body 12 comprises (e.g., is formed of) a composite, and the cartridge includes at least one removable/replaceable stripper locator base insert and/or one or more other removable/replaceable wear-reducing inserts (optionally one, two, or more removable inserts at a cartridge-to-rail attachment point).

The punch-retention arms 14 and die-retention arms 16 can advantageously comprise (e.g., be formed of) steel. The punch-retention arms are repeatedly engaged and disengaged with a punch, and the die-retention arms are repeatedly engaged and disengaged with a die. Therefore, these portions of the cartridge experience a high degree of wear. Accordingly, they are more prone to being damaged than other parts of the cartridge. To account for this, it is desirable to fabricate these arms of steel or another high strength and/or wear resistant metal.

In certain embodiments, the main body (or at least a portion thereof) is provided with a coating. The coating can be adapted to increase the surface hardness of the material from which the body 12 is formed and/or to otherwise help protect it against wear, corrosion, friction, sticking, and/or galling.

In one group of embodiments, at least a portion of the main body 12 is coated with a dry lubricant coating. The coating, for example, can comprise nickel (e.g., nickel alloy) and/or a low friction polymer. The coating can be applied over the main body (this is particularly advantageous when the main body comprises aluminum or another light weight metal) such that the resulting coated surface has one or more of the following features: (i) a coefficient of static friction below 0.35, below 0.3, or even below 0.2; (ii) a coefficient of dynamic friction below 0.3, below 0.25, below 0.18, or even below 0.1. Such coefficients can additionally or alternatively be provided on surfaces of the arms 14, 16 by using such a dry lubricating coating. Useful dry lubricant coatings are available, for example, from General Magnaplate Corporation (Linden, N.J., USA) and Poeton Industries, Ltd. (Gloucester, England). As one example, the main body 12 (i.e., all or a portion thereof) can be coated with a NEDOX® coating. NEDOX® coatings can be provided to increase the wearlife of the main body and/or to provide a nonbonding surface that reduces buildup of materials. NEDOX® coatings can also be provided to create a smooth and slippery surface, which can help reduce friction.

In other embodiments, the main body 12 (i.e., all or a portion thereof) is coated with a coating comprising aluminum (e.g., aluminum oxide) and/or fluorocarbon polymers, such as a hard anodized composite coating. In some cases, the coating is a TUFRAM® coating. These coatings can be particularly advantageous when the main body 12 comprises aluminum or an aluminum alloy. These coatings, for example, can be provided to increase surface hardness and/or to prevent abrasive wear and galling. These coatings are also self-lubricating so they can reduce friction. TUFRAM® coatings are available from General Magnaplate Corporation as well.

In some embodiments, the main body 12 of the cartridge 10 is provided with a surface treatment. For example, the main body 12 can optionally comprise aluminum that has been anodized. Anodizing is an electrochemical process that converts the surface of raw aluminum to an oxide coating. Anodizing enhances the abrasion resistance and corrosion resistance of the aluminum surface.

In other embodiments, the cartridge's main body is provided with a coating comprising a nitride and/or a carbide. One commercially available nitride coating is the Nitrex® coating, which is a high endurance surface enhancement available from Nitrex, Inc. (Aurora, Ill., USA). Nitrex surface enhancements impart lubricity characteristics in a metal surface to significantly lower the friction coefficients of the surface. This surface treatment can be provided, for example, to increase durability and/or to reduce galling. Particularly useful nitriding and nitrocarburizing enhancements are described in U.S. Pat. No. 6,327,884, the entire teachings of which are incorporated herein by reference.

Thus, various coatings and/or surface treatments can be provided on the main body of the cartridge. Additionally or alternatively, the punch-retention arms 14 and/or the die-retention arms 16 can be provided with a coating or surface treatment. The coating or surface treatment can be any one of those already described with reference to the main body. It is particularly desirable, for example, to provide a coating (e.g., a dry lubricant coating) or surface treatment that reduces friction between the punch-retention arms and the punch, and/or between the die-retention arms and the die. Friction between these components is caused by repeated engagement and disengagement of the punch with the punch-retention arms and of the die with the die-retention arms.

In certain embodiments, a coating and/or surface treatment is provided on the main body 12 but not on the punch-retention arms 14 or the die-retention arms 16 (e.g., the main body 12 can be coated while the arms 14, 16 are uncoated). Alternatively (and perhaps more preferably), the punch-retention arms 14 and the die-retention arms 16 are provided with a coating and/or surface treatment that is not provided on the main body 12 (e.g., the arms 14, 16 can be coated while the main body 12 is uncoated). In some cases, the main body 12 and the punch-retention arms 14 are both provided with coating and/or surface treatment, but the main body has a different coating and/or surface treatment than the punch-retention arms 14. For example, the main body 12 can optionally comprise anodized aluminum and the punch-retention arms 14 can have a high hardness coating and/or a dry lubricating coating.

In some embodiments, the stripper locator base 18 and/or the rail-engagement portion 22 are provided with coating(s). The stripper locator base is repeatedly engaged and disengaged with a stripper plate. Likewise, the rail-engagement portion is repeatedly engaged with a rail (and/or a guidance system). Thus, friction is created between these components, and providing a friction-reducing coating on one or both of these components can help reduce wear and tear on the coated portions.

Figure 5:
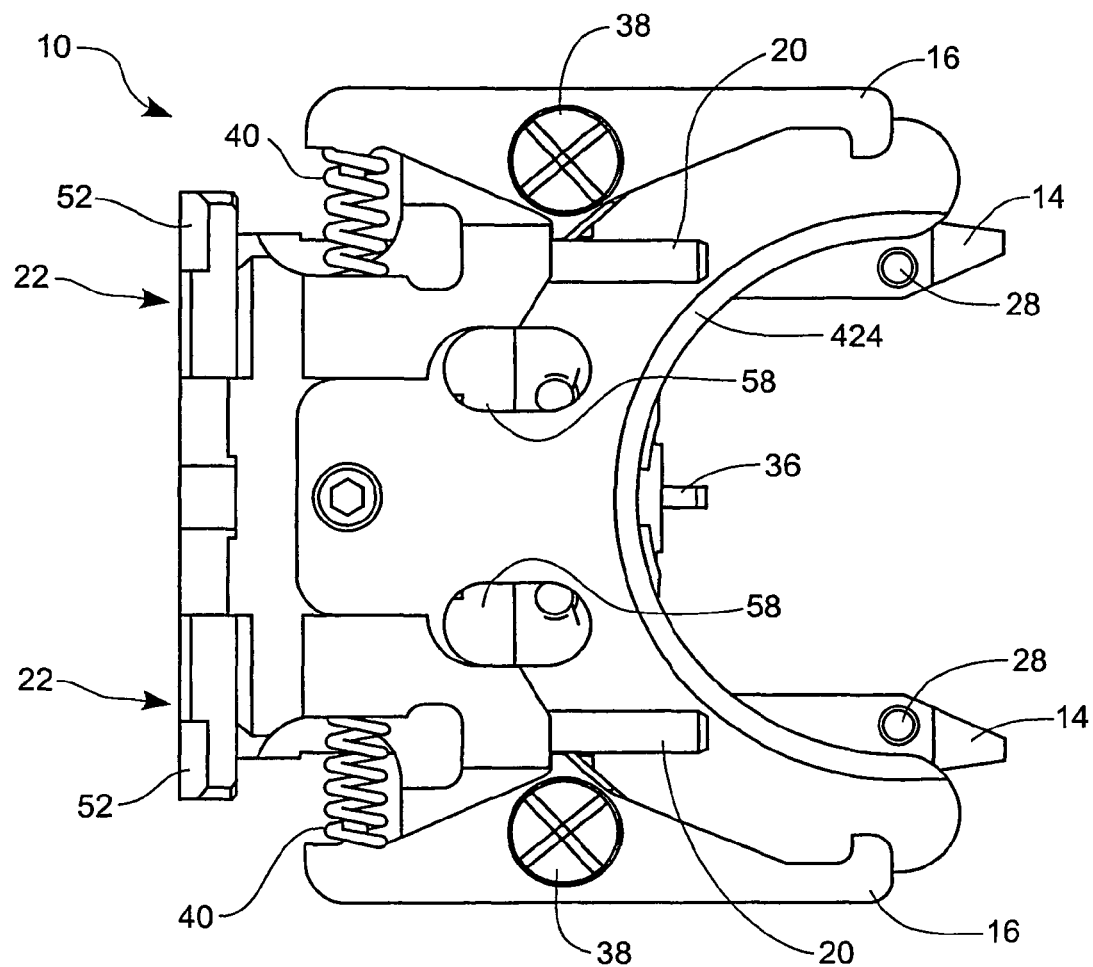
FIG. 5 is a bottom side view of the cartridge illustrated in FIG. 1.
Figure 6:
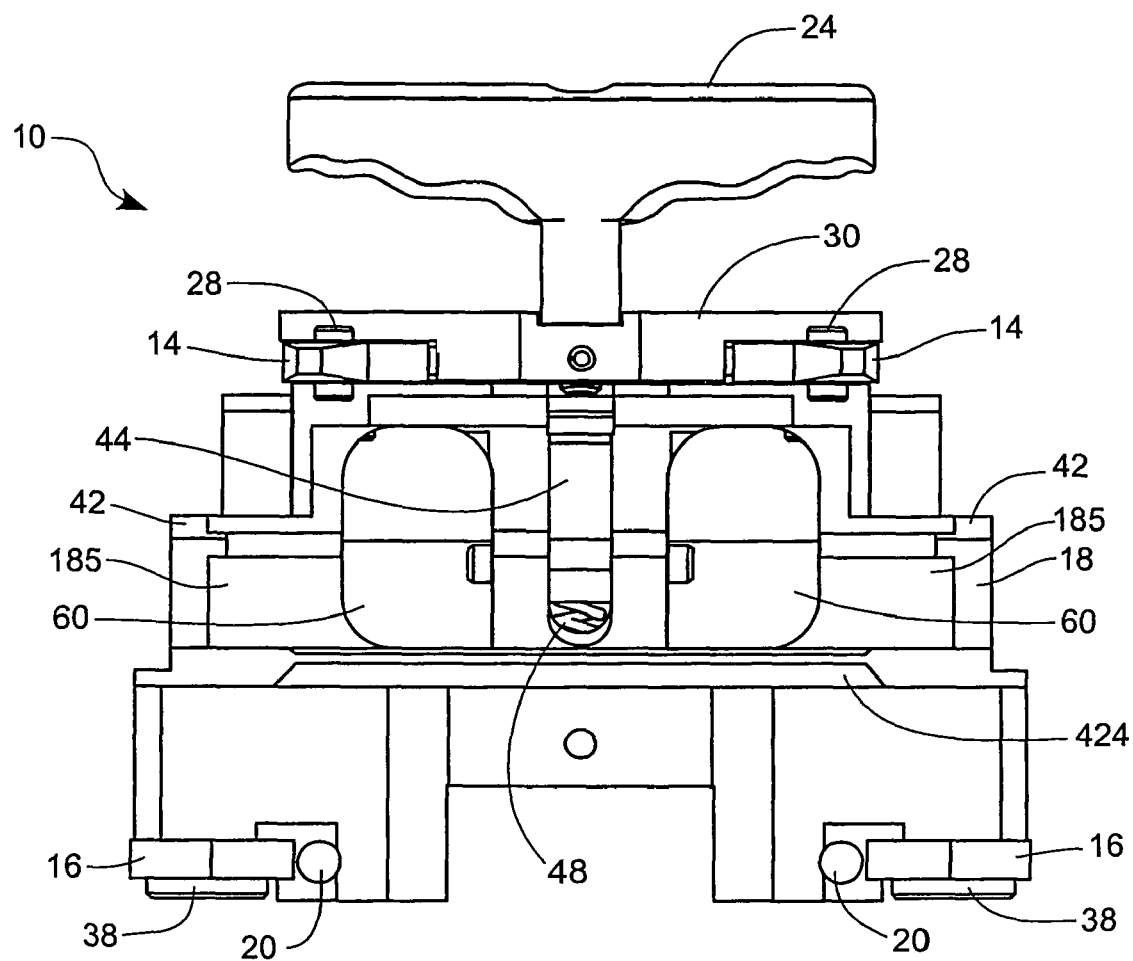
FIG. 6 is a front side view of the cartridge illustrated in FIG. 1.
Figure 7:
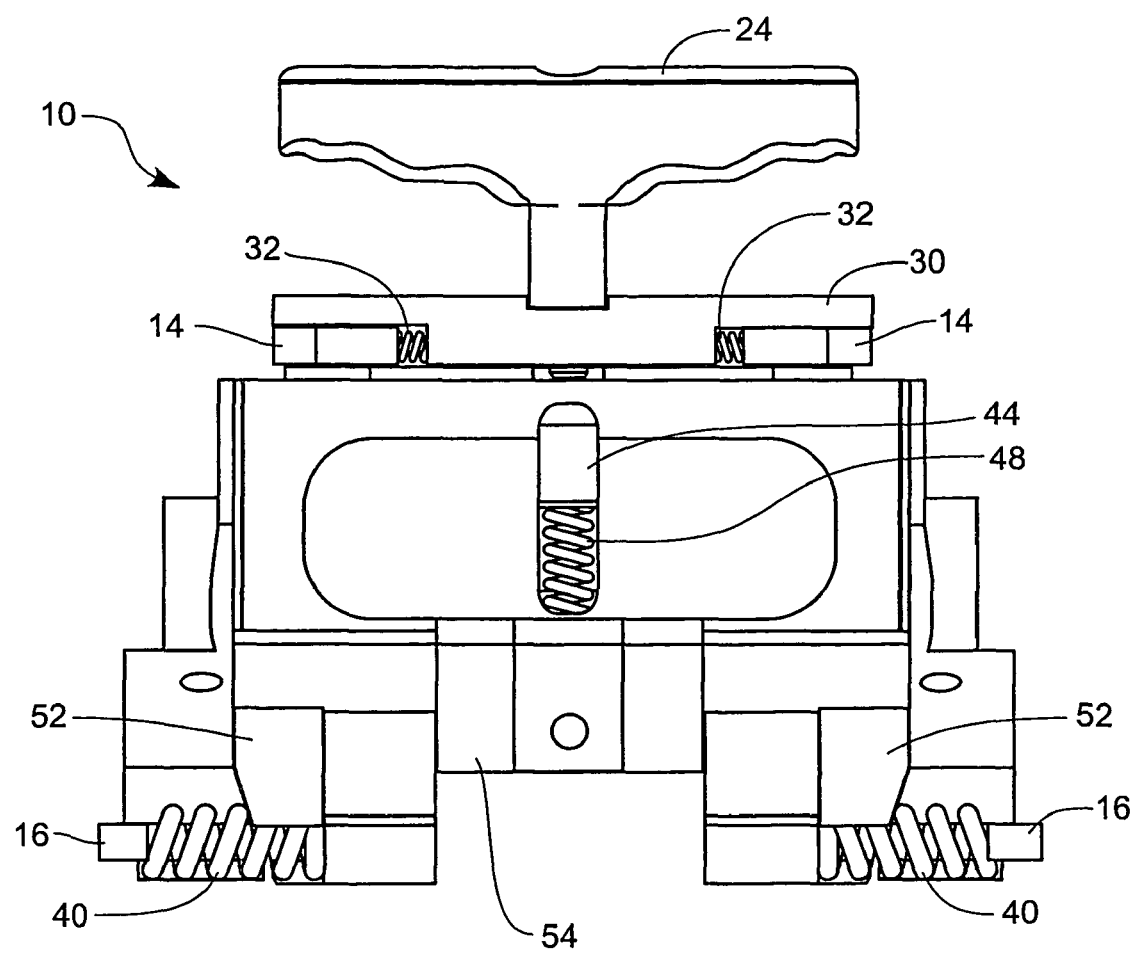
FIG. 7 is a back side view of the cartridge illustrated in FIG. 1.
Figure 8:
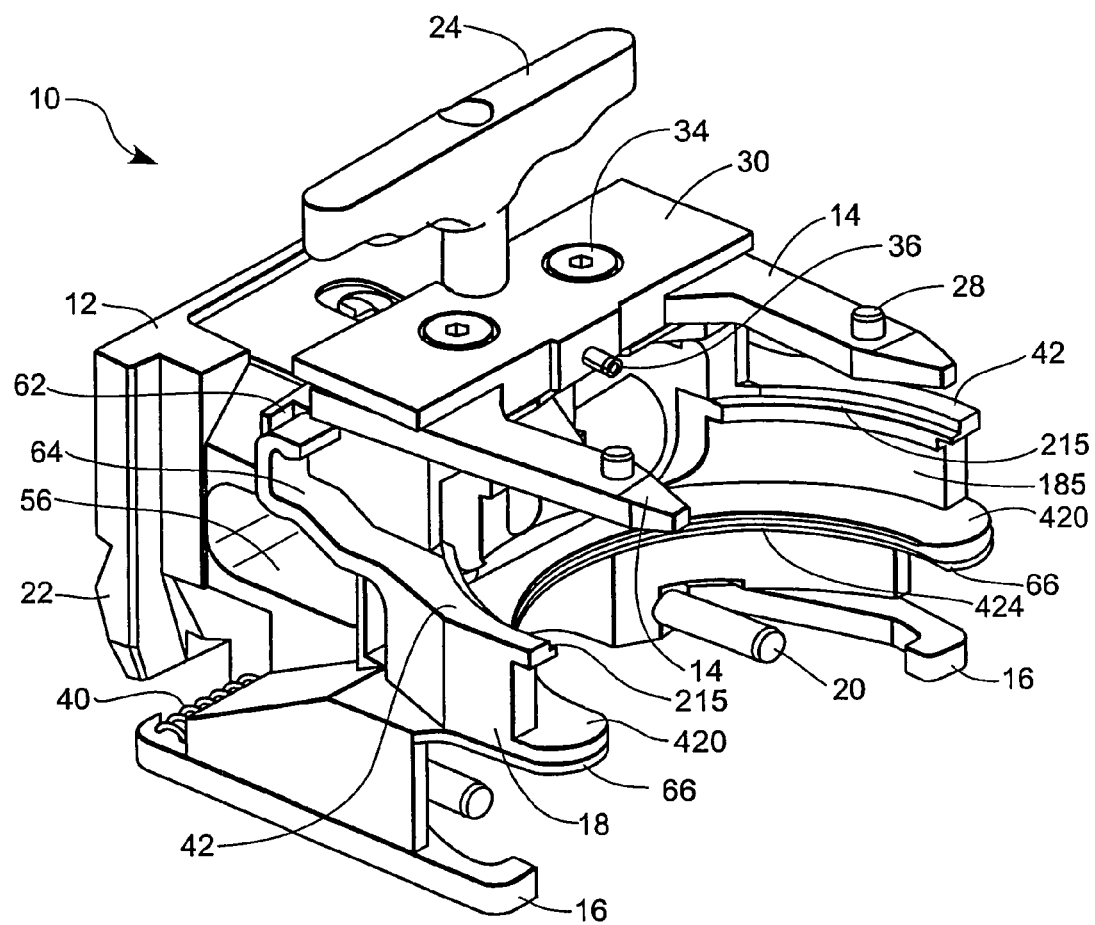
FIG. 8 is a perspective view of a cartridge according to a second embodiment of the invention.
Figure 9:
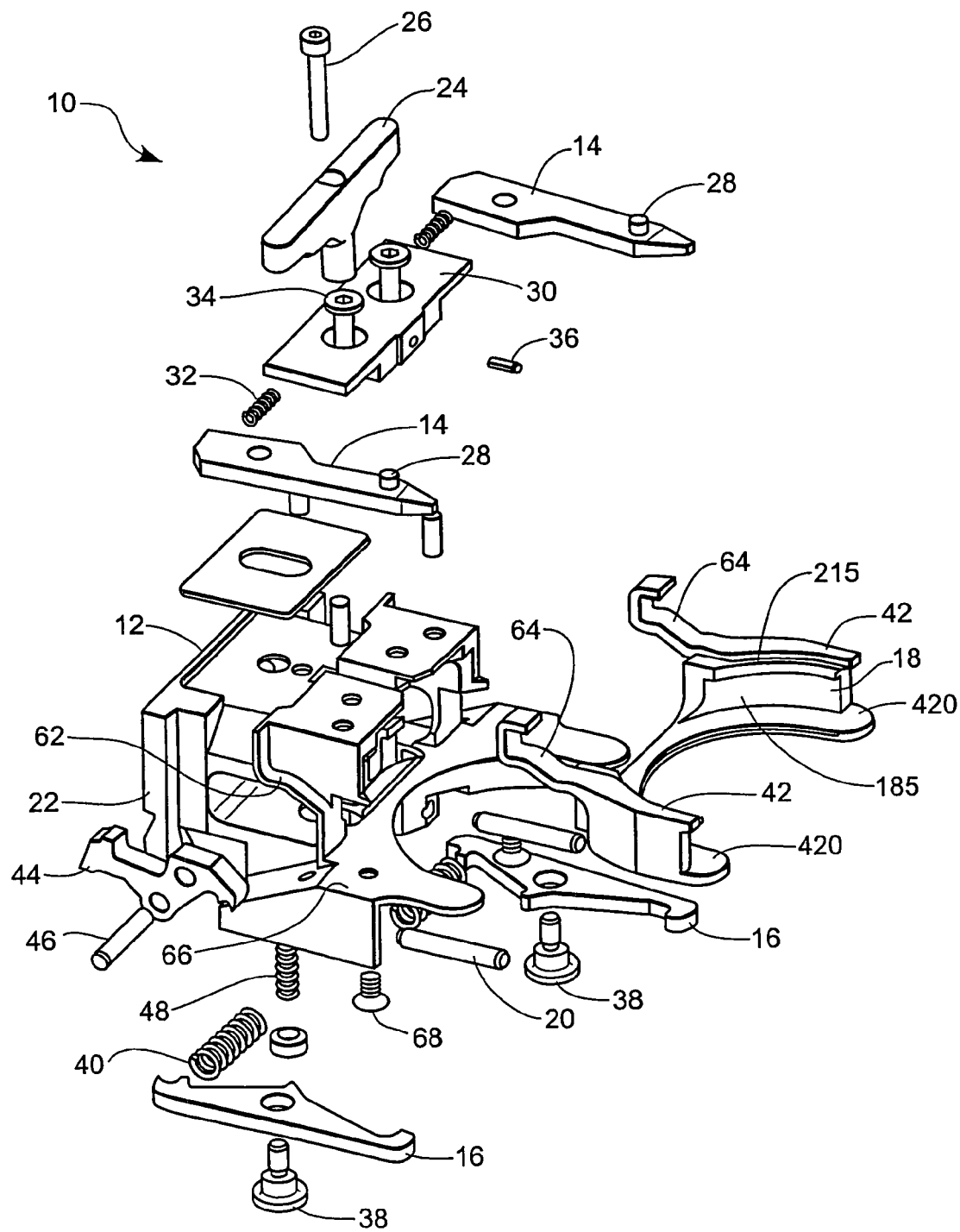
FIG. 9 is an exploded view of the cartridge illustrated in FIG. 8.
Figure 10:
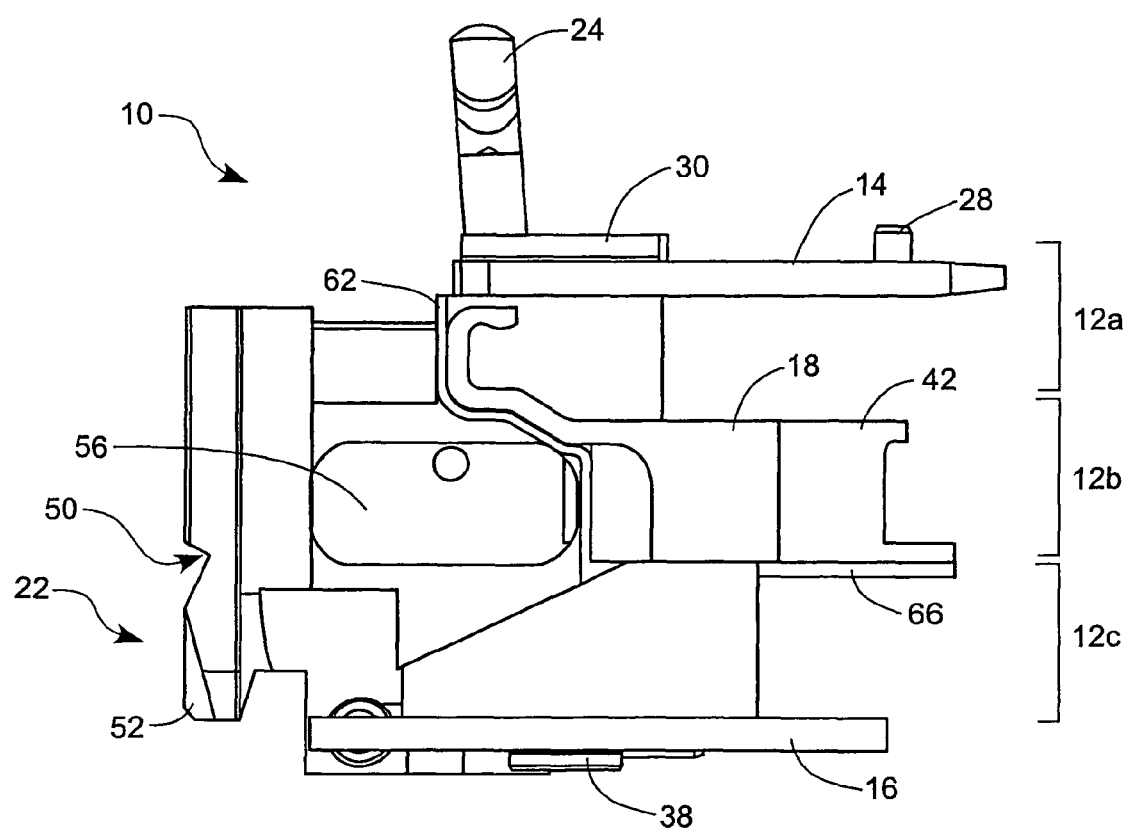
FIG. 10 is a right side view of the cartridge illustrated in FIG. 8.
Figure 10A:
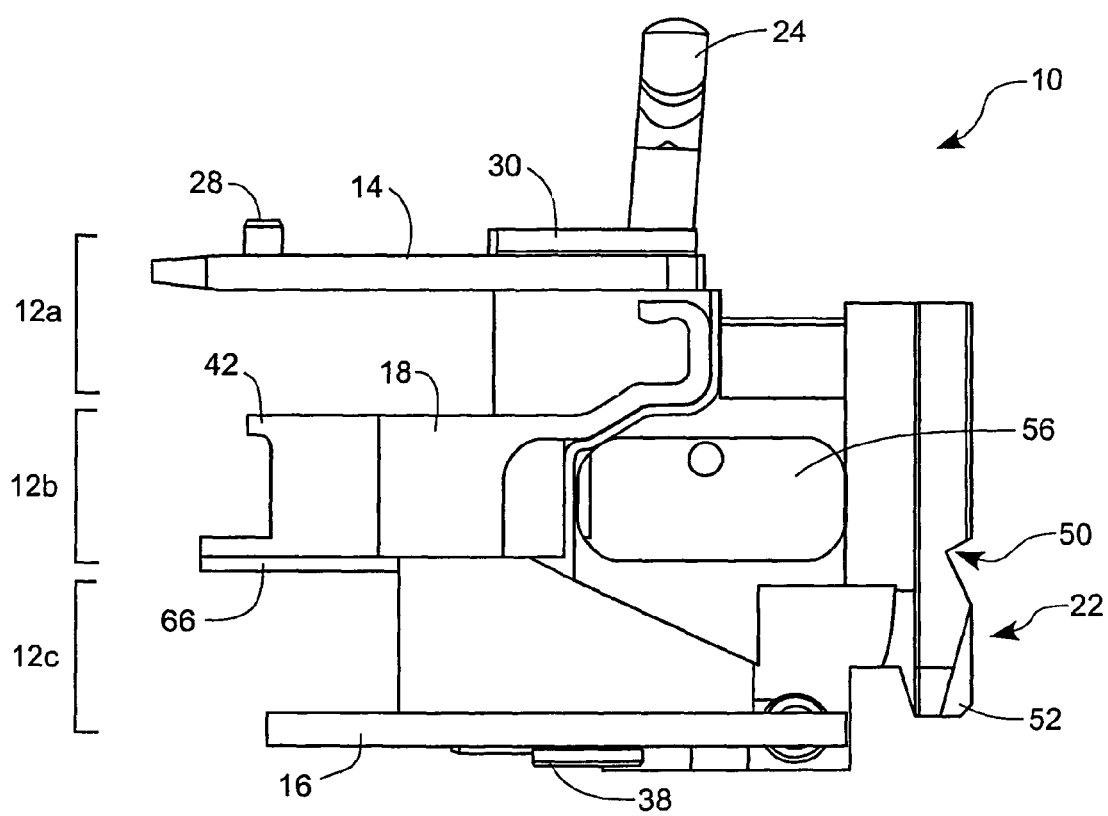
FIG. 10A is a left side view of the cartridge illustrated in FIG. 8.
Figure 11:
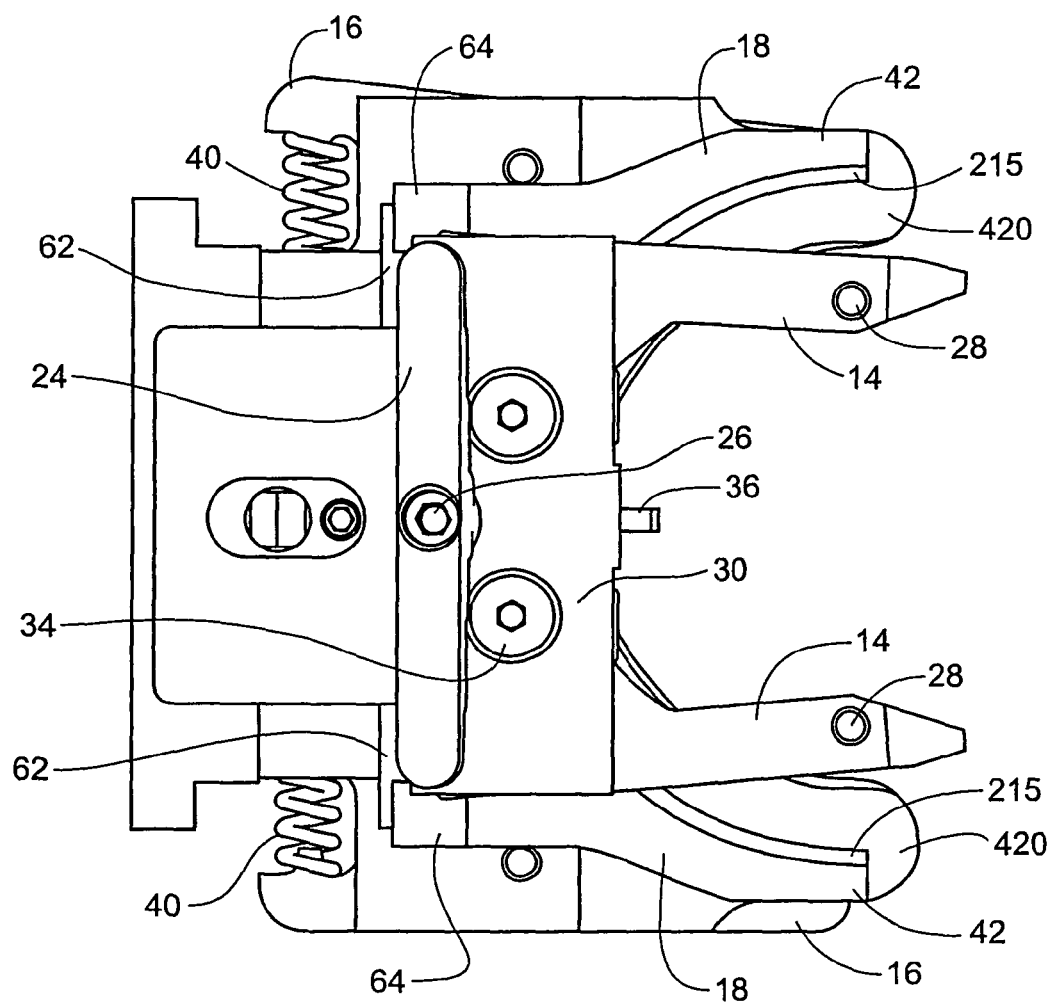
FIG. 11 is a top side view of the cartridge illustrated in FIG. 8.
Figure 12:
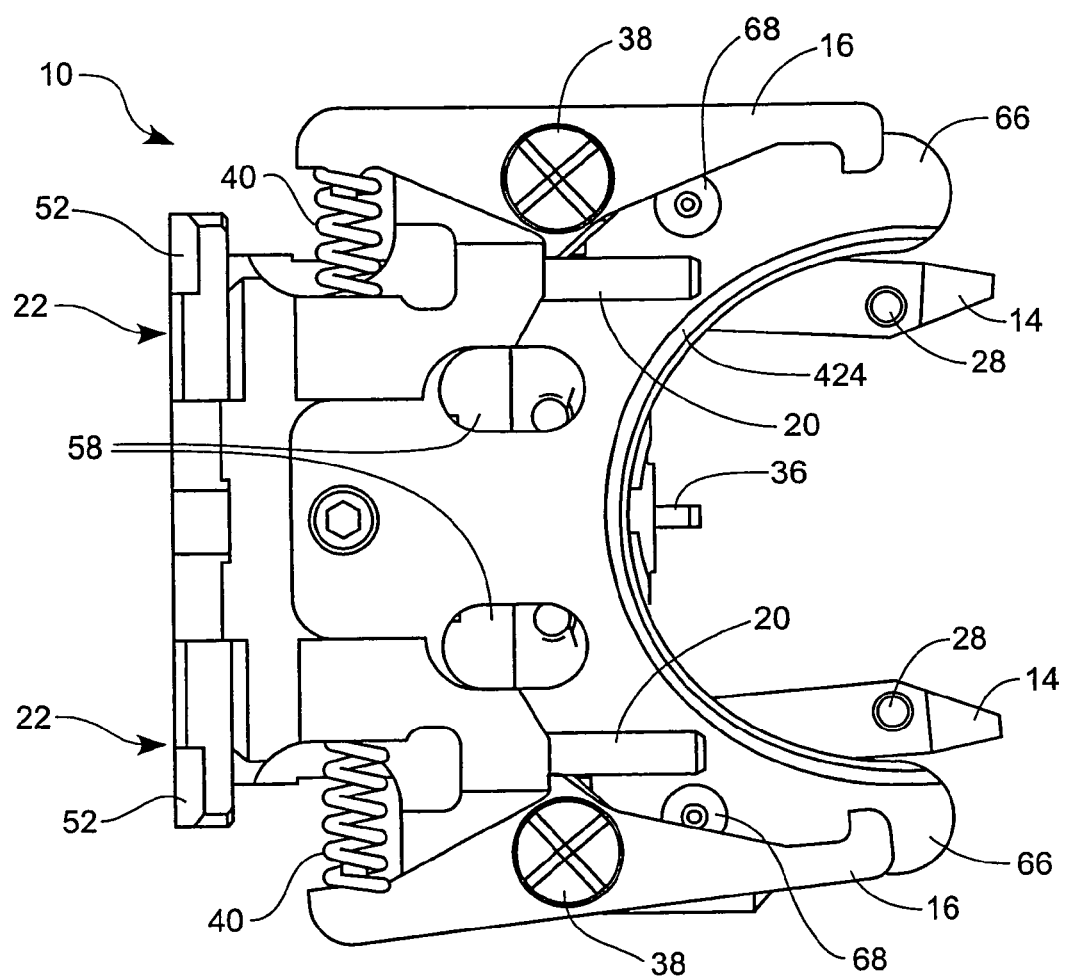
FIG. 12 is a bottom side view of the cartridge illustrated in FIG. 8.
Figure 13:
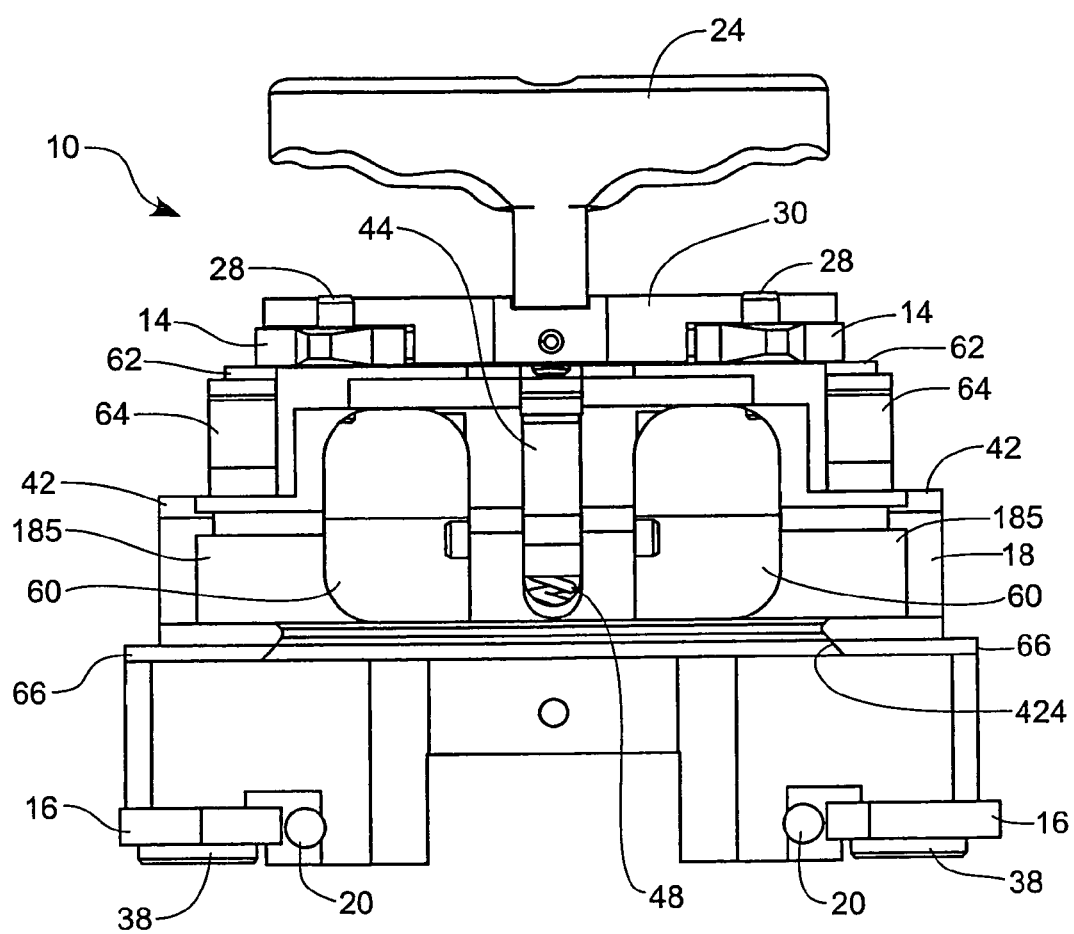
FIG. 13 is a front side view of the cartridge illustrated in FIG. 8.
Figure 14:
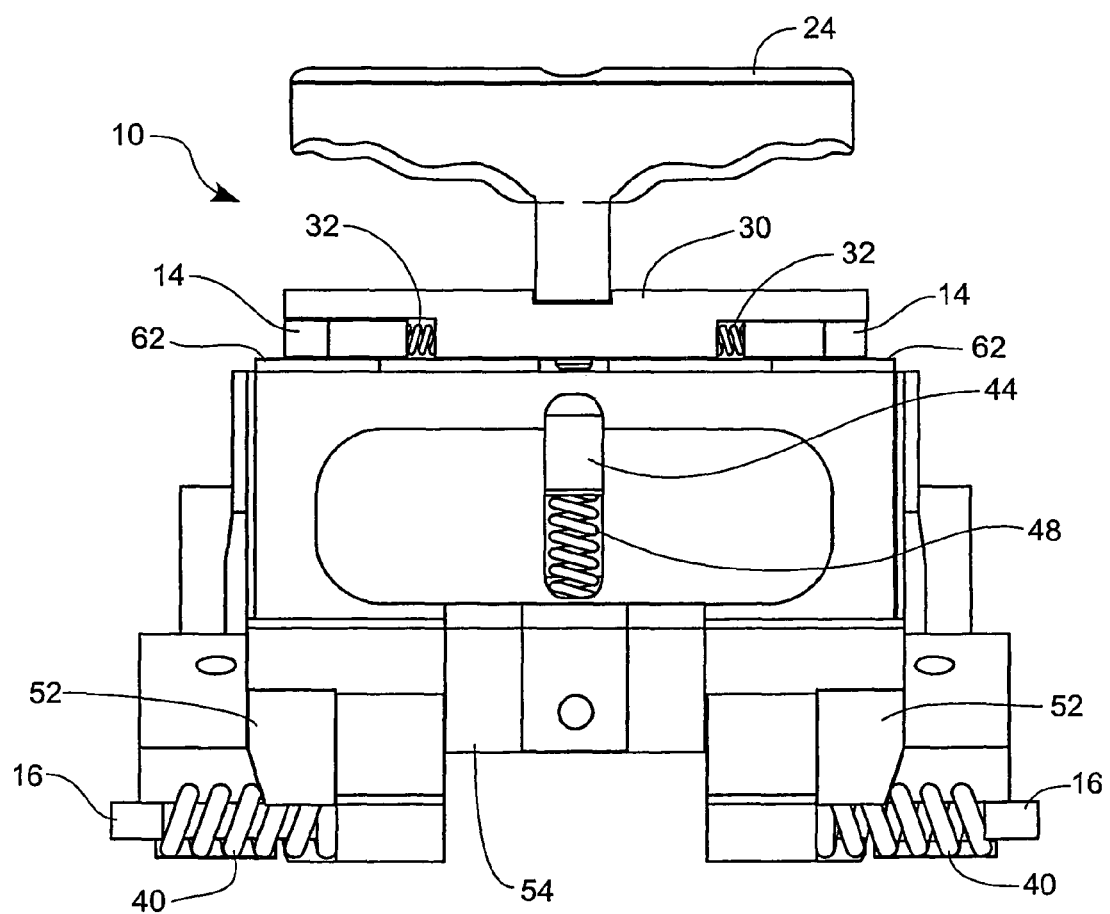
FIG. 14 is a back side view of the cartridge illustrated in FIG. 8.
Figure 15:
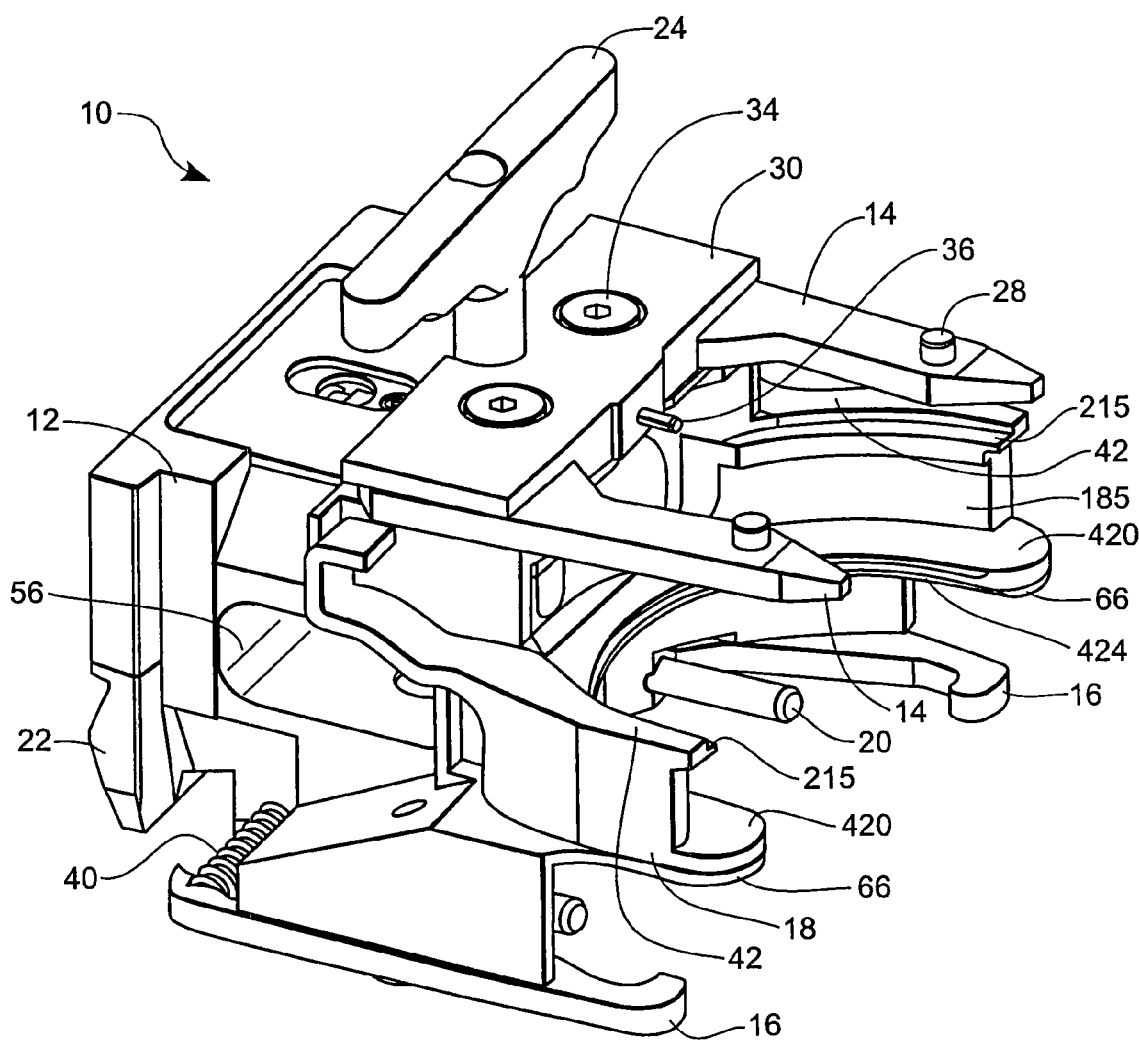
FIG. 15 is a perspective view of a cartridge according to a third embodiment of the invention.
Figure 16:
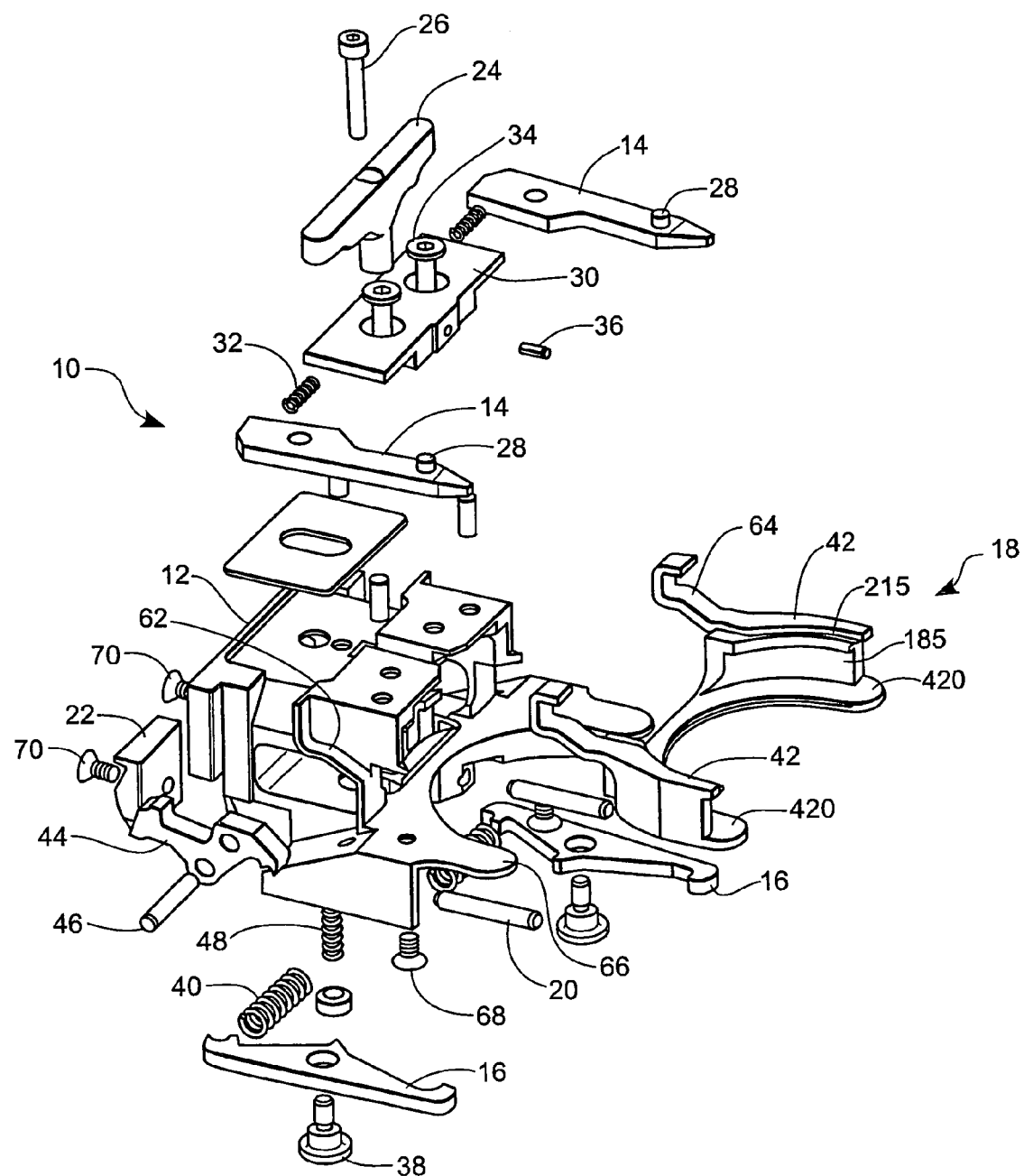
FIG. 16 is an exploded view of the cartridge illustrated in FIG. 15.
Figure 17:
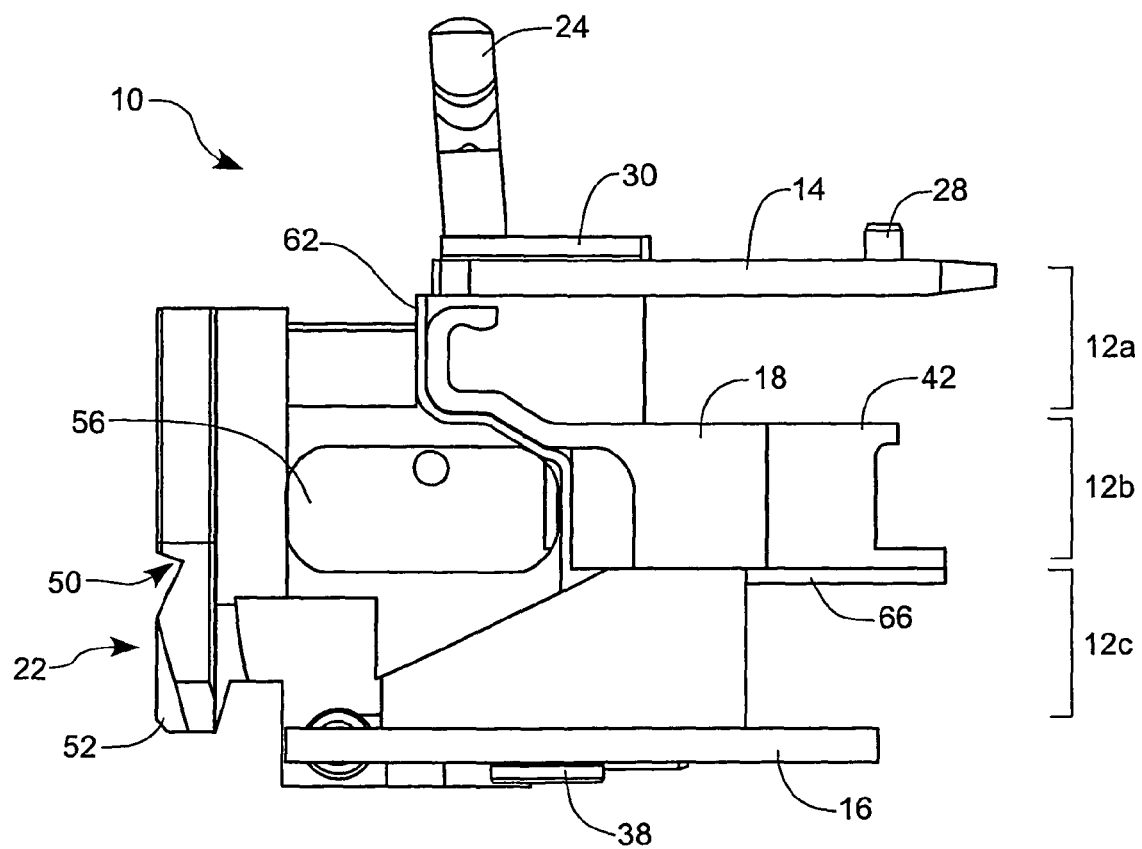
FIG. 17 is a right side view of the cartridge illustrated in FIG. 15.
Figure 17A:
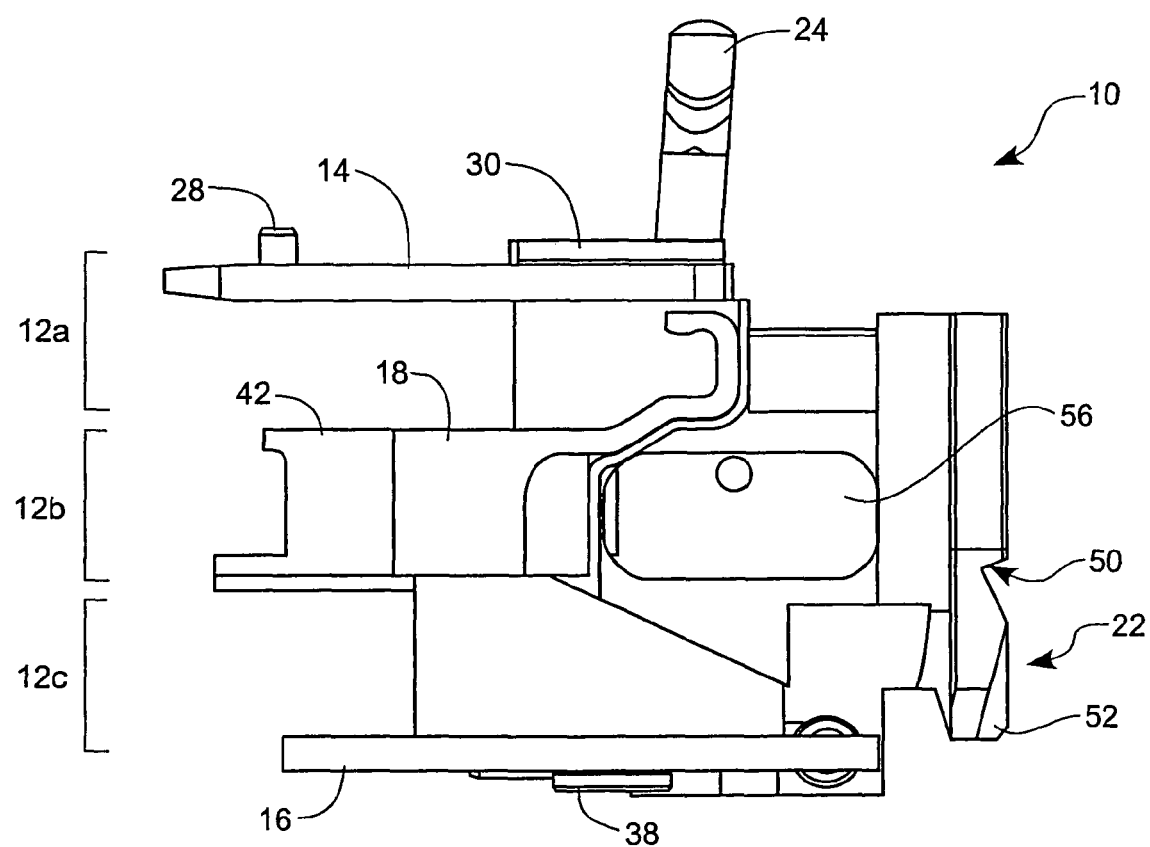
FIG. 17A is a left side view of the cartridge illustrated in FIG. 15.
Figure 18:
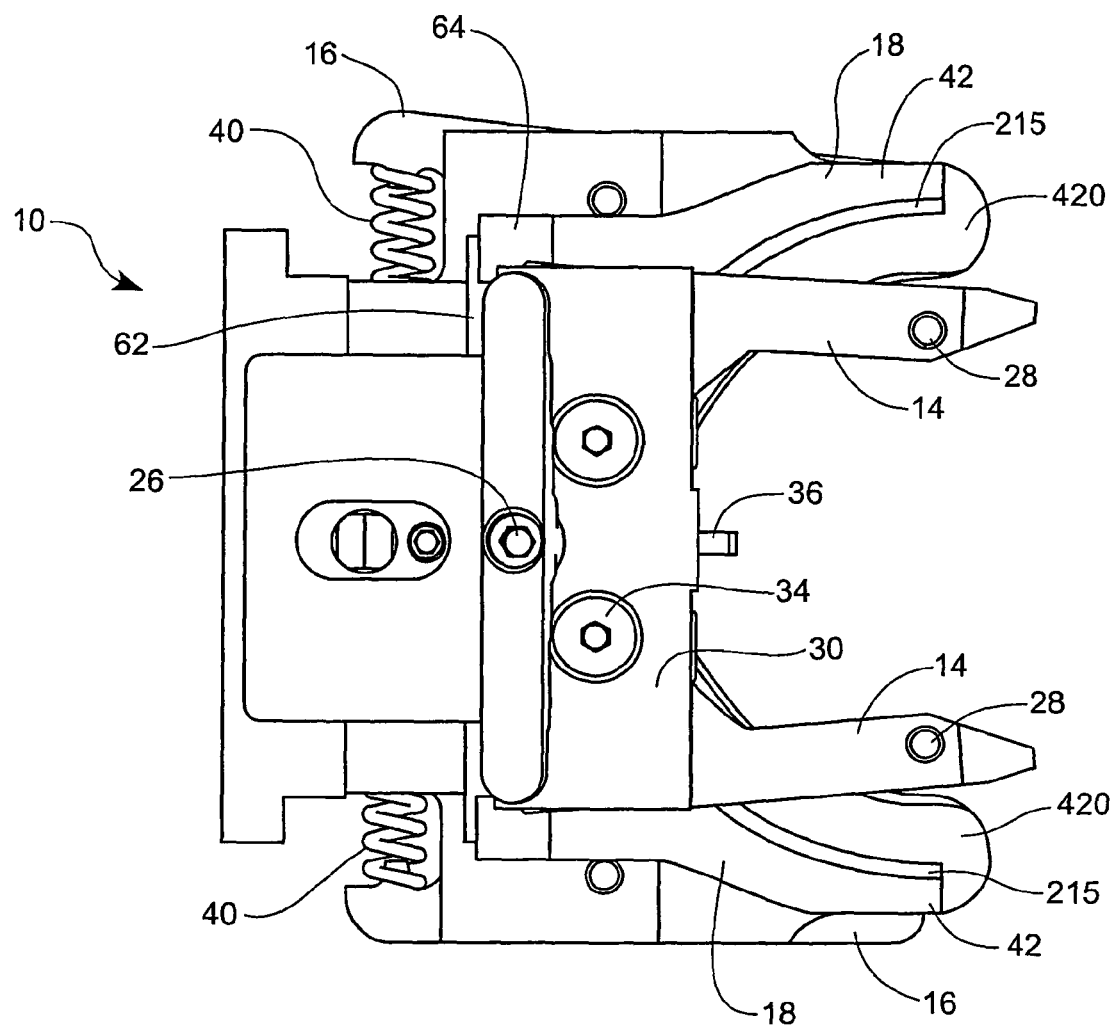
FIG. 18 is a top side view of the cartridge illustrated in FIG. 15.
Figure 19:
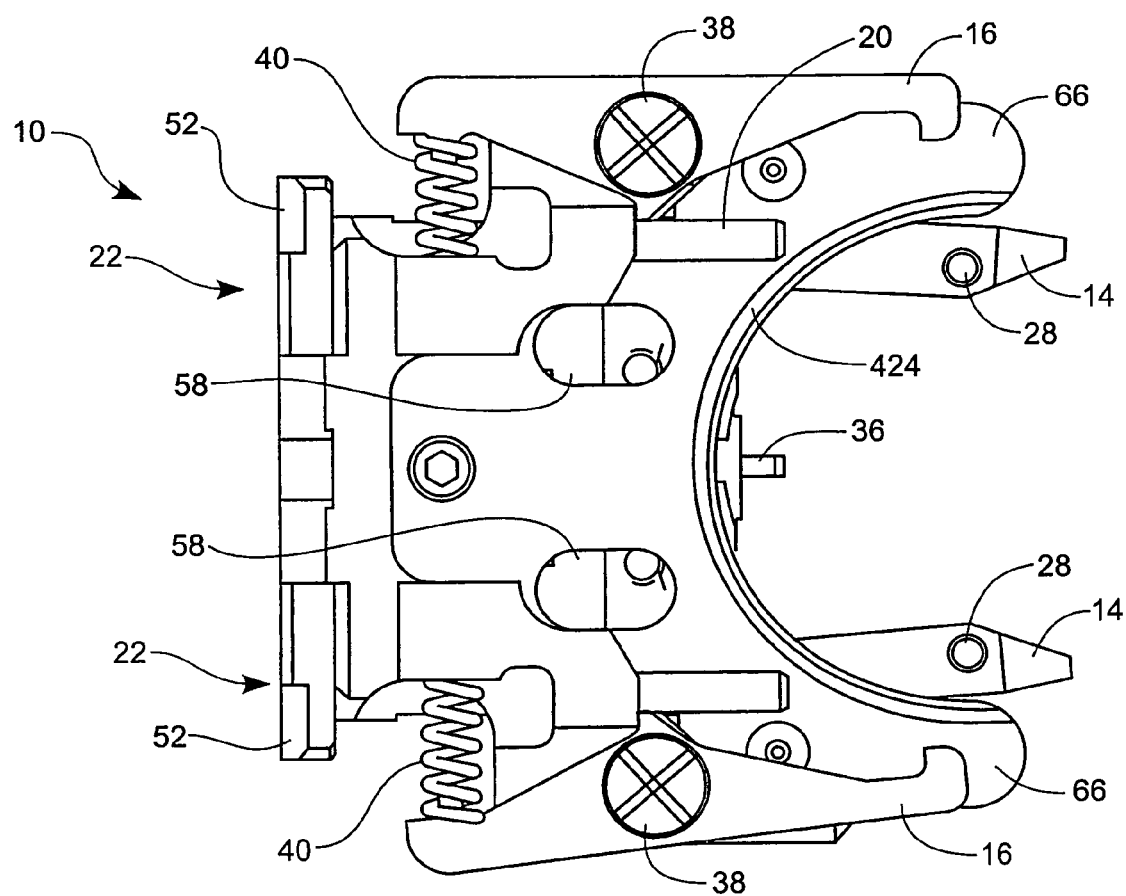
FIG. 19 is a bottom side view of the cartridge illustrated in FIG. 15.
Figure 20:
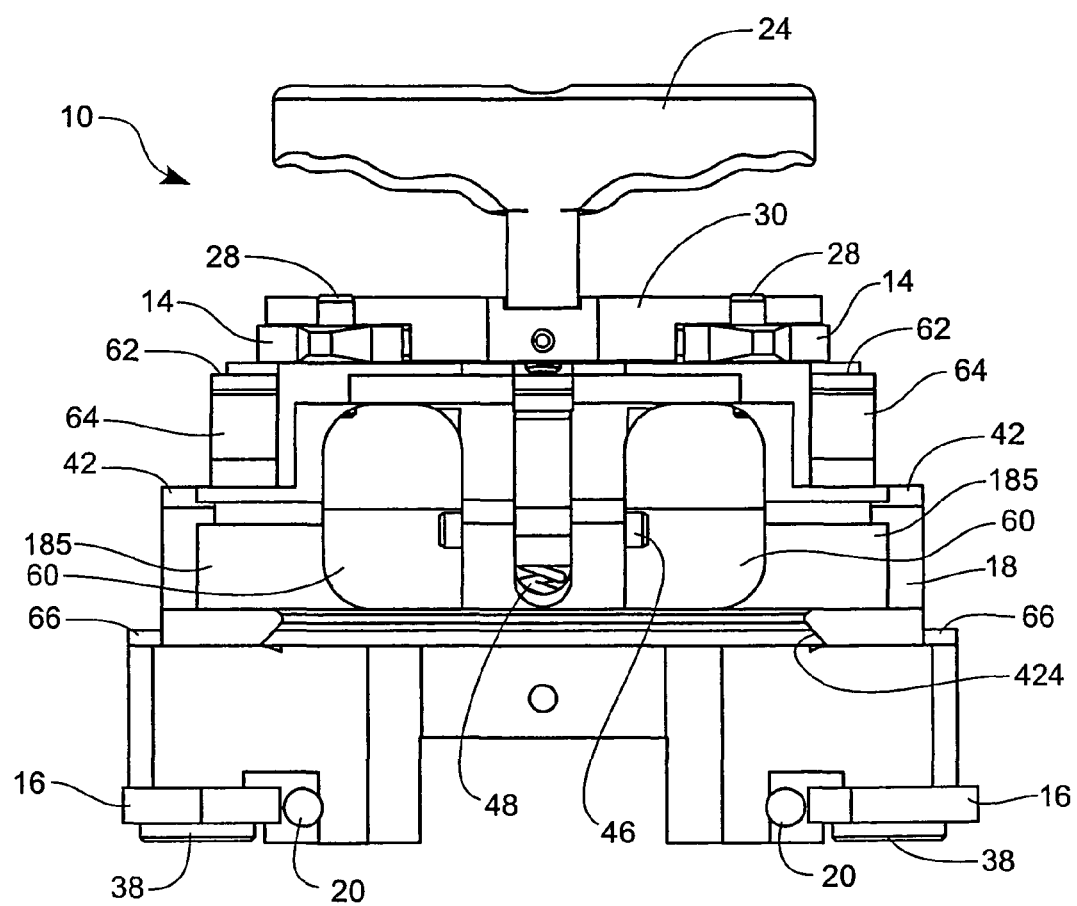
FIG. 20 is a front side view of the cartridge illustrated in FIG. 15.
Figure 21:
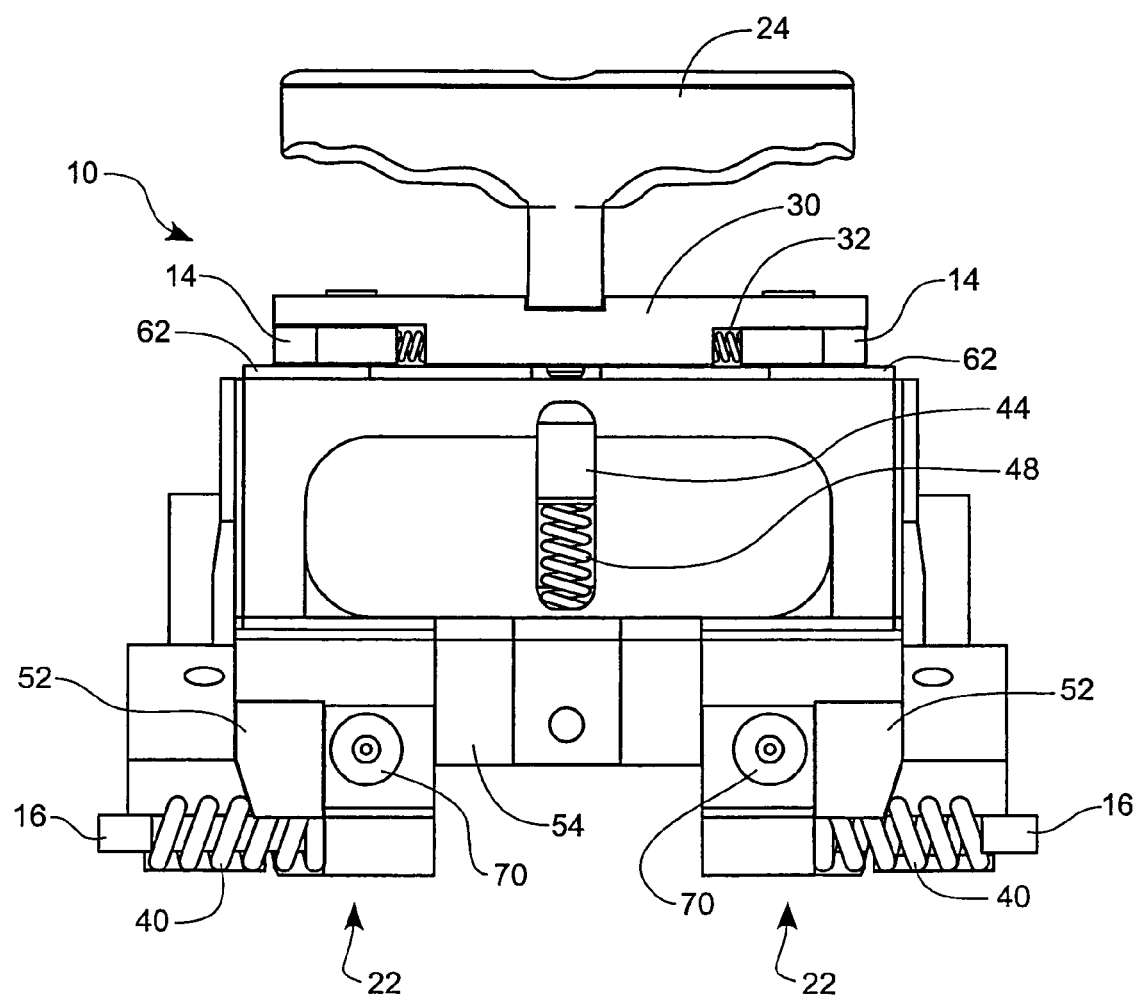
FIG. 21 is a back side view of the cartridge illustrated in FIG. 15.

One group of embodiments provides the cartridge in a particularly high durability, low weight configuration. Here, the main body 12 comprises (e.g., is formed of) a metal, optionally an aircraft metal. The main body has been shaped so as to achieve a surprising combination of low weight and durability. In these embodiments, the cartridge's main body can be (e.g., one or more of a bottom side, a front side, and each lateral side can be) provided with, for example, one or more pockets and/or openings that reduce the weight of the cartridge. This can be done in many different ways in keeping with the present embodiments. For example, each lateral side of the cartridge can be provided with at least one side pocket 56 (as best illustrated in FIGS. 1, 3, 8, 10, 15, and 17). Additionally or alternatively, the bottom of the cartridge can be provided with at least one bottom opening 58 (as best illustrated in FIGS. 5, 12, and 19). Further, the front of the cartridge can be provided with at least one front pocket 60 (as best illustrated in FIGS. 6, 13, and 20). In the illustrated pocket/opening embodiment, each of the front, side, and bottom pockets/openings 56, 58, 60 communicates with at least two of the others, such that when a person looks into one of these pockets/openings, they can see out at least two of the others. The illustrated design also includes a large back pocket, which is adjacent the rail-engagement portion 22. This illustrated pocket can optionally have a major dimension (e.g., a width) of at least two inches, at least 2.5 inches, or even 2.75 inches, and/or a minor dimension (e.g., a height) of at least 0.5 inch, at least 0.75 inch, or even at least 0.9 inch, and/or a depth of at least ⅛ inch, at least ¼ inch, or even at least ⅓ inch. In some embodiments, one or more of the pockets noted above has a depth greater than ½ inch, greater than ¾ inch, or even greater than 0.8 inch. Although the illustrated embodiment involves pockets/openings on the front, sides, bottom, and rear of the cartridge, other types of pockets/openings can additionally or alternatively be provided. The illustrated design achieves surprisingly low weight while at the same time providing excellent rigidity and exceptional agility, which is perhaps best appreciated by actually using the cartridge on a machine tool.

With reference to Table 1 below, the weights of seven different cartridges are provided. The tabulated weight is for the fully assembled (but unloaded—that is, not carrying a tool set) cartridge. Cartridge 1 is a conventional cast iron cartridge. This cartridge has a weight of 5.50 pounds. Cartridge 7 is a conventional plastic cartridge. This cartridge has a weight of 1.50 pounds. Cartridge 2 is a cartridge in accordance with certain embodiments of the present invention. It includes an aluminum main body (having the pockets/openings shown), and the stripper locator base and rail-engagement portions are integral to the main body. The punch-retention arms and die-retention arms are formed of steel, and they are removably attached to the main body in the manner shown and described above. Cartridge 3 is another cartridge in accordance with certain embodiments of the invention. Here, the cartridge has an aluminum main body, the rail-attachment portion is integral to the main body, and the stripper locator base is removably attached to the main body. The stripper locator base here is formed of steel, although the cartridge's weight can be further reduced by alternatively using an aircraft metal (or a non-metallic material with a high strength-to-weight ratio). Here again, the punch-retention arms and die-retention arms are formed of steel, and they are removably attached to the main body in the manner shown and described above. Cartridge 4 is yet another embodiment of the invention. This cartridge has an aluminum main body, and both the stripper locator base and the rail-engagement portion are removably attached to the main body. In this embodiment, the stripper locator base and rail-engagement inserts are formed of steel, although the cartridge's weight can be further reduced by alternatively using an aircraft metal (or a non-metallic material with a high strength-to-weight ratio). Here too, the punch-retention arms and the die-retention arms are formed of steel, and they are removably attached to the main body in the manner shown and described above. Cartridge 5 is yet another embodiment. This cartridge is similar to Cartridge 3 except that the main body is formed of carbon fiber rather than aluminum. The carbon fiber can alternatively be replaced with another non-metallic and/or composite material having a high strength-to-weight ratio. The reported weight here reflects steel being used for the arms 14, 16 and for the removable stripper locator base, although this is by no means required. Cartridge 6 is similar to Cartridge 4 except that the main body is formed of carbon fiber rather than aluminum. The carbon fiber can alternatively be replaced with another non-metallic material having a high strength-to-weight ratio. The reported weight here reflects steel being used for the arms 14, 16, for the removable stripper locator base, and for the removable rail-engagement inserts.

| Cartridge No. | Cartridge weight (lbs) | Difference compared to plastic | % heavier than plastic |
| --- | --- | --- | --- |
| 1 | 5.50 | 4 | 267% |
| 2 | 1.95 | 0.45 | 30% |
| 3 | 2.25 | 0.75 | 50% |
| 4 | 2.55 | 1.05 | 70% |
| 5 | 1.89 | 0.39 | 26% |
| 6 | 2.22 | 0.72 | 48% |
| 7 | 1.50 | 0 | 0% |

Each cartridge of the tabulated embodiments (Cartridges 2-6) has a weight of less than 3 pounds, which is far less than the 5.50 pound weight of the conventional cast iron cartridge (Cartridge 1). The use of a lighter metal (e.g., aluminum) or non-metal (e.g., carbon fiber), and the provision of pockets/openings, all help to reduce the weight of the cartridge. The weight here is surprisingly close to that of the conventional plastic cartridge. Thus, one or more (e.g., all of) the parts prone to breakage (e.g., the arms, stripper locator base, and rail-engagement inserts) can optionally be formed of a more durable metal, such as steel, while keeping the overall weight of the cartridge under 3 pounds. Also, various coatings and/or surface treatments can be applied to the lighter main body to increase its surface hardness and/or to reduce its coefficients of friction. Thus, in certain embodiments, the invention provides a cartridge having a weight of less than 3 pounds, less than 2.75 pounds, less than 2.5 pounds, less than 2.25 pounds, or even less than 2.0 pounds. Conjointly, the weight can optionally be greater than 1 pound, greater than 1.25 pounds, greater than 1.5 pounds, or even greater than 1.75 pounds. A reduction in weight facilitates moving the cartridge with the necessary accelerations while at the same time reducing wear and tear on the machine tool.

In addition to the embodiments described above, the invention provides several groups of embodiments involving a cartridge 10 having an information storage device 500. In these embodiments, any one or more of a variety of electronic information storage devices can be used. For example, the device 500 can comprise a memory device, optionally selected from the group consisting of a radio frequency identification device (commonly comprising an antenna, a silicon chip or other substrate, and optionally a power source), a microchip (or "integrated circuit," optionally a monolithic integrated circuit), and a flash memory device. Useful radio frequency identification devices (e.g., RFID tags) and related hardware are available commercially from Automated Assembly Corporation, Lakeville, Minn., USA, Alien Technology Corporation, Morgan Hill, Calif., USA, and Maxim Integrated Products, Inc., Sunnyvale, Calif., USA. Useful microchip devices include microchips like the commercially available iButton microchip, which is sold by Maxim Integrated Products. In some embodiments involving a microchip, the chip is a leadless chip. Useful flash memory devices are commercially available from the Intel company of Santa Clara, Calif., USA. Preferably, when the device 500 includes a flash memory device, a compact flash memory device, such as the commercially available SD, SanDisk devices (sold by SanDisk, Inc., Milpitas, Calif., USA), is used, optionally in conjunction with a data collection module, such as those sold by Triangle Digital Support (Houston, Tex., USA).

The device 500 can be a contact or non-contact device. It can be adapted for wireless or plug-enabled communication. In one group of embodiments, the cartridge includes at least one information storage device ("ISD") 500 adapted for wireless communication. In certain embodiments, the device 500 has at least one information-transfer port, such as one or more digital or analog ports. In certain embodiments, the device 500 includes at least one USB port. Further, the device 500 can be an active (including "semi-active") device or a passive device. With active device embodiments, the device 500 includes at least one battery or other power source. Inactive devices do not have a battery or other power source. However, they typically can be energized by radiation received from a reader/writer device.

In the present smart cartridge embodiments, the cartridge itself can be of any desired design. In some preferred embodiments, the cartridge is a light-weight, high-durability design, as taught above. For example, the smart cartridge can have a main body formed of aluminum or another aircraft metal. In other embodiments, the smart cartridge has a main body formed of a conventional plastic or cast iron material. In still other embodiments, the smart cartridge has a main body formed of a composite, e.g., of any type noted above. More generally, the cartridge 10 on which the information storage device 500 is provided can have the features of any embodiment described in the present disclosure. Further, it is to be understood that the embodiments described above in the first part of this disclosure need not have any information storage device. Any one of those embodiments, however, can optionally be provided with one or more information storage devices 500 so as to produce a smart cartridge.

Preferably, the electronic information storage device 500 facilitates interaction (e.g., signal transmission) between the cartridge 10 and a reader (optionally a reader/writer), machine controls, and/or off-machine readable devices, including storage and retrieval equipment, robotics, tool presetting fixtures (such as the tool presetting devices noted below), grinding and sharpening equipment (such as the tool grinding machines noted below), software to read the information into readable devices and/or integrate into equipment programming software and equipment programming controllers and/or operational system architecture such as ERP systems and integrated manufacturing systems.

Thus, the present embodiments provide a tool set holder cartridge for a machine tool, where the cartridge has an information storage device, which preferably is readable and writeable. In certain embodiments, the device 500 is also adapted for having at least some of its stored information erased electrically, e.g., such that more information can be written (or "programmed") to the device due to the increased information storage capacity that results from such erasure. In some particular embodiments (e.g., those involving a flash memory device), the device can be written to ("programmed") and/or erased in blocks of multiple locations (e.g., such that less than the entire memory of the device can be erased, and optionally reprogrammed, electrically).

Preferably, the information storage device is mounted on a desired wall of the cartridge. Several exemplary smart cartridge embodiments are shown in FIGS. 26-33.

Figure 26:
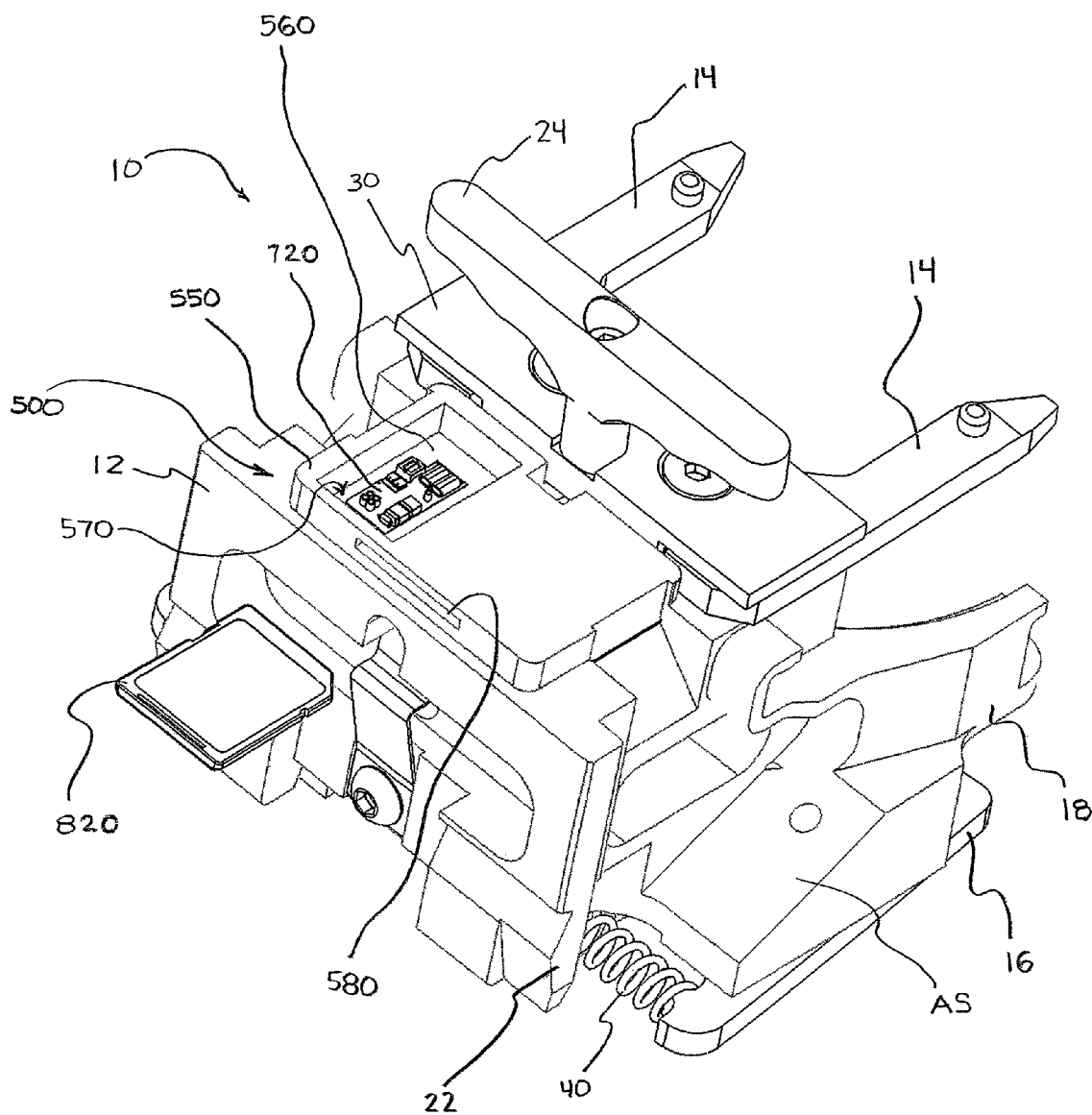
FIG. 26 is a perspective view of a smart cartridge in accordance with certain embodiments of the invention.
Figure 30:
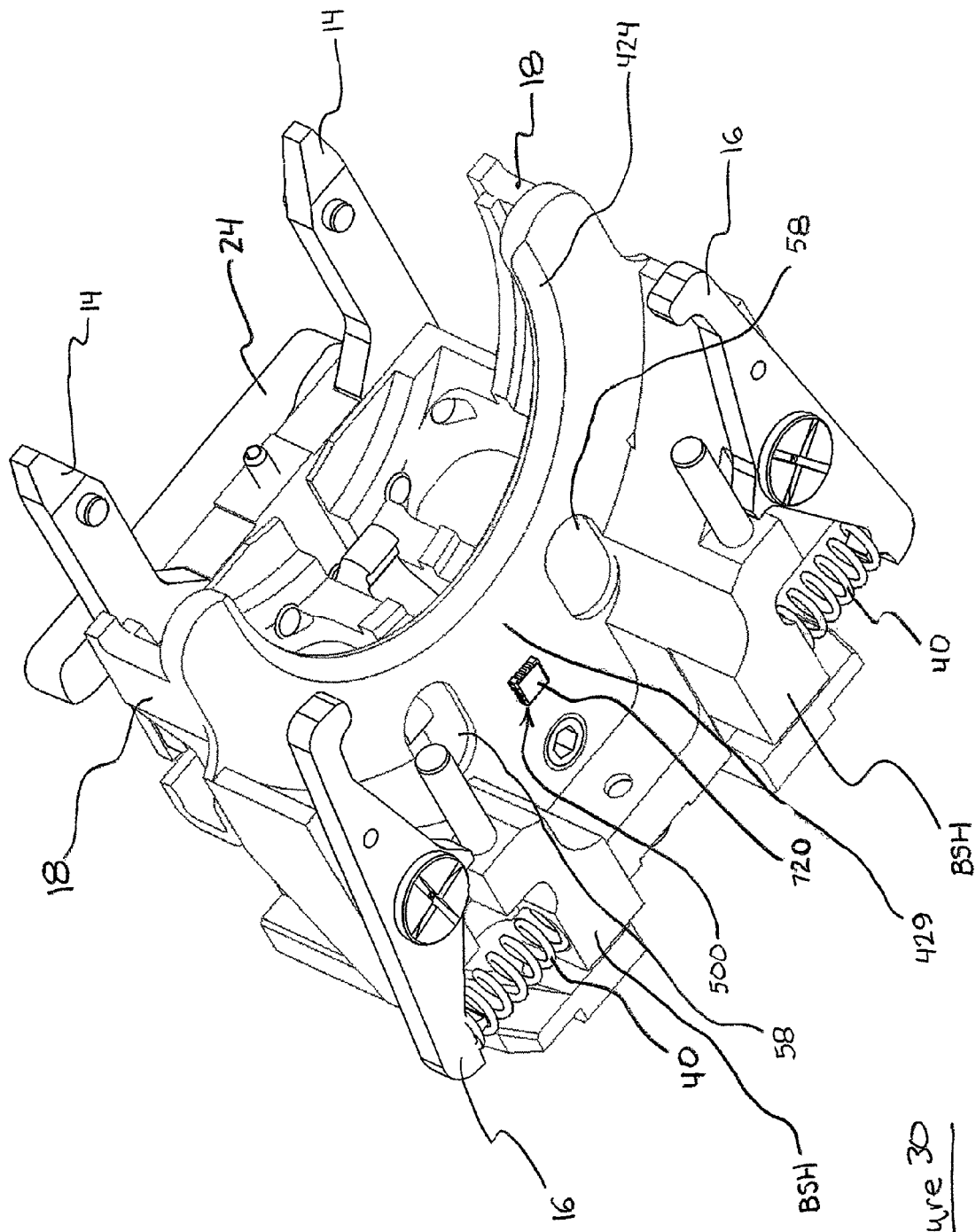
FIG. 30 is a perspective view of still another smart cartridge in accordance with certain embodiments of the invention.
Figure 31:
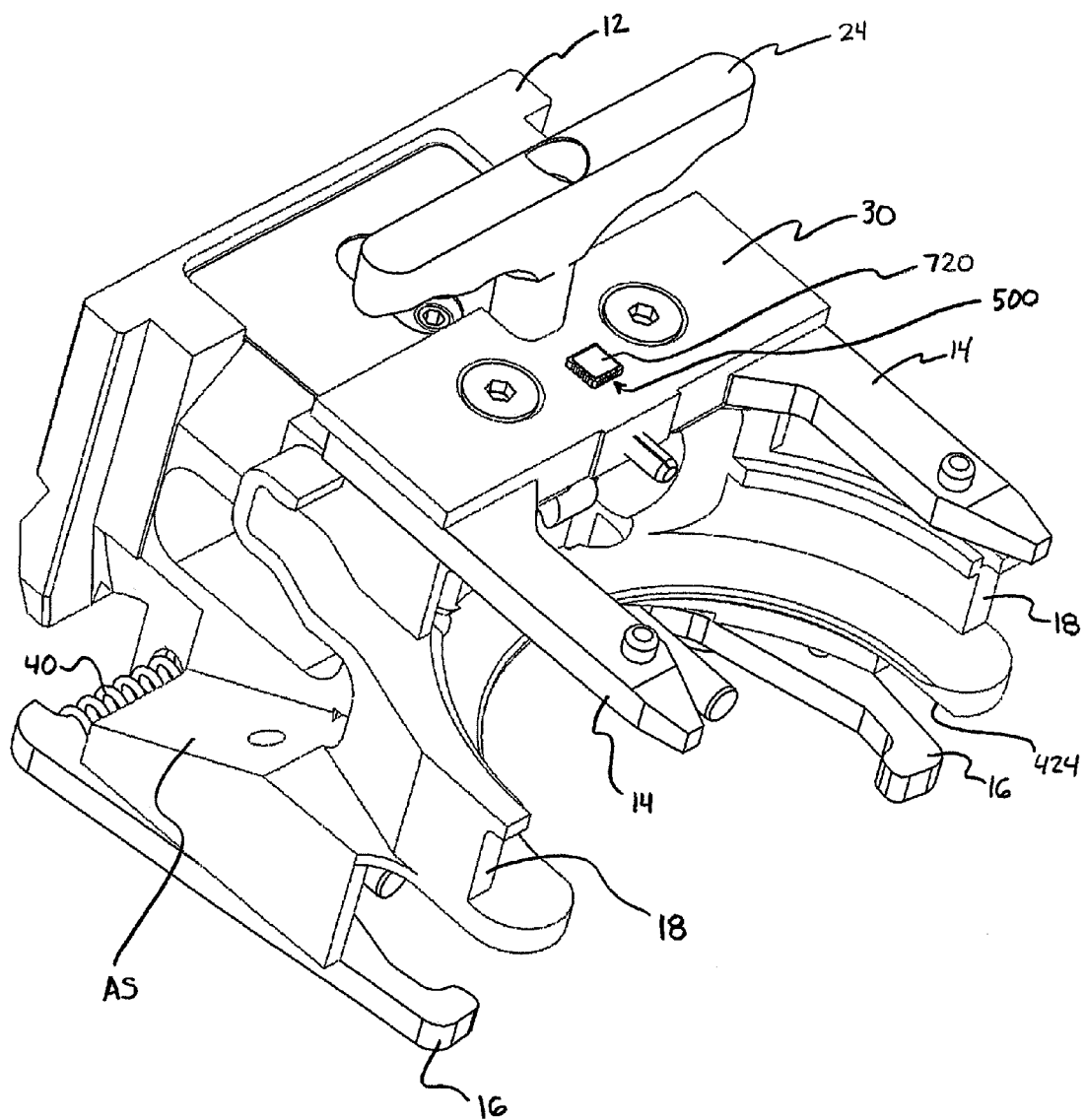
FIG. 31 is a perspective view of a further smart cartridge in accordance with certain embodiments of the invention.
Figure 32:
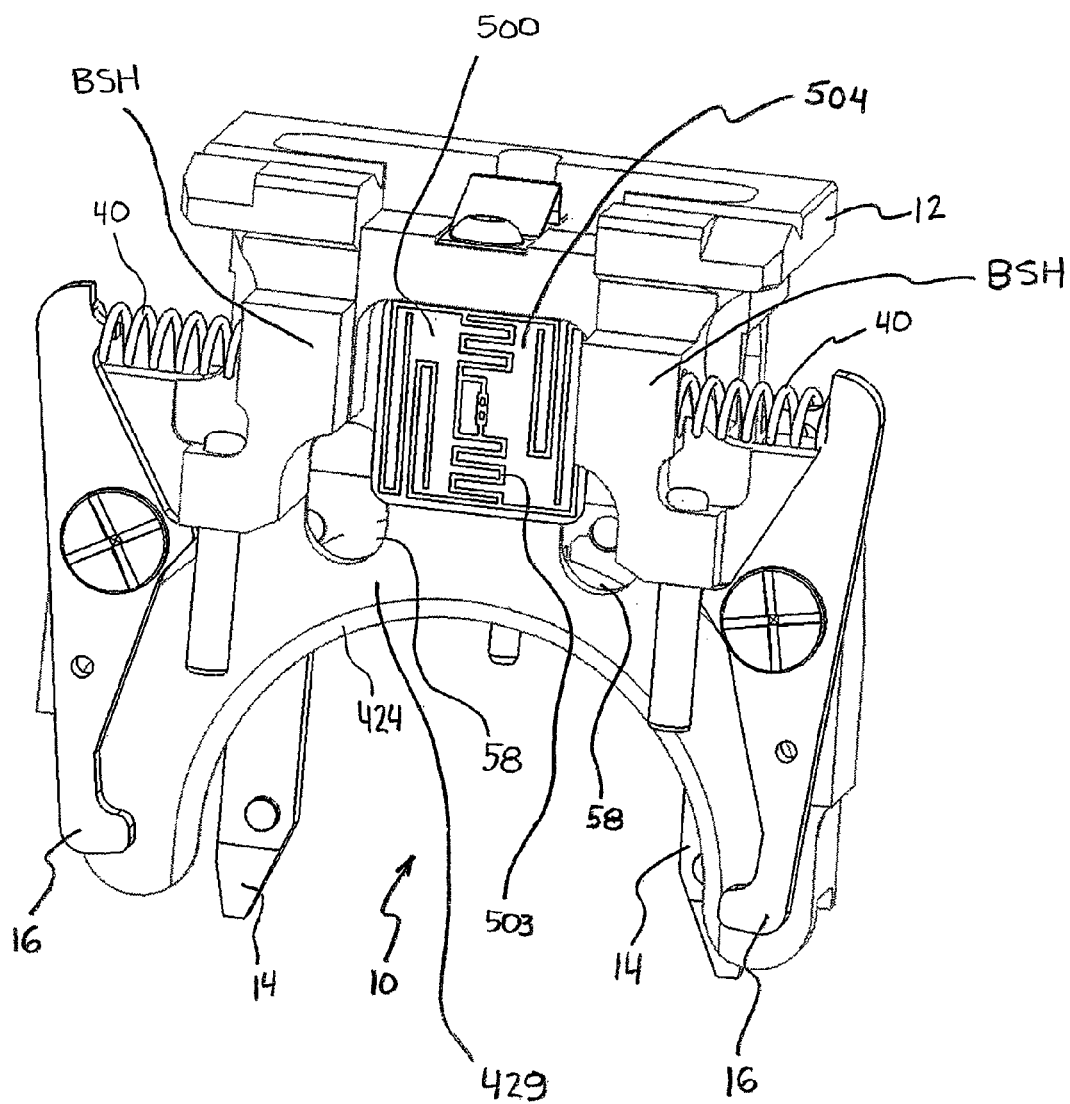
FIG. 32 is a perspective view of a smart cartridge in accordance with certain embodiments of the invention.
Figure 33:
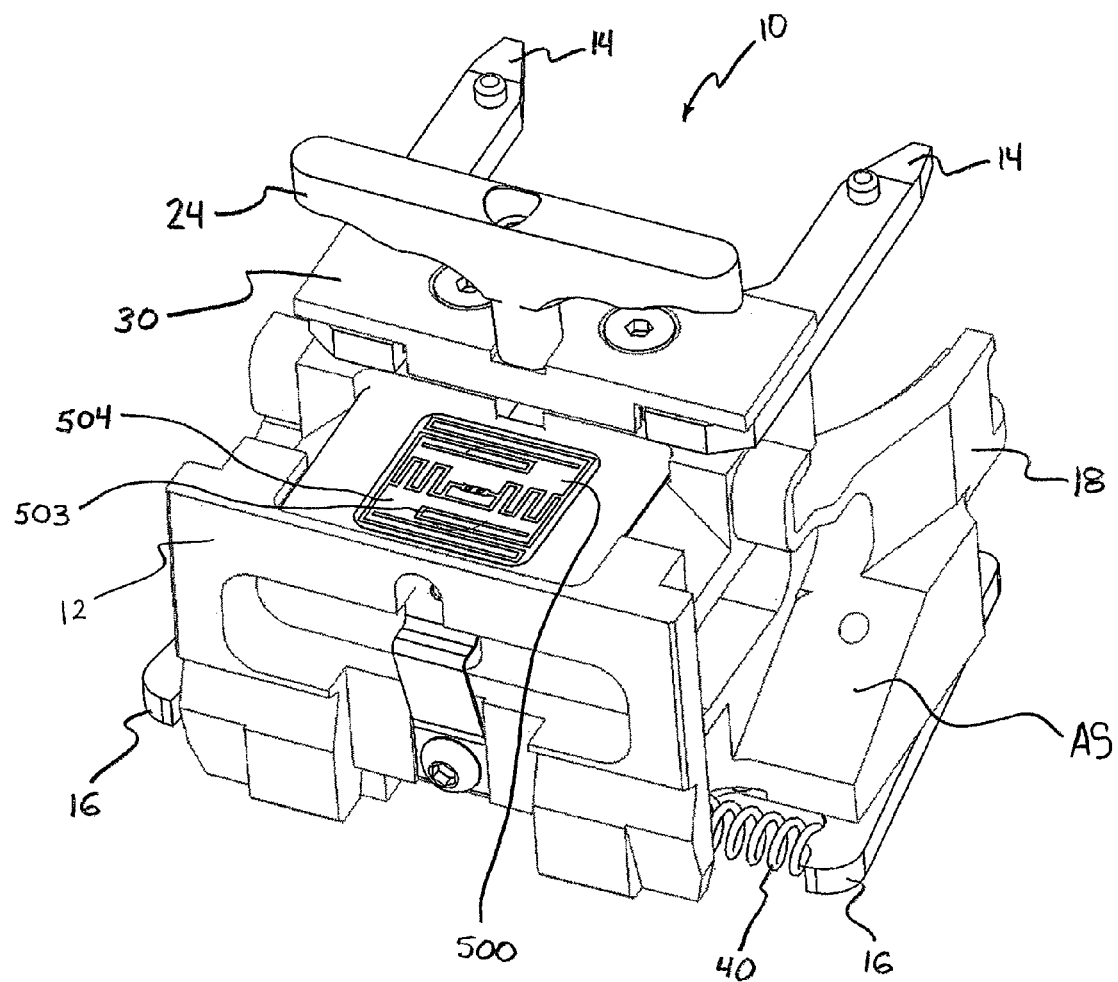
FIG. 33 is a perspective view of another smart cartridge in accordance with certain embodiments of the invention.
Figure 34:
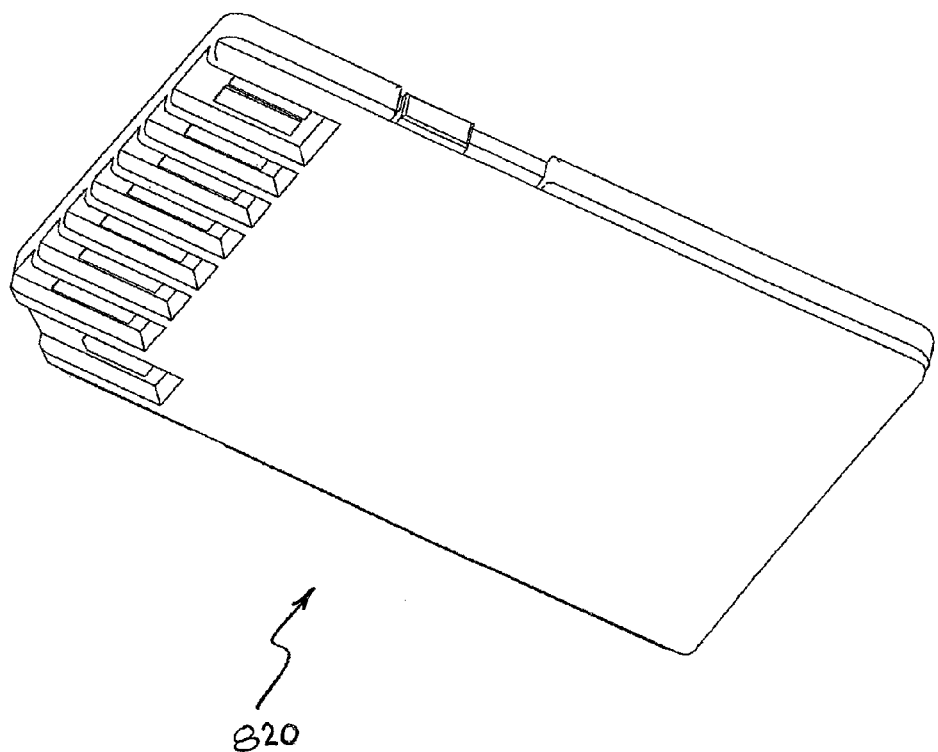
FIG. 34 is a perspective view of an information storage device that can be mounted on a cartridge in accordance with certain embodiments of the invention.
Figure 35:
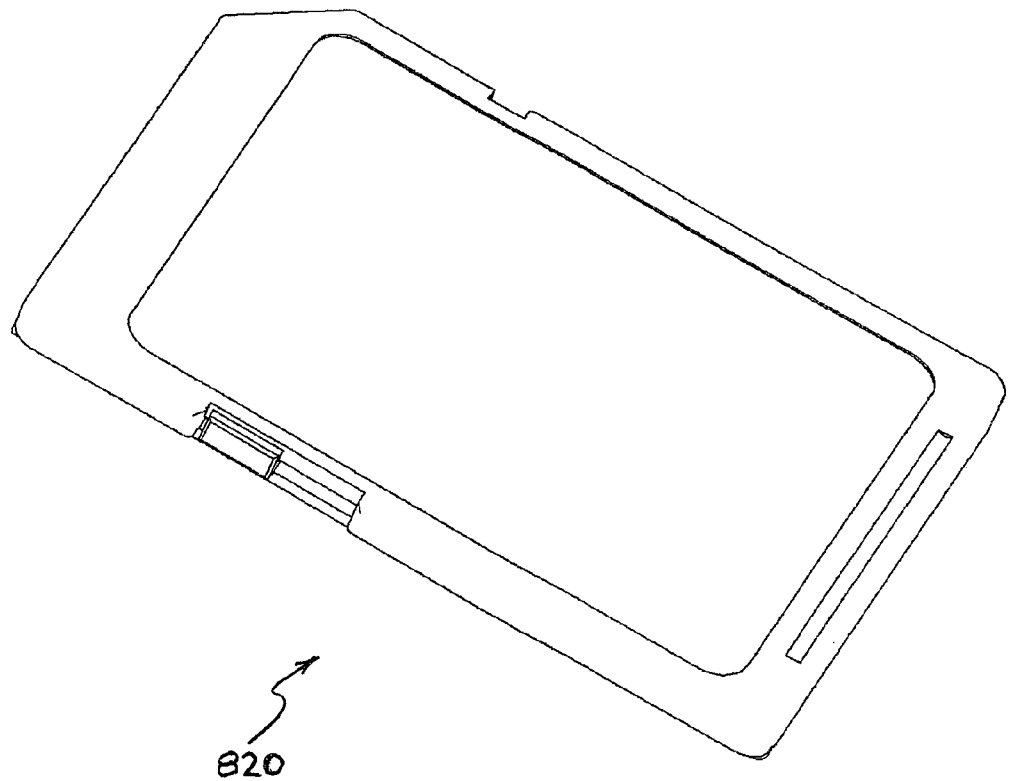
FIG. 35 is a top side view of an information storage device FIG. 34.
Figure 36:
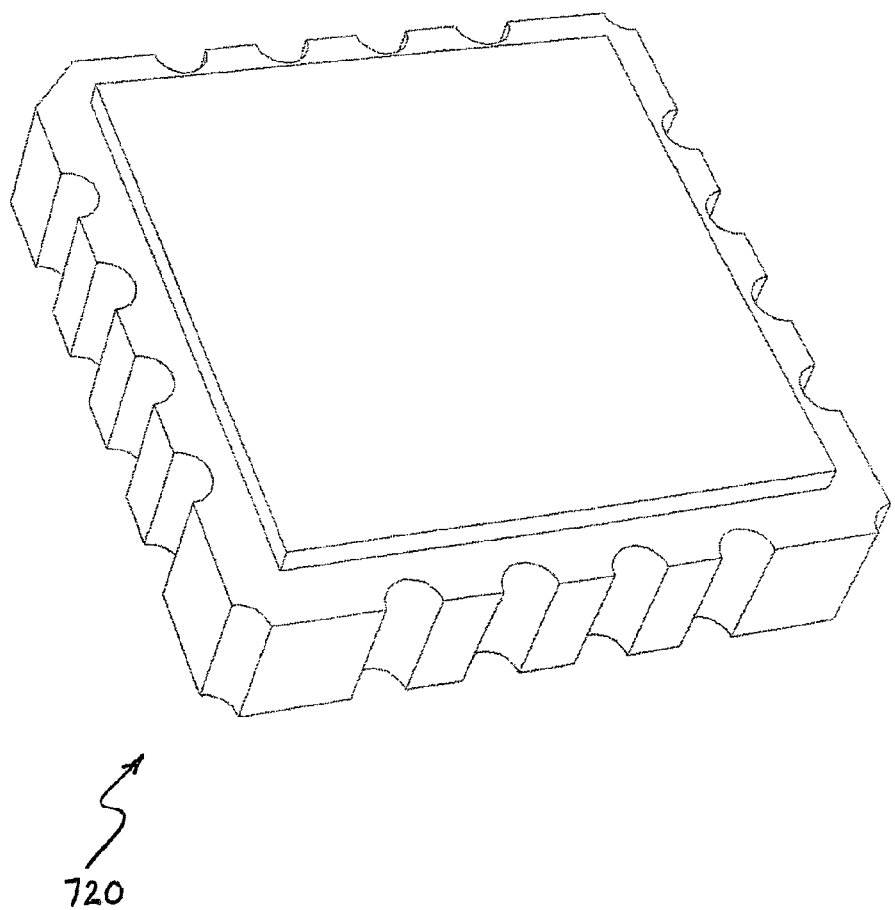
FIG. 36 is a perspective view of a leadless microchip that can be mounted on a cartridge in accordance with certain embodiments of the invention.
Figure 37:
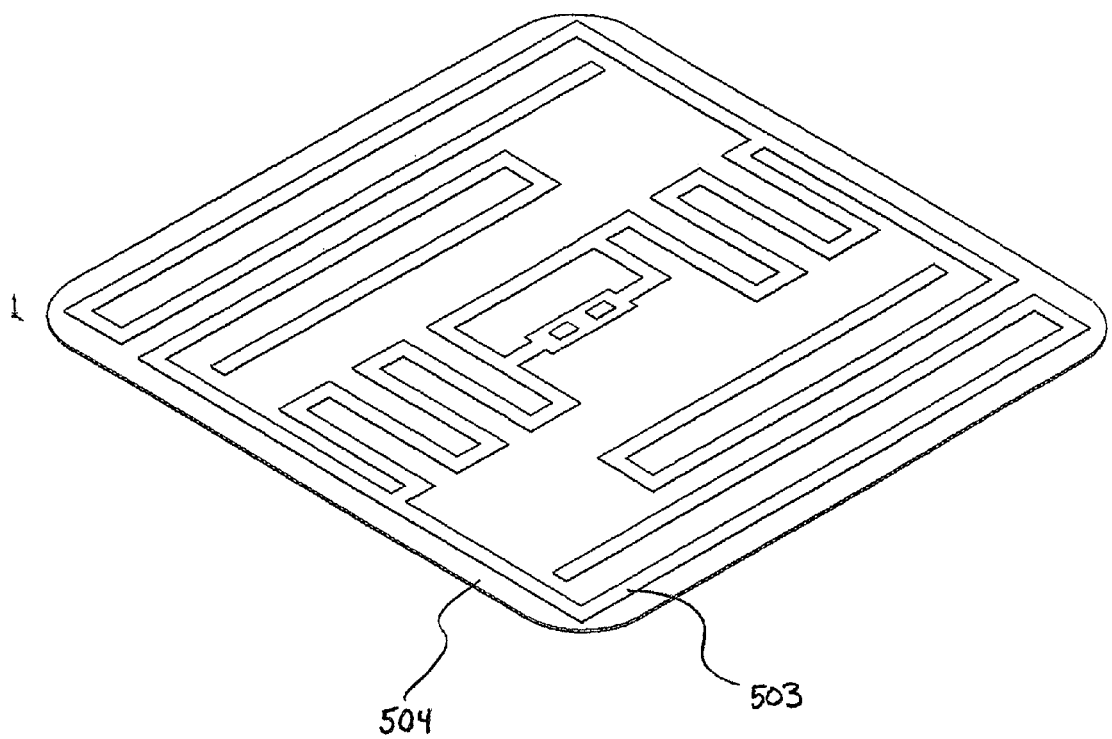
FIG. 37 is a perspective view of an RFID tag that can be mounted on a cartridge in accordance with certain embodiments of the invention.

The information storage device 500 can be mounted on different locations of the cartridge 10. In some cases, the cartridge 10 has six sides including a top side, a bottom side, a front side, a back side, and left and right sides. FIG. 26 is a perspective view of the top, back, and right sides of one particular smart cartridge embodiment. Here, the information storage device 500 is mounted on the top side of the cartridge 10. In other embodiments, the information storage device 500 is located on a side of the cartridge other than the top side. This can be particularly advantageous in several respects, such as by reducing the likelihood of the device being damaged. For example, when the information storage device has circuitry 503 (especially exposed, i.e., non-encapsulated, circuitry) that can be severed or otherwise damaged by abrasion or impact, it may be particularly desirable to locate the information storage device 500 on other than the top side of the cartridge. Thus, in some embodiments, the desired wall DW is on a side of the cartridge 10 other than the top side. Reference is made to FIGS. 30 and 32. These figures are representative of a group of embodiments wherein an information storage device is mounted on the bottom side of the cartridge.

In the exemplary embodiments of FIGS. 30 and 32, the location of the information storage device 500 is advantageous in that the device 500 is mounted to a downwardly-facing surface (which optionally faces generally away from the punch-retention arms 14 and/or generally away from an optional top handle 24) of the cartridge, yet this surface preferably is not the bottommost surface of the cartridge. As a result, the information storage device 500 is effectively shielded by structure (e.g., arms 16 and base shoulders BSH) that protrudes further downwardly than does the information storage device 500 (e.g., such that when the bottom side of the cartridge is rested on a level horizontal surface, the device 500 does not contact the surface). In FIGS. 30 and 32, the device 500 is mounted on a bottom surface 429 of the stripper locator base 18. As a result, the device 500 is well protected against abrasion and direct impacts.

In certain embodiments, the information storage device 500 is positioned so as to be spaced at least ⅛ inch, or at least ¼ inch, from the outermost surface of any side of the cartridge. This can advantageously isolate the device 500 by virtue of the surrounding cartridge structure effectively forming a protective cage. This is perhaps best appreciated by referring to the embodiments of FIGS. 30 and 31. It may be desirable to position the device 500 at least ½ inch, at least ¾ inch, at least 1 inch, or at least 1½ inches from an outermost surface of each side of the cartridge.

Figure 27:
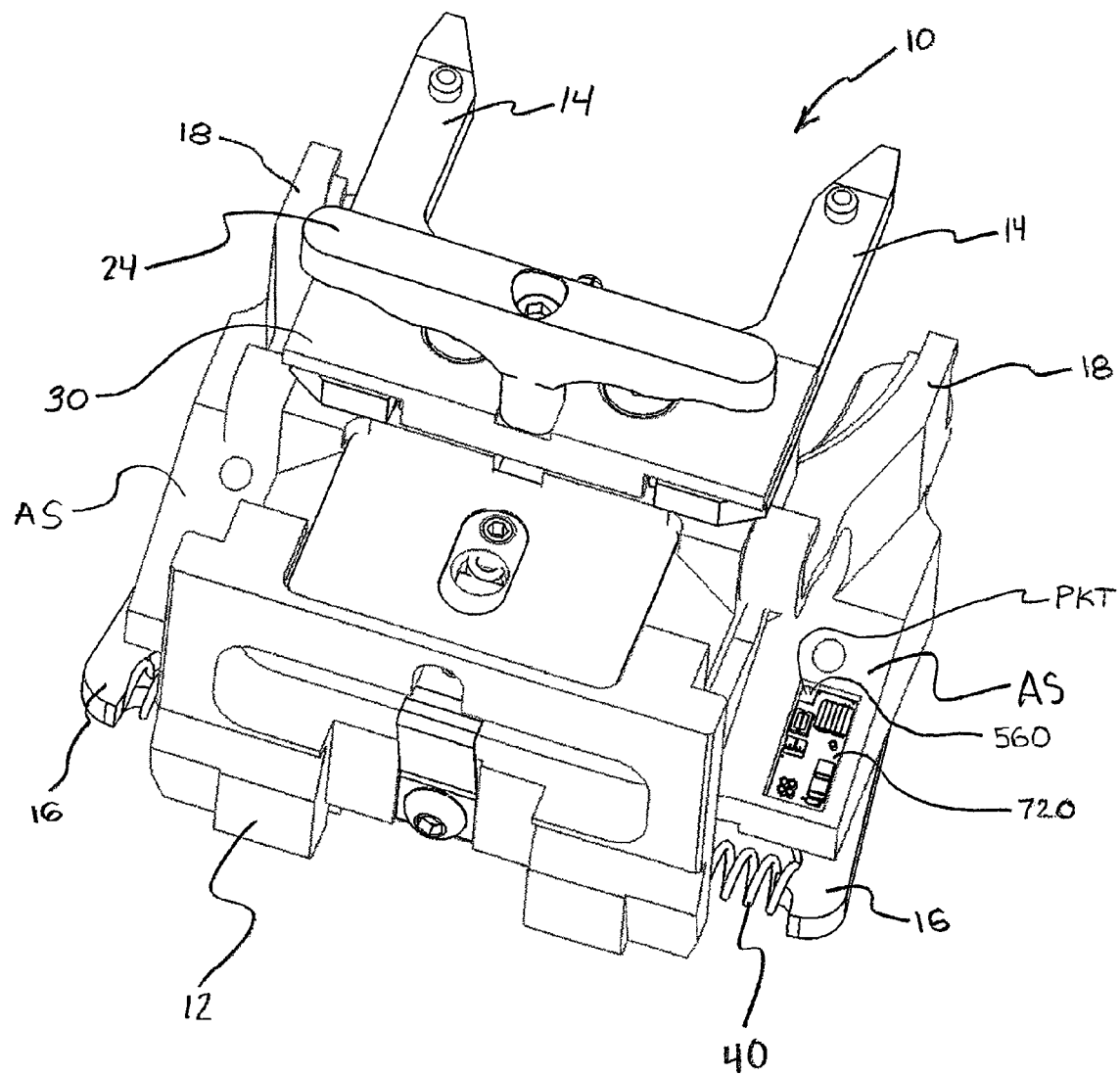
FIG. 27 is a perspective view of another smart cartridge in accordance with certain embodiments of the invention.

Some advantageous embodiments involve the desired wall DW being on the left side or the right side of the cartridge. Reference is made to FIG. 27. Here, the device 500 is well protected against abrasion and impact from vertical and horizontal directions. The exemplary embodiment of FIG. 27 is representative of embodiments wherein the desired wall DW has (e.g., defines) an angled surface AS that is oblique to a horizontal axis HA of the cartridge 10 when the cartridge is operatively mounted on a rail (and/or to a mount body 705 of a guidance system 700) of the machine tool (see FIG. 23). The angled surface AS, for example, can extend at an angle of between about 5 degrees and about 60 degrees, perhaps optimally between about 10 degrees and about 45 degrees, relative to the horizontal axis HA of the cartridge 10.

The information storage device 500 can be mounted on a desired wall DW of the cartridge 10 in different ways. In some cases, the device includes an adhesive layer adapted for adhesively securing the device onto the desired wall of the cartridge. The device 500, for example, can optionally be a card, tag, or the like having a layered structure wherein one layer is defined by adhesive and another layer comprises a medium to which information can be written (and from which information can be read). In some cases, the device 500 includes an adhesive layer, a layer comprising an information storage medium, and a rigid layer (optionally formed of plastic). When provided, the rigid layer (or "substrate") can be located between the adhesive layer and the information storage layer.

Certain embodiments provide an information storage device 500 comprising an encapsulated memory device, such as an RFID tag, a flash memory device, a microchip, or another memory device having a protective outer casing (optionally comprising, or consisting essentially of, a polymer). This protective casing can be particularly advantageous for embodiments where the information storage device is removable from the cartridge.

In one group of embodiments, the cartridge carries an information storage device 500 that is removably attachable to the cartridge 10. In these embodiments, the device 500 can be removed from the cartridge without destroying/damaging the device (e.g., without corrupting information stored by the device). Embodiments of this nature are advantageous in several respects. As one example, this is advantageous in situations where it is necessary to replace the cartridge for a tool set. In these situations, the information storage device 500 and the tools can be removed from the cartridge and then placed on a new cartridge, thus retaining all the information previously written to the device 500. This may be desirable in the case of a broken cartridge.

In certain embodiments, the information storage device 500 is mounted (in some cases, removably) in a pocket PKT defined by the desired wall DW of the cartridge 10. Embodiments of this nature can provide numerous advantages. In some cases, they can provide means for mounting the device 500 on the cartridge in a particularly safe manner, while also reducing the weight of the cartridge (e.g., due to removal of the wall portion that otherwise would have been present in place of the pocket). In some embodiments of this nature, the information storage device 500 comprises a microchip, tag, and/or another integrated circuit or other memory device 504 disposed entirely within the pocket PKT, optionally such that the memory device 504 is recessed relative to a surface DWS of the desired wall DW (e.g., so as to be shielded by the desired wall). This is perhaps best seen in FIG. 38C. In the exemplary embodiment of FIG. 38C, the pocket PKT is an interiorly-threaded opening 620 defined by the desired wall. This, however, is not required in all pocket embodiments. For example, the pocket PKT need not be threaded. Moreover, the memory device 504 need not be carried on an exteriorly-threaded insert. Further, the memory device 504 is not required to be potted. For example, the shielding arrangement of the desired wall DW relative to the memory device 504 may provide sufficient protection. Thus, in some cases the memory device can simply be secured (e.g., adhesively) to a surface 560 defining a bottom of the pocket.

In some embodiments, a memory device is potted in a pocket having a bottom surface and at least one side surface. In these embodiments, the pocket can contain epoxy or another protective overcoat material, which optionally fills (together with the memory device) at least 50% of the volume of the pocket. If so desired, they can together fill at least substantially the entire volume of the pocket, optionally the entire volume of the pocket, in some cases such that at least part of the protective overcoat material protrudes somewhat from the pocket, but perhaps more preferably so that all of the protective overcoat material is flush or recessed below the desired wall DW.

In certain embodiments, the information storage device 500 includes a mechanical fastener MF adapted for removably securing the device 500 to the desired wall DW of the cartridge. The mechanical fastener, for example, can optionally be adapted for securing the device to the cartridge in a semi-permanent manner. In these cases, the device 500 can be attached to the cartridge 10 removably, but in such a way that the fastener MF prevents (optionally by virtue of a rigid interconnection) the device 500 from being removed from the cartridge 10 by simply pulling the device 500 away from (directly away from) the desired wall DW. When provided, the fastener MF can optionally comprise a first detent DT1 adapted to be removably engaged with a corresponding detent DT2 associated with (e.g., on) the cartridge 10. Thus, when the detents DT1, DT2 are engaged with one another, the fastener MF preferably prevents the information storage device 500 from being removed from the cartridge 10 by simply pulling the device 500 away from (directly away from) the desired wall DW.

Figure 38A:
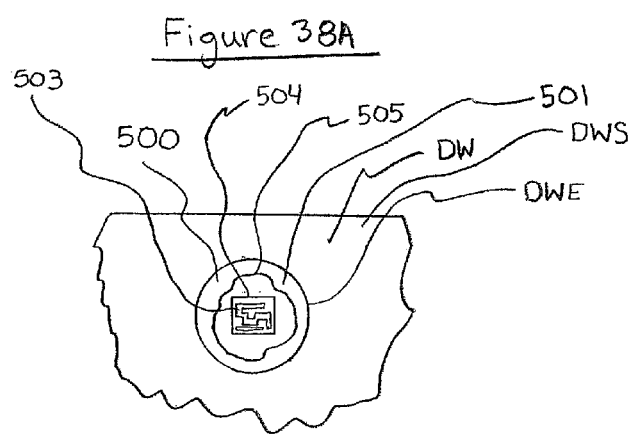
FIG. 38A is a partially broken-away view of an electronic information storage device mounted on a desired wall of a cartridge in accordance with certain embodiments of the invention.
Figure 38B:
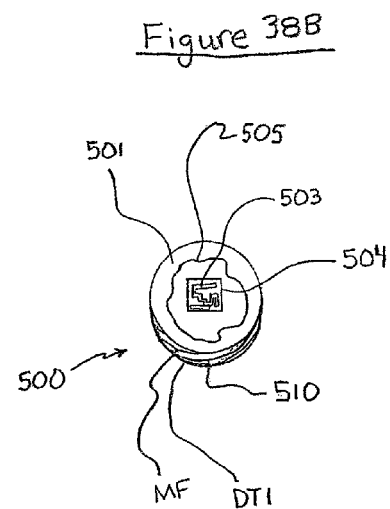
FIG. 38B is a perspective view of the electronic information storage device of FIG. 38A, with the device shown as separated from the cartridge.
Figure 38C:
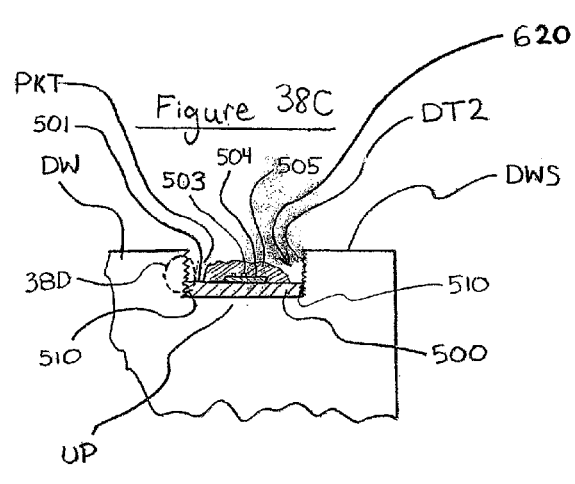
FIG. 38C is a partially broken-away cross sectional side view of the mounted electronic information storage device of FIG. 38A.
Figure 38D:
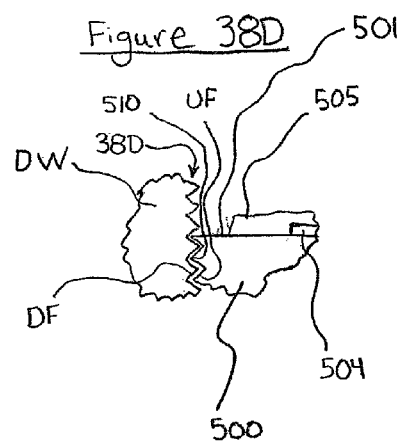
FIG. 38D is a detail view of the region identified in FIG. 38C by the reference character 38D.

In some embodiments involving an interlocking detent system, the first detent DT1 comprises a first catch surface UF facing at least generally away from an underlying part UP of the desired wall DW. As shown in FIG. 38C, this underlying part UP can optionally be directly under the information storage device 500. Preferably, a corresponding detent DT2 of the cartridge 10 comprises a second catch surface DF facing at least generally toward the underlying part UP of the desired wall DW. When provided, the second catch surface DF desirably is adapted to directly engage and hold down the first catch surface UF. This is the case with the embodiment detailed in FIGS. 38A-38D. Given the present teaching as a guide, skilled artisans will appreciate that many other detent systems can be used.

Figure 28:
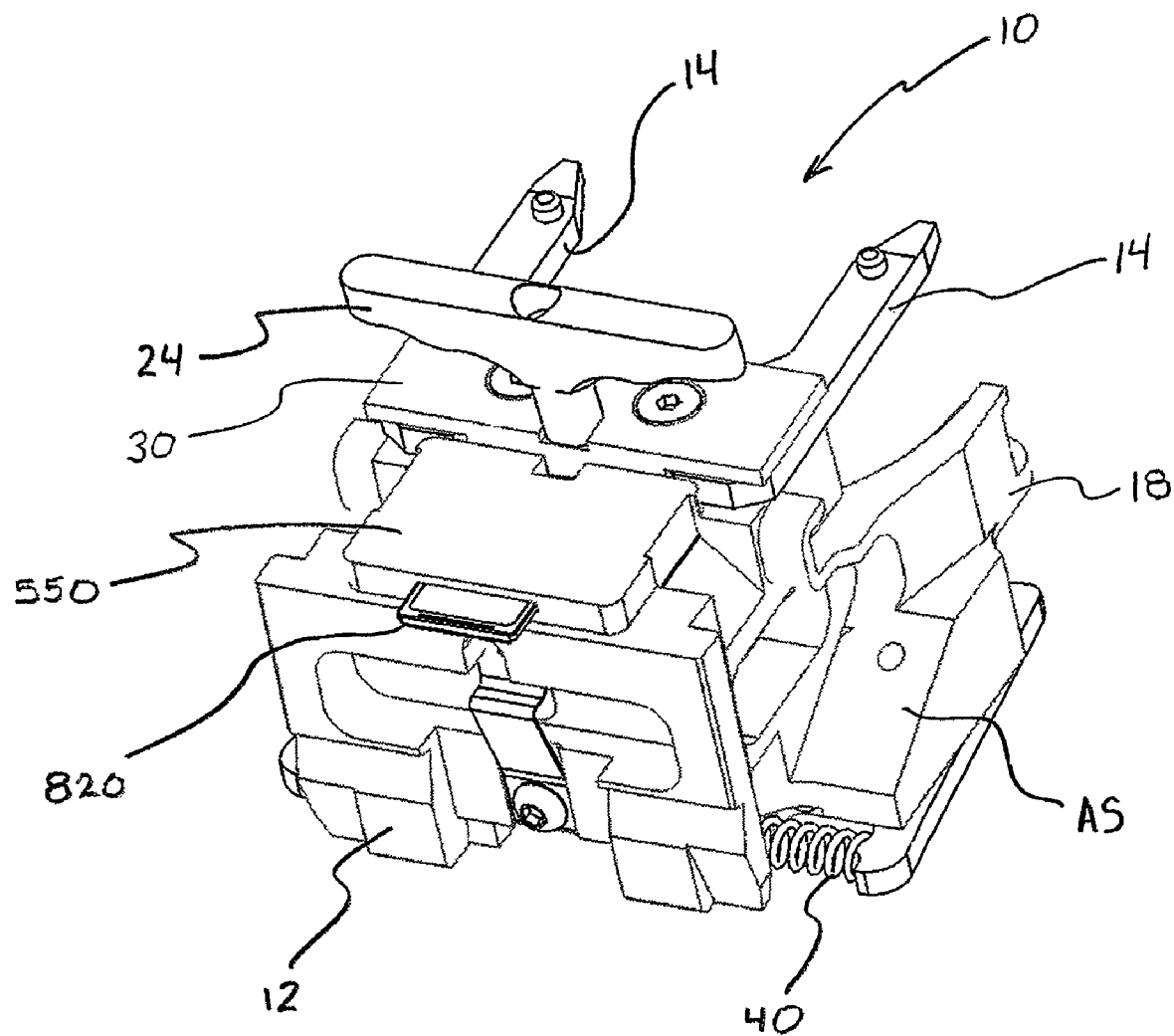
FIG. 28 is a perspective view of yet another smart cartridge in accordance with certain embodiments of the invention, wherein a flash memory card is fastened to the cartridge by a card holder.
Figure 29:
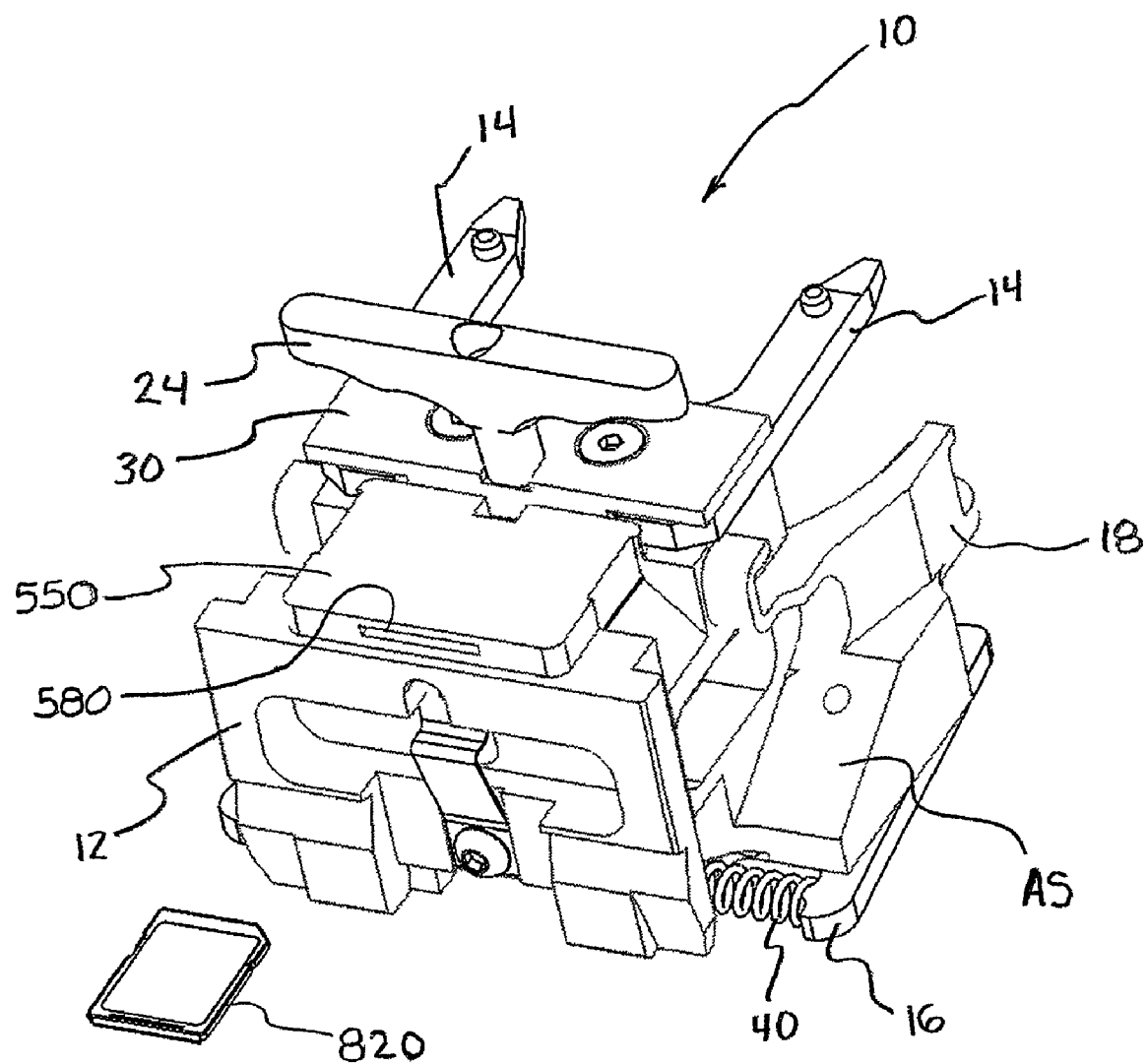
FIG. 29 is a perspective view of the cartridge of FIG. 28, with the flash memory card depicted in an exploded fashion as being removed from the card holder.

With reference to FIGS. 28 and 29, there is shown a cartridge 10 having a removable flash memory device 800. If so desired, this device 800 can alternatively be an RFID tag or another type of memory device (optionally encased in plastic or the like). Here, the device preferably is removably attached to the cartridge. The memory device, for example, can be adapted for being inserted into a housing adapted to resiliently retain the memory device in a releasably locked position on the cartridge. For example, the memory device can be retained by a spring-and-clip mechanism, or simply by spring pressure against a surface of the device, which optionally locks the memory device on the cartridge when the memory device is pushed a first time into the housing 550 and unlocks when pushed a second time. This two-push locking/unlocking feature can be provided in any embodiment involving an information storage device mounted removably on the cartridge.

In some embodiments involving a potted information storage device 500, the device 500 comprises both a protective overcoat 505 and a mechanical fastener MF adapted for anchoring (optionally in a removable manner) the information storage device on the desired wall DW of the cartridge 10. As depicted in FIGS. 38A-38D, the mechanical fastener MF can optionally comprise (e.g., can be) an exteriorly-threaded wall 510. For example, information storage device 500 can comprise an exteriorly-threaded insert 501. In embodiments of this nature, the cartridge 10 can optionally have an interiorly-threaded opening 620 into which the insert 501 can be removably secured by threadingly advancing the insert into the opening. Embodiments of this nature can provide secure retention of the information storage device on the cartridge during use, while still facilitating easy removal of the device 500 from the cartridge when necessary.

In some embodiments involving a potted information storage device 500, the device 500 comprises both a protective overcoat 505 and a mechanical fastener MF adapted for anchoring (optionally in a removable manner) the information storage device on the desired wall DW of the cartridge 10. As depicted in FIGS. 38A-38D, the mechanical fastener MF can optionally comprise (e.g., can be) an exteriorly-threaded wall 510. For example, information storage device 500 can comprise an exteriorly-threaded insert 501. In embodiments of this nature, the cartridge 10 can optionally have an interiorly-threaded opening 620 into which the insert 501 can be removably secured by threadingly advancing the insert into the opening. Embodiments of this nature can provide secure retention of the information storage device on the cartridge during use, while still facilitating easy removal of the device 500 from the cartridge when necessary.

In some of the present smart cartridge embodiments, the cartridge is only provided with one information storage device. In other embodiments, though, the cartridge includes (e.g., optionally has only) two such devices. This may be advantageous, for example, when redundant information storage is desired. In one embodiment, the cartridge has two information storage devices mounted respectively on left and right sides of the cartridge. Of course, many other arrangements can be used.

One group of embodiments provides a cartridge having at least one flash memory device. Exemplary embodiments of this nature are shown in FIGS. 26, 28, and 29. In these embodiments, the cartridge 10 is shown to include a housing 550 adapted to removably retain a flash memory device 800. In FIGS. 26, 28, and 29, the housing 550 has a slot 580 into which the flash memory device 820 (shown as a flash memory card) can be removably retained. Here, when the flash memory device 820 is inserted into the slot 580, it is retained by the housing 550, yet when an operator wishes to relieve the device 820, it can be removed from the slot (in some cases, the device can be pulled free only after pushing the device so as to unlock it from the housing or after depressing a button or other release mechanism).

In some embodiments, the cartridge 10 includes both a flash memory device 820 and a data collection module or a microchip 720 or another type of memory device. One exemplary embodiment is shown in FIG. 26. Here, the cartridge 10 includes a housing 550 adapted to receive (e.g., securely retain) both the flash memory device 820 and the microchip 720 or another type of memory device. The housing 550 shown in FIG. 26 has a pocket 570 adapted to receive the microchip 720 and a slot 580 adapted to receive the flash memory device 820. Thus, the design of FIG. 26 is representative of embodiments wherein the cartridge 10 is equipped with a housing 550 adapted to receive at least two different types of electronic information storage devices, both optionally being selected from the group consisting of RFID tags, flash memory devices, and microchips. Embodiments of this nature may facilitate a particularly extensive array of information-tracking operations and/or information-management operations.

In some of the present smart cartridge embodiments, a desired wall DW (i.e., a wall on which the information storage device is mounted) is formed of a non-magnetic material selected from the group consisting of a non-magnetic metallic material, a non-magnetic plastic material, and a non-magnetic composite material. Here, the non-magnetic material, for example, can optionally be selected from the group consisting of a non-magnetic plastic material, a non-magnetic metallic material comprising (e.g., consisting essentially of) aluminum, and a non-magnetic composite material comprising carbon. Thus, in some embodiments, the information storage device is mounted to (e.g., is secured against, optionally directly against) a non-magnetic wall. Further, in some of the above-referenced pocket embodiments, the pocket PKT is defined by a non-magnetic material of a type noted in this paragraph.

In certain embodiments, the desired wall DW of the cartridge 10 is formed of an aircraft metal selected from the group consisting of beryllium, titanium, magnesium, aluminum, and alloys comprising one or more of beryllium, titanium, magnesium, and aluminum. In some of these embodiments, the punch-retention arms 14 and the die-retention arms 16 are formed of steel, as described above.

A rear portion of the cartridge's main body can, in some embodiments, be attached to a mount body 705 of a guidance system 700 of the machine tool. In embodiments of this nature, the guidance system typically is adapted to move the cartridge selectively toward or away from a mounting position 1500 of the machine tool.

A wide variety of information types can be stored on the device 500. Some examples include: (1) sharpening-history information (e.g., "grind-history information"); (2) tool-clearance information; (3) information regarding positive or negative taper; (4) information concerning number of hits; (5) information concerning average hits per use; (6) information on when the tool set has been used and for what jobs; (7) information concerning whether the tools in the set have always been used together (and/or whether the punch has been used with a different die and/or stripper or vise versa); (8) original-order information on the tool set from the tooling vendor; (9) information concerning high, low, and/or average tool temperature during use (optionally including such information with respect to use with different workpiece materials); (10) information regarding materials commonly processed with the tool set carried by the cartridge; (11) tool measurement information (such as that generated by a tool presetting fixture); and (12) information concerning where in an operator's facility the tool set is located at any given time.

In one exemplary embodiment, the cartridge carries an information storage device 500 on which there is stored set-up information. The set-up information can include hit counts, tool lengths, adjustment limits, nibbling limitations, material limitations, and/or temperature and tonnage together (to determine when tools need sharpening). The cartridge may communicate to a tool library so that a machine is stopped if not in agreement and/or to reprogram the tool library and/or to update the tool library after an off-machine event such as sharpening or replacing a worn or damaged tool.

The cartridge can optionally be used with adaptive stroke calibration, so as to compensate for sheet thickness tolerances. Thus, the cartridge in some embodiments carries an information storage device on which there is stored information based on the thickness of a sensed sheet being processed and/or the cartridge is provided in combination with a calibration tool adapted to sense a surface of a piece of sheet metal to be processed. Useful calibration tools are commercially available, such as from Trumpf Inc. North America (Farmington, Conn., USA). Machines that may be useful for the present embodiments include the machines sold commercially by Trumpf under the trade names TRUMATIC 5000 ROTATION, TRUMATIC 3000 ROTATION, TRUMATIC 1000 ROTATION, and TRUMATIC 2020 FMC COMPACT. The present embodiments can be used advantageously to address problems associated with undesired variations in sheet thickness. Related methods may involve calibrating a ram stroke based on both a sheet-surface-sensing result and a ram-position-measurement result.

The invention also provides methods of using a smart cartridge and/or smart tooling. One particular method involves tool sharpening. Here, the method includes providing the cartridge (the cartridge being adapted for use on a machine tool, and including two punch-retention arms, two die-retention arms, and a stripper locator base). In this case, the punch-retention arms removably retain a punch on the cartridge, and a desired information storage device is mounted on the cartridge or the punch. The punch is removed from the cartridge's punch-retention arms. A sharpening operation is then performed on a tip of the punch. Useful sharpening equipment include the tool grinding machines available commercially under the trade names quicksharp ITM and ecogrind (from Trumpf). Other commercially available tool grinding machines can be used as well. The present method involves writing sharpening-history information to the desired information storage device. Preferably, the sharpening-history information includes data that is dependent upon (i.e., indicates and/or is calculated based upon) how much of the punch's tip is removed during the sharpening operation. The sharpening-history information is optionally written to the desired information storage device by an interface apparatus (such as an RFID reader/writer device or another reader/writer device) that is part of, is operably coupled with, or is otherwise associated with (e.g., is used in conjunction with) the punch-sharpening machine that performs the noted sharpening operation.

Some embodiments of the invention involve a tool presetting fixture. For example, certain methods involve measuring at least one tool of a tool set prior to securing the tool(s) onto a holder cartridge. The results of the measurement can be written to an information storage device on the cartridge. Thus, in some embodiments, an information storage device on the cartridge records (i.e., carries) data generated by a tool presetting device. Useful presetting fixtures include those available commercially under the trade names Multiset and Easyload (from Trumpf) and those sold by Zoller Inc. (Ann Arbor, Mich., USA) under the trade names Smile, Venturian, and Hyperion.

In certain embodiments, the invention provides an inventory-assessment method. Here, there are provided a plurality of tools and at least one smart cartridge. The tools themselves can optionally be provided with information storage devices (e.g., of any type described herein). In the present method, the smart cartridge (commonly a plurality of smart cartridges) and the tools (e.g., a plurality of punches and dies) are part of the same inventory. The method comprises operating one or more interface apparatuses to extract (i.e., read) information from the smart cartridge(s), from the tools, or from both, so as to determine what tools are in the inventory (i.e., to determine the contents of at least part of the inventory). The inventory-assessment method can additionally or alternatively result in extraction of information indicating the respective locations of a plurality of cartridges and/or tools that are part of the inventory. In one exemplary method, an operator uses one or more interface apparatuses to read information from the information storage device(s) of each of a plurality of cartridges. Commercially available interface apparatuses include reader/writer apparatuses like those sold by Wireless Dynamics (Calgary, Alberta, Canada) and Identec Solutions AG (Lustenau, Austria). In some of the present inventory-assessment embodiments, the method involves reading information from at least one cartridge located in a storage location (a cabinet, drawer, etc.) and reading information from at least one cartridge located on a machine tool. For instance, the operator may use a reader to determine what cartridge(s) and/or tools are currently in a machine tool. In some embodiments, the operator reads information from one or more cartridge(s) and/or tool(s), each being in a machine tool, to identify any tool(s) that may need to be removed from the machine tool (and perhaps replaced).

In one group of embodiments, the operator uses one or more interface apparatuses (e.g., readers) to confirm that at least one desired tool (and commonly to confirm that each of a plurality of tools) located in a machine tool is correctly mounted in a proper station of the machine tool. This can optionally be done prior to, and/or during, an automated (or "lights out") run. In certain embodiments, a computer actuates the interface apparatus(es) to make the noted confirmation.

Figure 39:
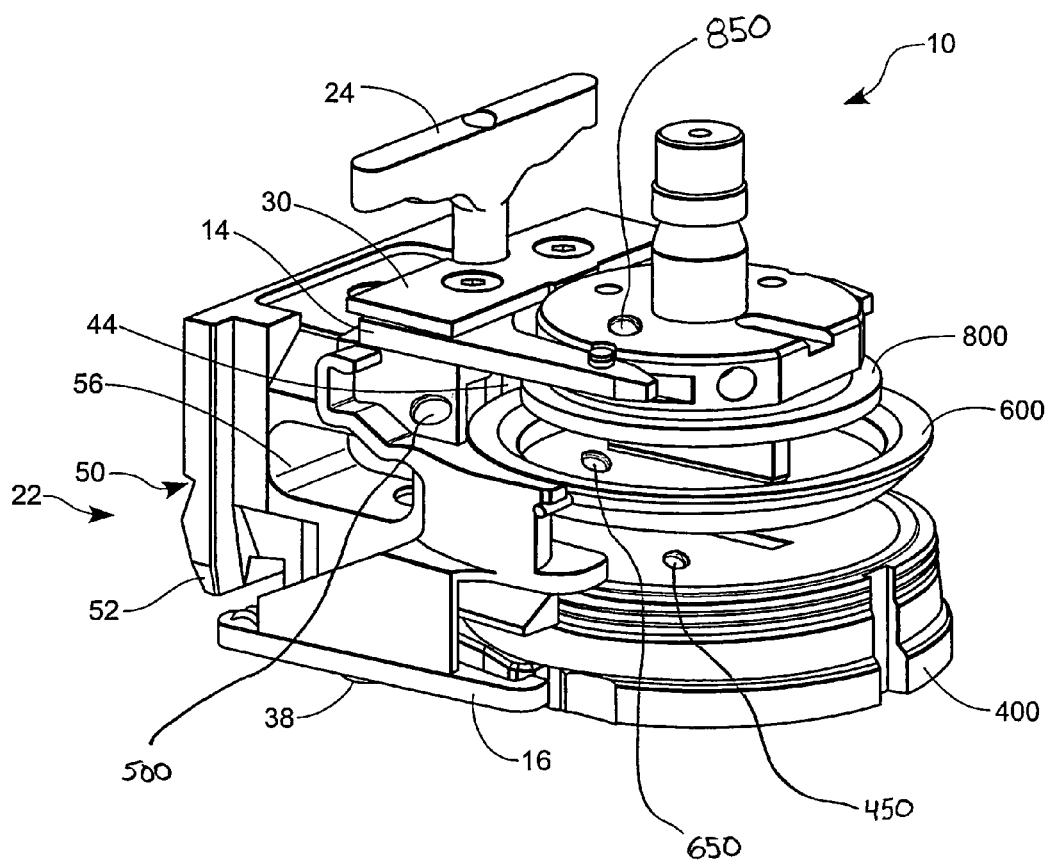
FIG. 39 is a perspective view of a cartridge carrying a tool set in accordance with certain embodiments of the invention.

Some embodiments of the invention provide a smart cartridge/smart tool combination. Here, there is provided a cartridge carrying a tool set wherein at least one tool of the set carries an information storage device. The cartridge may, for example, carry a male punch, a stripper plate, and a female die. If so desired, a plurality of the tools on the cartridge can have information storage devices. Reference is made to FIG. 39, which illustrates an exemplary embodiment wherein the punch 800 has an information storage device 850, the stripper plate 600 has an information storage device 650, and the die 400 has an information storage device 450. The location of these devices 450, 650, 850 on their respective tools can be changed as desired. In the present embodiments, each information storage device can be a contact or non-contact information storage device. Further, the location of the information storage device 500 on the cartridge itself can be changed. The device 500 on the cartridge can optionally be adapted for reading information stored on the devices 450, 650, 850 of the tools. Thus, the device 500 (in these embodiments, or any other embodiment disclosed herein) can optionally be a storage device that is also a reader (such as a reader/writer). In certain embodiments, the device 500 on the cartridge is adapted to read information from the devices 450, 650, 850 on the tools without having to remove the tools from the cartridge.

Figure 40:
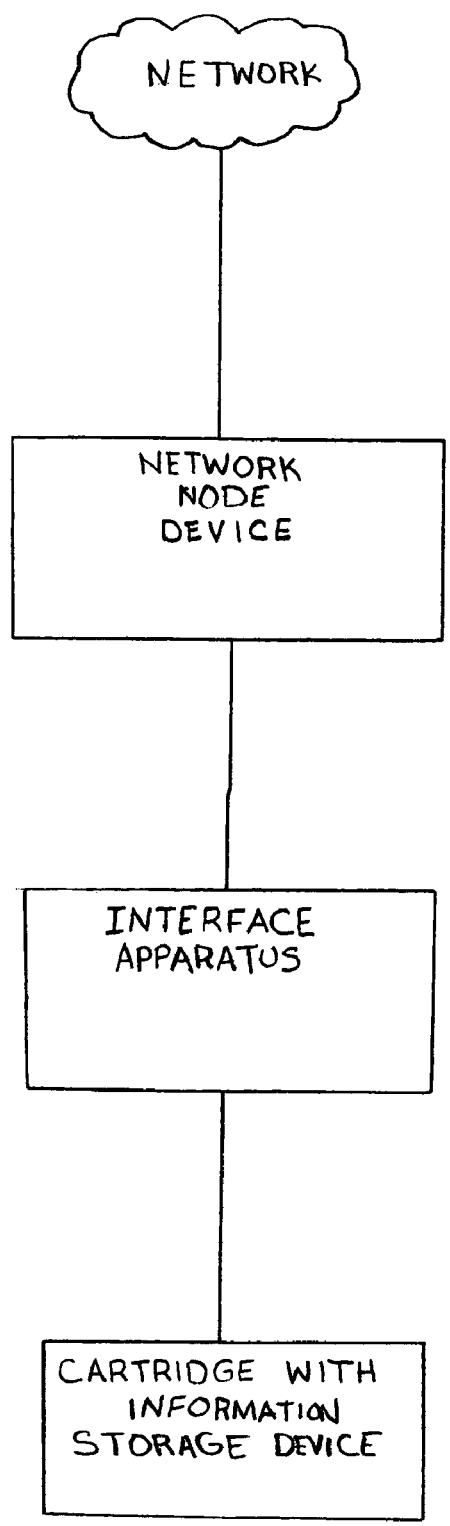
FIG. 40 is a diagram schematically showing a smart cartridge system in accordance with certain embodiments of the invention.

Reference is now made to FIG. 40, which depicts a smart cartridge system comprising a cartridge and an interface apparatus. Here, the interface apparatus is adapted for reading information stored by an information storage device associated with (e.g., mounted on) the cartridge. The interface apparatus can optionally be adapted to also write to the cartridge's information storage device, e.g., it can be a reader/writer. In the present embodiments, the system preferably includes a network node device, and the interface apparatus and the network node device preferably are adapted for signal transmission (such as wireless signal transmission) between each other. Optionally, the network node device is adapted for being (or is) operably connected to a public internetwork, such as the Internet. The interface apparatus can be in the same housing as the network node device, or they can be in different housings. In some embodiments of the present system, an operator at a location remote from the smart cartridge (e.g., outside/remote from a building in which the smart cartridge is located) can activate the network node device, optionally via an internetwork connection to the node device, in such a way that a resulting signal is transmitted from the network node device to the interface apparatus, which is thereby caused to read information from the information storage device on the cartridge and to then transmit a signal to the network node device, which then communicates the resulting information, optionally via the internetwork, to the operator, who can then analyze the information without having to be present at the locale of the cartridge. For example, a reader associated with (e.g., in) a machine tool control can be operated to check information on the cartridge against program needs such that machining with the wrong tool is not allowed. Bluetooth or other wireless technology can be used, for example, to notify a shop manager, owner, or other operator (optionally at a time when the operator is remote from the factory/shop in which the machine tool is located) if there is a problem, at which point the operator can optionally use the Internet or a desired wireless device to make desired changes to the tool and/or machine tool. Some embodiments involve lights-out operations (e.g., after regular shop/factory hours) using an automated punching system (such as Trumpf's automatic sheet load/unload, sheet skeleton removal, part sorting, multiple materials carts, etc.).

While preferred embodiments of the invention have been described, it should be understood that numerous changes, adaptations, and modifications can be made therein without departing from the spirit of the invention and the scope of the appended claims.

The invention claimed is:

1. A tool set holder cartridge for a machine tool, the cartridge having a main body, two punch-retention arms, two die-retention arms, and a stripper locator base, the two punch-retention arms being adapted to removably retain a punch on the cartridge, the two die-retention arms being adapted to removably retain a die on the cartridge, the stripper locator base being adapted to removably retain a stripper plate on the cartridge, the cartridge having an electronic information storage device that is readable and writeable, the electronic information storage device being mounted on a desired wall of the cartridge, wherein the punch-retention arms extend outwardly from an upper portion of said main body, the die-retention arms extend outwardly from a lower portion of said main body, and a middle portion of said main body defines the stripper locator base, wherein the stripper locator base is located between the punch-retention arms and the die-retention arms, and wherein said main body comprises a single integral block, wherein said single integral block defines said stripper locater base.

2. The cartridge of claim 1 wherein the electronic information storage device is potted on said desired wall such that at least part of the electronic information storage device is encapsulated by a protective overcoat.

3. The cartridge of claim 2 wherein the protective overcoat at least substantially entirely covers the electronic information storage device.

4. The cartridge of claim 2 wherein the electronic information storage device comprises both the protective overcoat and a mechanical fastener adapted for anchoring the potted electronic information storage device on said desired wall of the cartridge.

5. The cartridge of claim 4 wherein the mechanical fastener comprises a first detent adapted for being removably engaged with a corresponding detent of the cartridge.

6. The cartridge of claim 5 wherein, when said detents are engaged with one another, the mechanical fastener prevents the electronic information storage device from being removed from the cartridge by simply pulling the electronic information storage device away from said desired wall.

7. The cartridge of claim 5 wherein the first detent comprises an exteriorly-threaded wall.

8. The cartridge of claim 1 wherein the electronic information storage device is carried by an exteriorly-threaded insert, the cartridge having an interiorly-threaded opening into which the insert can be removably secured by threadingly advancing the insert into the opening.

9. The cartridge of claim 1 wherein the electronic information storage device is mounted removably in a pocket defined by said desired wall of the cartridge, the electronic information storage device comprising a memory device that is disposed entirely within said pocket such that the memory device is recessed relative to a surface of said desired wall so as to be shielded by said desired wall.

10. The cartridge of claim 1 wherein said desired wall of the cartridge is formed of a non-magnetic material selected from the group consisting of a non-magnetic metallic material, a non-magnetic plastic material, and a non-magnetic composite material.

11. The cartridge of claim 10 wherein the non-magnetic material is selected from the group consisting of a non-magnetic plastic material, a non-magnetic metallic material comprising aluminum, and a non-magnetic composite material comprising carbon.

12. The cartridge of claim 1 wherein the cartridge has six sides including a top side, a bottom side, a front side, a back side, and left and right sides, and wherein said desired wall of the cartridge is on a side other than the top side such that the electronic information storage device is located on one of the sides of the cartridge other than the top side.

13. The cartridge of claim 12 wherein said desired wall is on either the left side or the right side of the cartridge.

14. The cartridge of claim 1 wherein said desired wall has an angled surface that is oblique to a horizontal axis of the cartridge when the cartridge is operatively mounted on a rail of the machine tool.

15. The cartridge of claim 14 wherein said angled surface is at an angle of between about 5 degrees and about 60 degrees relative to said horizontal axis of the cartridge.

16. The cartridge of claim 1 wherein said single integral block is formed of a first metal, and wherein the punch-retention arms and the die-retention arms are formed of a second metal, said first and second metals being different.

17. The cartridge of claim 1 wherein the two punch-retention arms are mounted to said main body such that the punch-retention arms have a limited range of movement toward and away from each other, wherein the punch-retention arms are resiliently mounted to said main body such that the punch-retention arms are resiliently biased toward a default configuration characterized by the punch-retention arms being closer to each other than they are in any other configuration within their limited range of movement, and wherein the two die-retention arms are mounted to said main body such that the die-retention arms have a limited range of movement toward and away from each other, wherein the die-retention arms are resiliently mounted to said main body such that the die-retention arms are resiliently biased toward a default configuration characterized by the die-retention arms being closer to each other than they are in any other configuration within their limited range of movement.

18. The cartridge of claim 1 wherein said desired wall of the cartridge is formed of an aircraft metal selected from the group consisting of beryllium, titanium, magnesium, aluminum, and alloys comprising one or more of beryllium, titanium, magnesium, and aluminum, the punch-retention arms and the die-retention arms being formed of steel.

19. The cartridge of claim 1 wherein the electronic information storage device carries set-up information selected from the group consisting of hit-count information, tool-length information, adjustment-limit information, nibbling-limitation information, material-limitation information, and temperature/tonnage information.

20. A tool set holder cartridge for a machine tool, the cartridge having a main body, two punch-retention arms, two die-retention arms, and a stripper locator base, the two punch-retention arms being adapted to removably retain a punch on the cartridge, the two die-retention arms being adapted to removably retain a die on the cartridge, the stripper locator base being adapted to removably retain a stripper plate on the cartridge, the cartridge having an electronic information storage device that is readable and writeable, wherein the electronic information storage device is on a desired side of the cartridge, the cartridge having six sides including a top side, a bottom side, a front side, a back side, and left and right sides, and wherein said desired side of the cartridge is one of the sides other than the top side, wherein the electronic information storage device is mounted on a desired wall of the cartridge, said desired wall having an angled surface that is oblique to a horizontal axis of the cartridge when the cartridge is operatively mounted on a rail of the machine tool.

21. The cartridge of claim 20 wherein said desired side is either the left side or the right side of the cartridge.

22. The cartridge of claim 20 wherein the electronic information storage device on said desired side of the cartridge is spaced at least $\frac{1}{8}^{th}$ inch from an outermost surface of each side of the cartridge.

23. The cartridge of claim 20 wherein the electronic information storage device on said desired side of the cartridge is spaced at least one inch from an outermost surface of each side of the cartridge.

24. The cartridge of claim 20 wherein said angled surface is at an angle of between about 5 degrees and about 60 degrees relative to said horizontal axis of the cartridge.

25. A holder cartridge and a tool set, in combination, the cartridge and tool set being adapted for use on a machine tool, the cartridge having a main body, two punch-retention arms, two die-retention arms, and a stripper locator base, the two punch-retention arms removably retaining a punch on the cartridge, the two die-retention arms removably retaining a die on the cartridge, the stripper locator base removably retaining a stripper plate on the cartridge, the punch-retention arms and the die-retention arms being formed of steel, the cartridge having an electronic information storage device that is readable and writeable, the electronic information storage device being mounted on a desired wall of the cartridge, said desired wall being formed of a non-magnetic material selected from the group consisting of a non-magnetic metallic material comprising aluminum, a non-magnetic plastic material, and a non-magnetic composite material comprising carbon, wherein the electronic information storage device carries set-up information selected from the group consisting of hit-count information, tool-length information, adjustment-limit information, nibbling-limitation information, material-imitation information, and temperature/tonnage information, wherein the stripper locator base is located between the punch-retention arms and the die-retention arms, and wherein said main body comprises a single integral block, wherein said single integral block defines said stripper locater base.

26. The cartridge of claim 25 wherein a rear portion of the cartridge's main body is attached to a mount body of a guidance system of the machine tool, the guidance system being adapted to move the cartridge selectively toward or away from a mounting position of the machine tool.

* * * * *